US012805440B2

(12) United States Patent
Schaedler et al.

(10) Patent No.: US 12,805,440 B2
(45) Date of Patent: Nov. 24, 2026

(54) AUGER SYSTEM AND APPARATUS FOR OUTDOOR POWER EQUIPMENT

(71) Applicant: MTD PRODUCTS INC, Valley City, OH (US)

(72) Inventors: Axel Schaedler, Olmsted Falls, OH (US); Jay Maggard, Polk, OH (US); Jeff Kucera, Medina, OH (US); Noah Pawlaczyk, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 297 days.

(21) Appl. No.: 18/615,618

(22) Filed: Mar. 25, 2024

(65) Prior Publication Data

US 2024/0315171 A1 Sep. 26, 2024

Related U.S. Application Data

(60) Provisional application No. 63/535,660, filed on Aug. 31, 2023, provisional application No. 63/454,607, filed on Mar. 24, 2023.

(51) Int. Cl.
*A01D 43/077* (2006.01)
*A01D 43/063* (2006.01)
*B65G 33/34* (2006.01)

(52) U.S. Cl.
CPC ......... *A01D 43/077* (2013.01); *A01D 43/063* (2013.01); *B65G 33/34* (2013.01)

(58) Field of Classification Search
CPC .... A01D 43/077; A01D 43/063; B65G 33/34; B65G 33/14
See application file for complete search history.

(56) References Cited

U.S. PATENT DOCUMENTS

| | | | | | |
|---|---|---|---|---|---|
| 3,222,583 | A | | 12/1965 | Michael | |
| 3,242,658 | A | | 3/1966 | Morales | |
| 3,641,754 | A | | 2/1972 | Anstee | |
| 3,664,097 | A | * | 5/1972 | Pedigo | A01D 43/0633 100/145 |
| 3,736,736 | A | | 6/1973 | Myers | |
| 3,791,118 | A | | 2/1974 | Behrens | |
| 3,846,963 | A | * | 11/1974 | Pedigo | A01D 43/0633 56/13.3 |

(Continued)

FOREIGN PATENT DOCUMENTS

| | | |
|---|---|---|
| CN | 2562556 | 7/2003 |
| CN | 103283401 | 9/2013 |

(Continued)

*Primary Examiner* — Arpad Fabian-Kovacs
(74) *Attorney, Agent, or Firm* — Wegman Hessler

(57) ABSTRACT

A turf maintenance apparatus with an auger for transporting turf clippings out from a mowing implement of the turf maintenance apparatus can reduce power consumption for a bagging implementation for an electric-powered machine. In some embodiments, the turf maintenance apparatus can have an electric motor as a prime mover, or an electric motor for powering the mowing implement, or a combination of the foregoing. The auger can be powered by an electric motor and convey turf clippings, leaves, vegetation and other material expelled from a mow deck of the turf maintenance apparatus to a receptacle, bag or the like.

29 Claims, 42 Drawing Sheets

(56) References Cited

U.S. PATENT DOCUMENTS

| | | | | | |
|---|---|---|---|---|---|
| 3,934,392 | A * | 1/1976 | Moery | A01D 43/063 | 56/202 |
| 3,974,631 | A * | 8/1976 | Rhodes | A01D 43/063 | 56/202 |
| 4,069,649 | A | 1/1978 | Mullet et al. | | |
| 4,103,477 | A | 8/1978 | Mullet et al. | | |
| 4,114,353 | A * | 9/1978 | Ansbaugh | A01D 43/077 | 56/13.3 |
| 4,262,475 | A | 4/1981 | Takahashi et al. | | |
| 4,379,385 | A | 4/1983 | Reinhall | | |
| 4,532,755 | A * | 8/1985 | Schemelin | A01D 43/063 | 56/16.6 |
| 4,614,080 | A * | 9/1986 | Hoepfner | A01D 43/077 | 56/13.3 |
| 4,711,073 | A * | 12/1987 | Freier, Jr. | A01D 43/077 | 56/13.3 |
| 4,903,469 | A * | 2/1990 | Murakawa | A01D 43/063 | 56/16.6 |
| 4,922,696 | A | 5/1990 | Burns et al. | | |
| 4,986,062 | A | 1/1991 | Hill | | |
| 5,062,258 | A * | 11/1991 | Samejima | A01D 43/077 | 56/13.3 |
| 5,806,293 | A * | 9/1998 | Klein | A01D 34/49 | 172/28 |
| 5,832,708 | A * | 11/1998 | Sugden | A01D 43/0631 | 56/16.6 |
| 6,148,595 | A * | 11/2000 | Rabe | A01D 43/063 | 56/320.2 |
| 7,032,368 | B2 * | 4/2006 | Funk | A01D 43/063 | 56/202 |
| 9,706,710 | B2 * | 7/2017 | Shoji | A01D 43/063 | |
| 10,436,369 | B2 * | 10/2019 | Jefferson | F16L 41/088 | |
| 10,674,664 | B2 | 6/2020 | Hultgren et al. | | |
| 11,219,163 | B2 | 1/2022 | Uemura et al. | | |
| 2024/0341233 | A1 * | 10/2024 | Maggard | A01D 43/077 | |
| 2025/0255215 | A1 * | 8/2025 | Maggard | A01D 34/71 | |

FOREIGN PATENT DOCUMENTS

| | | | | |
|---|---|---|---|---|
| CN | 205694316 | | 11/2016 | |
| CN | 107493810 | | 12/2017 | |
| CN | 112154769 | | 1/2021 | |
| CN | 114007409 | | 2/2022 | |
| DE | 3916782 | | 12/1989 | |
| DE | 4202293 | | 7/1993 | |
| DE | 4222214 | | 1/1994 | |
| DE | 19511217 | | 6/1996 | |
| DE | 19519146 | | 12/1996 | |
| DE | 19529709 | | 2/1997 | |
| DE | 19735768 | A1 * | 2/1999 | A01B 45/026 |
| DE | 102004007544 | | 9/2005 | |
| DE | 102004046207 | | 3/2006 | |
| DE | 102008024105 | | 12/2009 | |
| EP | 0069739 | | 1/1983 | |
| EP | 0078217 | | 5/1983 | |
| EP | 0685148 | | 12/1995 | |
| EP | 0759268 | | 2/1997 | |
| EP | 3162181 | | 5/2017 | |
| EP | 2505051 | | 3/2019 | |
| FR | 2235639 | A1 * | 1/1975 | A01D 43/0633 |
| FR | 2722056 | | 1/1996 | |
| FR | 2758233 | | 7/1998 | |
| FR | 2773046 | | 7/1999 | |
| FR | 2836777 | | 9/2003 | |
| FR | 2881917 | | 8/2006 | |
| WO | 8201115 | | 4/1982 | |
| WO | 8403413 | | 9/1984 | |
| WO | 96/29854 | | 10/1996 | |
| WO | WO-2017208049 | A1 * | 12/2017 | A01D 43/0638 |
| WO | 2021081877 | | 5/2021 | |

* cited by examiner

EXAMPLE MOWING APPARATUS WITH AUGER FOR CLIPPING TRANSFER
100

EXAMPLE INTERIOR VIEW OF SIDE-DISCHARGE MOW DECK COUPLER
300

EXAMPLE AUGER TUBE – INTERNAL VIEW
400B

EXAMPLE AUGER TUBE – CLOSEUP VIEW
500B

EXAMPLE MOWING APPARATUS WITH TOP-DISCHARGE DECK AND AUGER
(TRANSPARENT VIEW)
600

EXAMPLE MOWING APPARATUS WITH TOP-DISCHARGE DECK AND AUGER
(SOLID VIEW)
700

EXAMPLE DECK COUPLING – HOOD REMOVED
900A

EXAMPLE CLIPPING EJECTOR – OVERHEAD PERSPECTIVE VIEW
1200

EXAMPLE ELEVATED AUGER TUBE COVER – AXIAL VIEW
1500

EXAMPLE ELEVATED AUGER TUBE COVER – ALTERNATE TOP SURFACE
1500B

EXAMPLE ELEVATED COVER – LONGITUDINAL INTERNAL VIEW
1500C

EXAMPLE ELEVATED AUGER TUBE COVER – OVERHEAD VIEW
1600

EXAMPLE ELEVATED MOW DECK COUPLER – CLOSEUP VIEW
1800

EXAMPLE TOP-DISCHARGE MOW DECK FOR ELEVATED DECK COUPLER
1800A

FIG. 23
EXAMPLE AUGER TUBE – MOW DECK COUPLER JOINT
2300
MOW DECK COUPLER
2330
PIVOT AXIS
2333
AUGER TUBE
2324

AUGER TUBE BASE AND COUPLER INTERFACE
2300A

AUGER TUBE BASE AND COUPLER INTERFACE
2300B

AUGER DEVICE – LONGITUDINAL INTERNAL VIEW
2300C

EXAMPLE AUGER SYSTEM SUPPORT
2400

EXAMPLE CLIPPING EJECTOR – SIDE VIEW
2500

EXAMPLE PULLEY AND BELT AUGER DRIVE
2600A

VIEW OF MATERIAL MOVEMENT OUT OF AUGER SYSTEM
2900

VIEW OF MATERIAL MOVEMENT OUT OF AUGER SYSTEM
3000

RANGE OF MATERIAL TRAJECTORIES
2830

AUGER SYSTEM AND APPARATUS FOR OUTDOOR POWER EQUIPMENT

CROSS-REFERENCE TO RELATED APPLICATIONS

This application claims the benefit of priority from U.S. Provisional Application No. 63/454,607, filed Mar. 24, 2023 and titled AUGER DEVICE FOR TRANSPORTING TURF CLIPPINGS FROM A TURF MAINTENANCE MACHINE and from U.S. Provisional Application No. 63/535,660, filed Aug. 31, 2023 and titled AUGER SYSTEM AND APPARATUS FOR OUTDOOR POWER EQUIPMENT, the disclosures of which are hereby incorporated by reference herein in their respective entireties and for all purposes.

FIELD OF DISCLOSURE

The disclosed subject matter pertains to systems, apparatuses, and methods for an outdoor power equipment (e.g., a turf maintenance machine, etc.), for instance, providing an auger device for transporting material (e.g., turf clippings, etc.) associated with the outdoor power equipment.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Modern maintenance machines also offer multiple options for power source. The various advantages associated with electric motor engines, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Embodiments of the present disclosure provide an outdoor power equipment (e.g., a turf maintenance apparatus, etc.) with an auger for transporting material (e.g., turf clippings, etc.) out from the outdoor power equipment (e.g., from a mowing implement of the turf maintenance apparatus, etc.). In some embodiments, the outdoor power equipment can have an electric motor as a prime mover, or an electric motor for powering portions of the outdoor power equipment (e.g., the mowing implement, etc.), or a combination of the foregoing. The subject disclosure is not so limited, however, and other primer movers and implement power sources are within the scope of the present disclosure, such as a combustion engine, hydraulic motor, pneumatic motor, or the like. In one or more aspects of the disclosed embodiments, the auger can be powered by an electric motor.

In one or more additional embodiments, disclosed is a conveyance system for an outdoor power equipment, comprising: a screw auger with a central axis and one or more flights distributed in a spiral manner around the central axis along a length of the screw auger; an auger tube extending along the length of the screw auger that forms a shell about at least a portion of the circumference of the screw auger and within which the screw auger is configured to rotate about its central axis, wherein the auger tube and screw auger are configured to transport material received at a first end of the auger tube up the auger tube and out a second end of the auger tube; a coupler, wherein a first end of the coupler is configured to secure to and to substantially cover an opening in the outdoor power apparatus, wherein a second end of the coupler is connected to the first end of the auger tube, and wherein the coupler is configured to receive the material from the opening in the outdoor power apparatus and to provide the material to the first end of the auger tube; and an ejector housing having an ejector-auger interface connected to the second end of the auger tube, wherein the ejector housing comprises a rotatable implement configured to rotate within the ejector housing that is proximate to the second end of the auger tube and coaxial with the screw auger, the ejector housing having a receptacle interface that serves as an output port for the ejector housing, wherein the ejector housing is configured to receive the material from the auger tube via the ejection opening and to expel the material via the output port, wherein the rotatable implement is configured to expel at least a portion of the material.

In further aspects of the disclosed embodiments, the specification discloses an apparatus, comprising: an ejector housing configured to receive material via an input interface in a first plane and to expel the material via an output port in a second plane distinct from the first plane; and a rotatable implement configured to rotate within the ejector housing around an axis of rotation that is substantially perpendicular to the first plane, wherein the rotatable implement is configured to expel at least a first portion of the material.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIG. 18A is a view of an example top-discharge mow deck opening to which the mow deck coupler of FIG. 17 is adapted to secure to;

Figure 1:
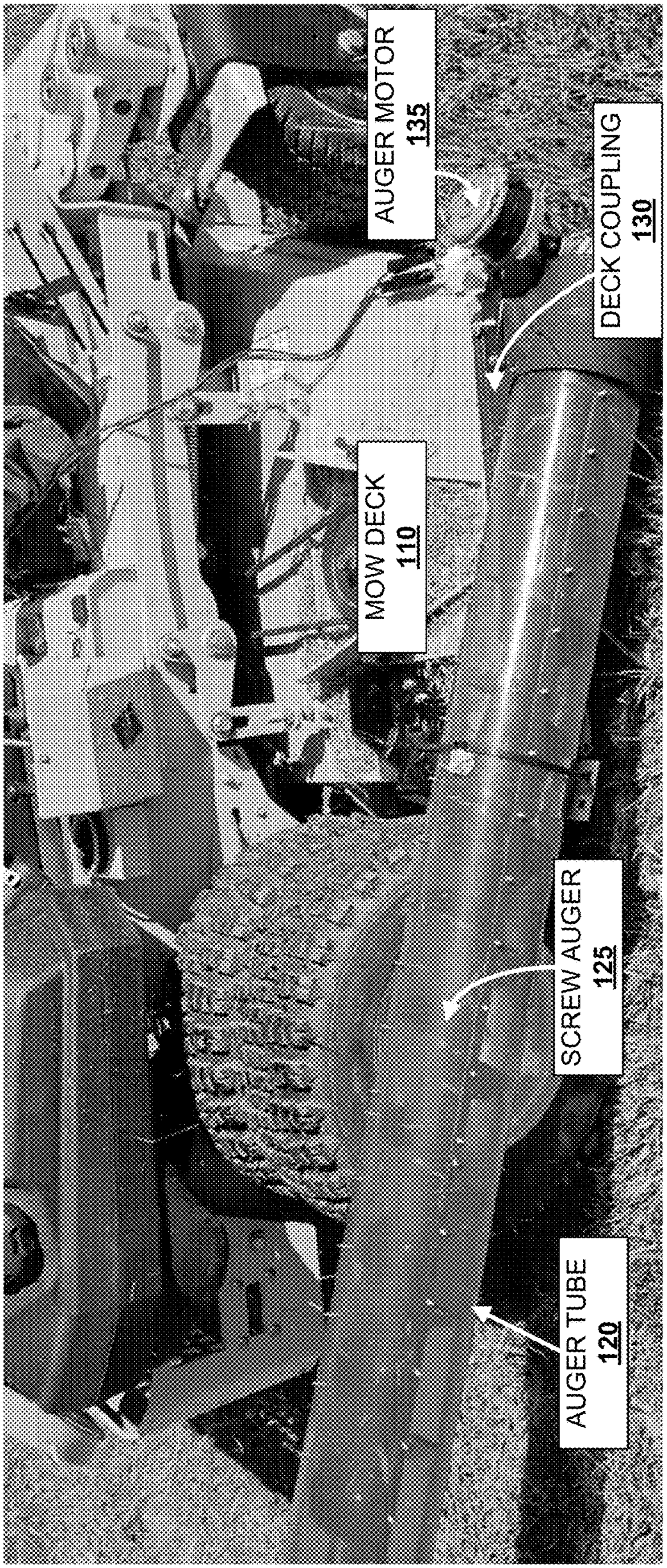
FIG. 1 provides an image of an example auger device coupled to a mowing apparatus according to one or more embodiments of the present disclosure.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to transporting turf clippings from a mow deck of power equipment machines are described herein, it should be understood that the disclosed machines, electronic and computing devices and methods are not so limited and modifications may be made without departing from the scope of the present disclosure. The scope of the devices, components of such devices, coupling apparatuses and power sources are defined by the appended claims, and all devices, components, and apparatuses that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment," "outdoor power equipment machine," "power equipment," "maintenance machine," "turf maintenance machine," "lawn maintenance apparatus," and "power equipment machine" are used interchangeably and are intended to refer to any of robotic, partially robotic ride-on, manually operated ride-on, walk-behind, sulky equipped, autonomous, semi-autonomous (e.g., user-assisted automation), remote control, or multi-function variants of any of the following: powered carts and wheel barrows, motorized or non-motorized trailers, lawn mowers, lawn and garden tractors, cars, trucks, go-karts, scooters, buggies, powered four-wheel riding devices, powered three-wheel riding devices, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment. Operator controlled vehicles can also be implemented in conjunction with various embodiments of the present disclosure directed to selectively powered caster wheel steering.

FIG. 1 provides an image of a mowing apparatus 100 with auger for transfer of turf clippings according to various embodiments of the present disclosure. Mowing apparatus 100 can be a ride-on maintenance apparatus in an implementation, but is not limited to this implementation and can be a sulky-equipped apparatus, a walk-behind apparatus, a tow-behind apparatus, and so forth. Additionally, while various embodiments are discussed in connection with a mowing apparatus for the purposes of illustration, other embodiments can be employed on other types of outdoor power equipment (e.g., a thatcher for removing thatch, outdoor power equipment for leaf removal, street sweeping, etc.).

Mowing apparatus 100 comprises a screw auger 125 within an auger housing 120 (e.g., an auger tube) secured to a mow deck 110 of mowing apparatus 100 by way of a deck coupling 130. An auger motor 135 can be provided to power rotation of screw auger 125 within auger tube 120. Auger motor 135 can be activated (and deactivated) in conjunction with power being applied to an implement of mow deck 110 (e.g., power applied to cutting blades within mow deck 110) or can be activated (and deactivated) independently of power supplied to mow deck 110. In some embodiments, one of activation and/or deactivation of auger motor 135 can occur at one or more predetermined times after activation and/or deactivation of mow deck 110 (e.g., activation of auger motor 135 can be simultaneous with or with a first delay after activation of mow deck 110 and/or deactivation of auger motor 135 can be simultaneous with or with a second delay after deactivation of mow deck 110, wherein the first and second delays can be the same or different). Auger motor 135 can have a drive output coupled to a rotation bearing within deck coupling 130. A rotation portion of screw auger 125 (e.g., an end of a rotation shaft) can be coupled to the rotation bearing within deck coupling 130, causing rotation of screw auger 125 in response to auger motor 135 powering the drive output.

Figure 2:
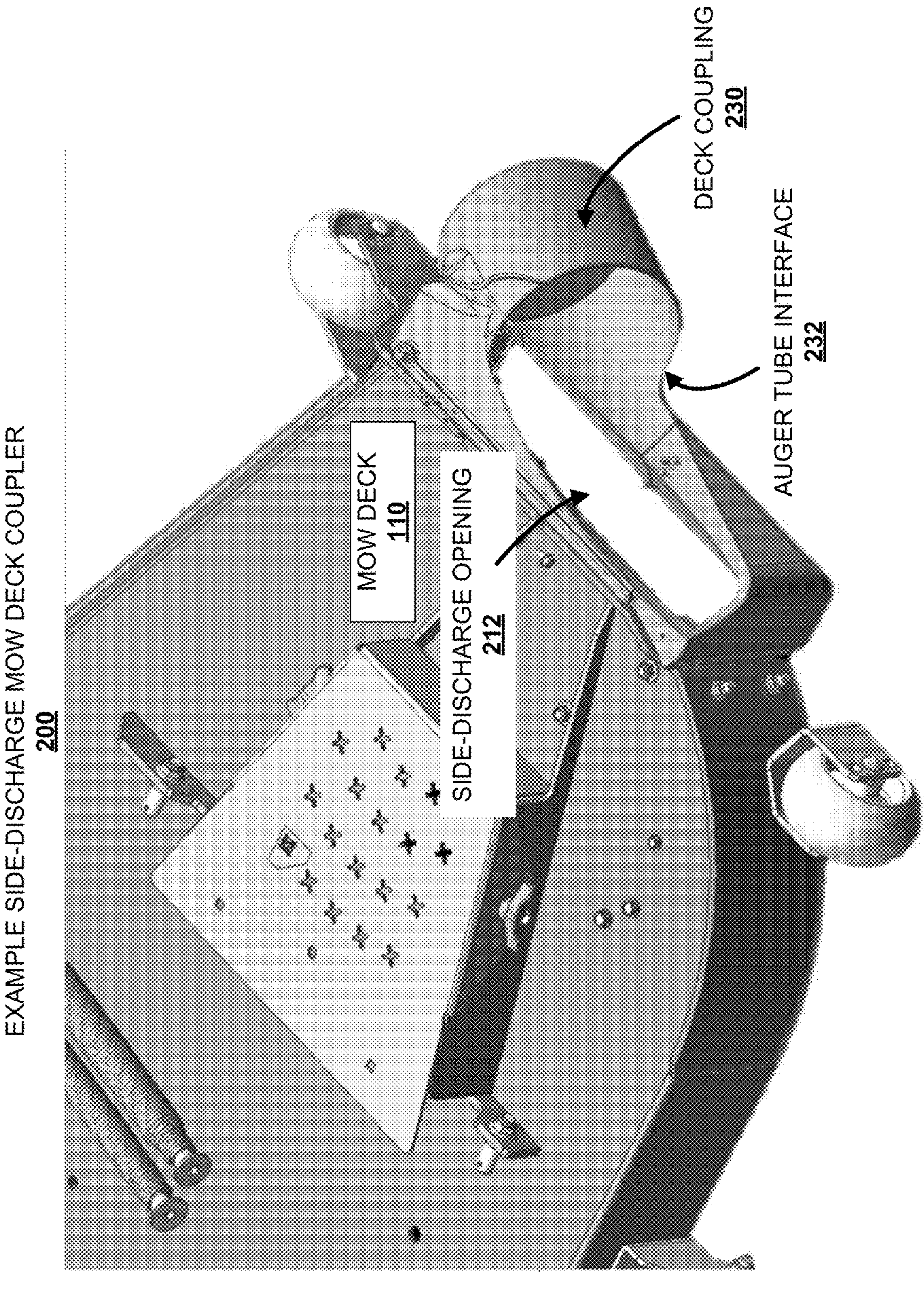
FIG. 2 depicts a drawing of an example deck coupling apparatus to secure the auger device to a mow deck of the mowing apparatus of FIG. 1, in an embodiment(s)
Figure 18:
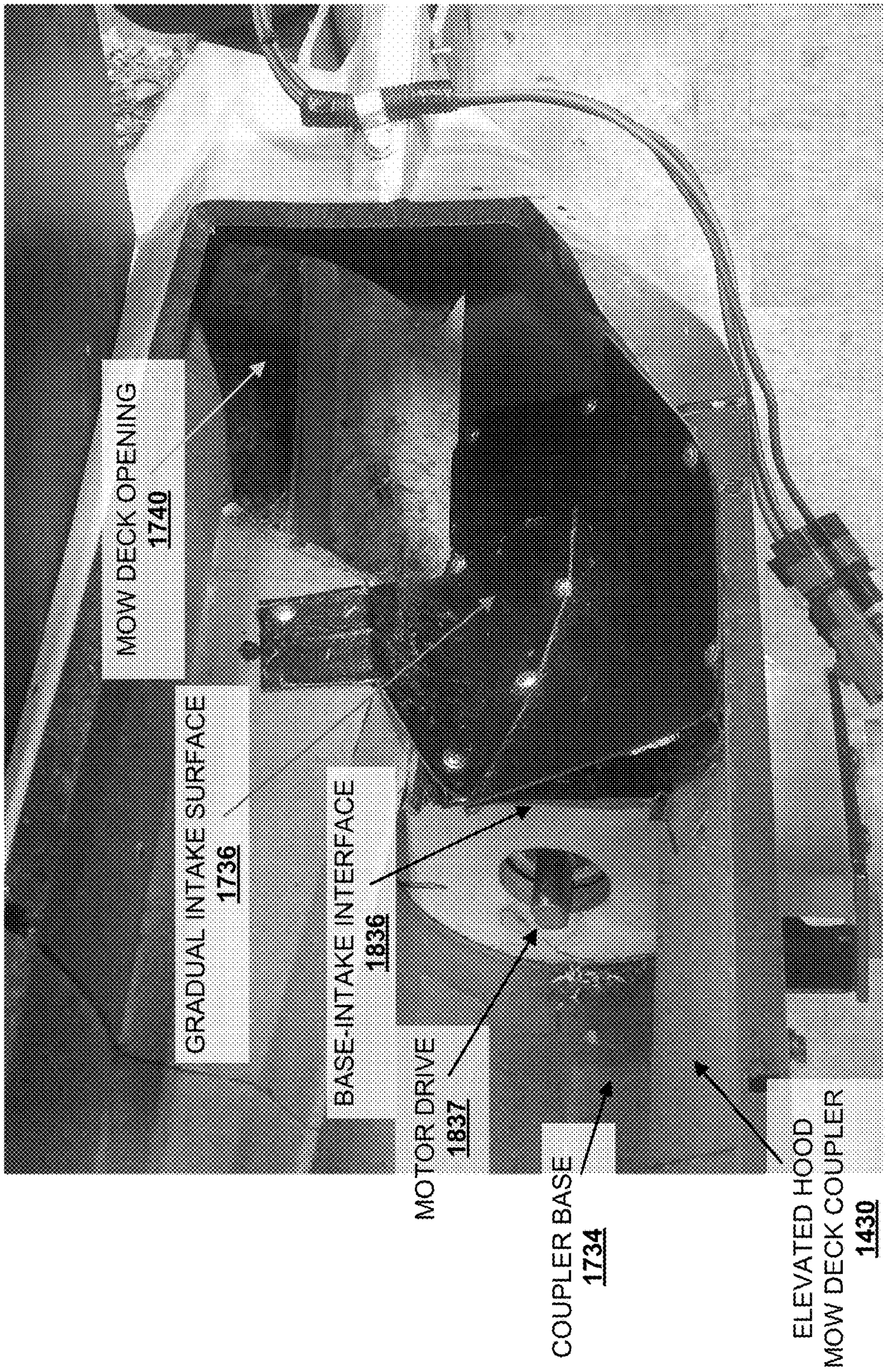
FIG. 18 is a close-up view of the interior of the example mow deck coupler of FIG. 17.
Figure 18A:
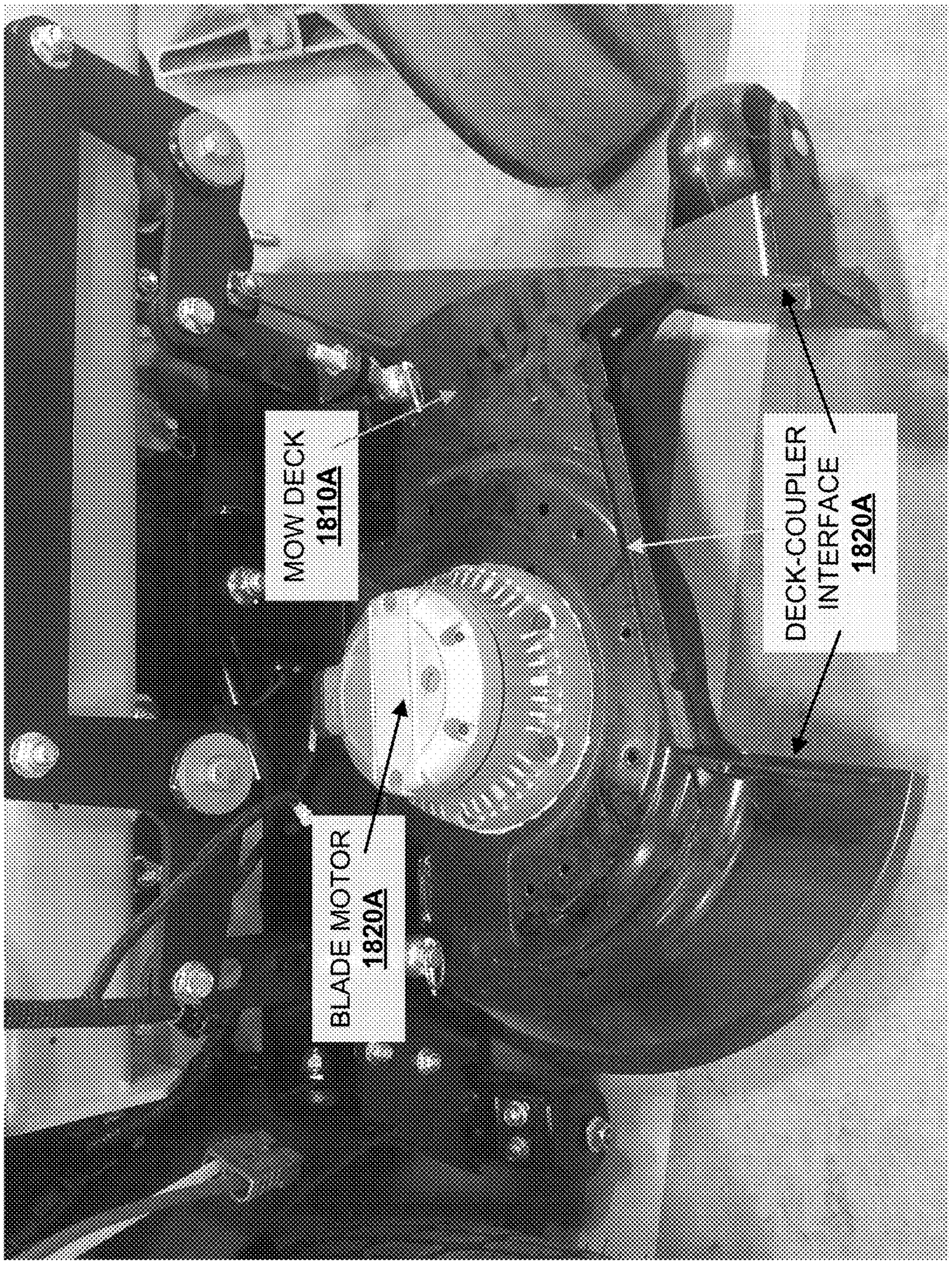

Deck coupling 130 secures to mow deck 110 over a discharge opening in mow deck 110 (e.g., see FIG. 2, infra; see also FIG. 18A, infra). Various embodiments of deck coupling 130 can be employed for various types of discharge from mow deck 110 (e.g., side discharge, top discharge, rear discharge, etc.). Deck coupling 130 comprises an input interface to receive material (e.g., yard waste such as turf clippings, leaves and/or other vegetation; relatively small (e.g., small enough to be moved by a system described herein) debris; relatively small litter; organic and/or inorganic waste material; etc.) from an interior of mow deck 110 and can direct the material into auger tube 120. Rotation of screw auger 125 driven by auger motor 135 causes the one or more flights to rotate about a central rotation portion of screw auger 125 and transport the turf clippings, leaves, vegetation, etc., contacting the auger flight(s) from a first end of screw auger 125 at deck coupling 130 to a second end thereof and ejected from auger tube 120. Some material can be physically coupled with one or more flights of screw auger 125 (e.g., see FIGS. 2 and 3, infra) and directly moved by rotation of screw auger 125, while other material can move based on one or more of momentum of the material after exiting mow deck 110 and/or air flow from the bottom to the top of auger tube 120 (this air flow can result from various factors, including rotation of spindles/blades of the mow deck 110, rotation of the screw auger 125, motion of material in auger tube 120, etc.). In various embodiments, material can be ejected from auger tube 120 to a container (e.g., clipping bag 740 of FIG. 7, infra; see also FIG. 21, infra). In still other embodiments, material can be ejected from auger tube 120 to the ground, or the like.

As utilized herein, relative terms or terms of degree such as approximately, substantially or like relative terms such as about, roughly and so forth, are intended to incorporate ranges and variations about a qualified term reasonably encountered by one of ordinary skill in the art in fabricating or compiling the embodiments disclosed herein, where not explicitly specified otherwise. For instance, a relative term can refer to ranges of manufacturing tolerances associated with suitable manufacturing equipment (e.g., injection molding equipment, extrusion equipment, metal stamping equipment, and so forth) for realizing a mechanical structure from a disclosed illustration or description. In some embodiments, depending on context and the capabilities of one of ordinary skill in the art, relative terminology can refer to a variation in a disclosed value or characteristic; e.g., a 0 to five-percent variance or a zero to ten-percent variance from precise mathematically defined value or characteristic, or any suitable value or range there between can define a scope for a disclosed term of degree. As examples, angles, sizes, speeds, etc. can have specific values or can have those values with a variance within reasonable manufacturing tolerances, for example, a variance of 0 to five-percent, or any suitable value or range based on reasonable manufacturing tolerance. These or similar variances can be applicable to other contexts in which a term of degree is utilized herein such as timing of a computer-controlled signal, power applied by a motor onto a component of a disclosed maintenance apparatus, accuracy of measurement of a physical effect (e.g., a dimension, a torque output, an electric power consumption, etc.) or the like.

FIG. 2 depicts an example side-discharge mow deck coupler 200 for a mow deck 110 of mowing apparatus 100, according to further aspects of the disclosed embodiments. A deck coupling apparatus 230 is secured to mow deck 110 to cover a side-discharge opening 212 in mow deck 110. An auger tube interface 232 supports a first end of screw auger 125 (e.g., see also FIG. 3, infra) and facilitates rotation of screw auger 125 within auger tube interface 232. Turf clippings and vegetation expelled from side-discharge opening 212 come into contact with flights of screw auger 125 (e.g., see FIG. 3, infra) and, when screw auger 125 is rotating, the turf clippings and vegetation are carried through auger tube 120 away from deck coupling 230. Accordingly, screw auger 125 secured to deck coupling 230 facilitates transport of turf clippings, leaves, vegetation and so forth out from mow deck 110.

Figure 3:
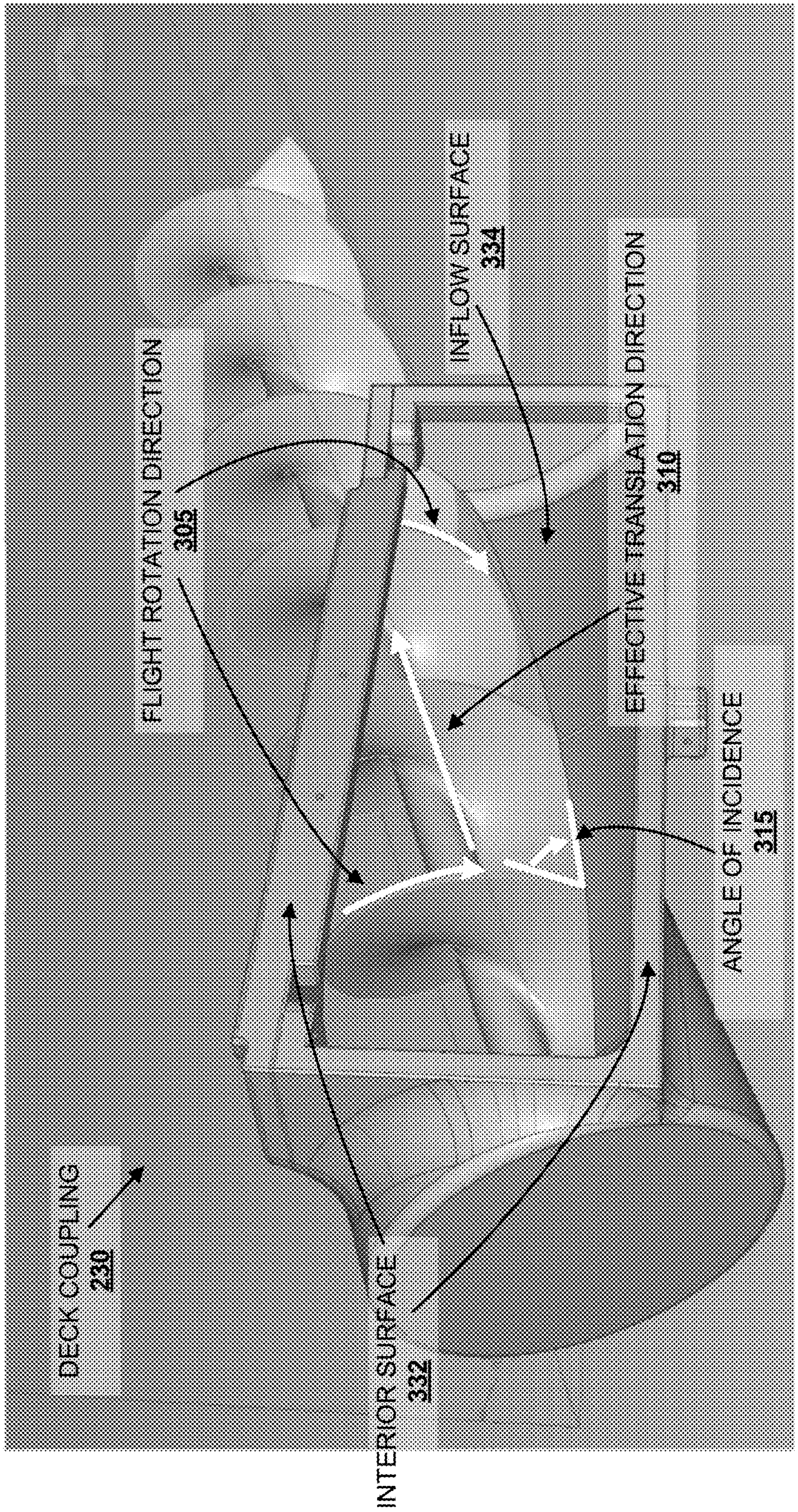
FIG. 3 illustrates a drawing of a deck coupling apparatus and auger viewed from inside a mow deck.

FIG. 3 illustrates an interior view 300 of a side-discharge mow deck coupler in further aspects of the disclosed embodiments. For instance, interior view 300 can be a view from within mow deck 110 of deck coupling 230. An interior surface 332 can secure to mow deck 110 around a perimeter of side-discharge opening 212. An inflow surface 334 provides a smooth slope from within an interior of mow deck 110 into communication with flights of screw auger 125. Flight rotation direction 305 shows a direction of rotation of screw auger 125. Flights of screw auger 125 can be formed to have an angle of incidence 315 with an edge of inflow surface 334. As shown in FIG. 3, angle of incidence 315 of the flights to inflow surface 334 is an acute angle, but in other embodiments, a right angle or obtuse angle can be employed, which can mitigate or avoid trapping of turf clippings between edges of the auger flights and the edge of inflow surface 334, thereby promoting translation of the turf clippings into effective translation direction 310 of screw auger 125.

As shown, inflow surface 334 of deck coupling 230 promotes smooth transfer of clippings from within mow deck 110 to screw auger 125. The angle of incidence 315 of edges of auger flights to inflow surface 334 can be selected (e.g., as a right angle or obtuse angle to avoid pinching or trapping of material, etc.) to further promote movement of turf clippings along a length of screw auger 125 in the effective translation direction 310. Deck coupling 230 is therefore adapted to maximize transfer of clippings out from mow deck 110 along auger tube 120. This transfer of clippings can mitigate or avoid clogging of turf clippings within mow deck 110 or deck coupling 230 to achieve good performance for a disclosed mowing apparatus 100 provided herein.

FIG. 3 shows auger 125 with flights arranged such that, when stationary, the outer edge spirals around the axis of rotation of the auger 125 away from the bottom end of auger 125 in a counterclockwise manner when viewed from the bottom of auger 125. In operation, auger 125 can be rotated clockwise from the same perspective, to translate material upward along auger 125. However, other embodiments (e.g., in the embodiment shown in FIGS. 1-3, etc., or in an embodiment discharging from the opposite side of mow deck 110, etc.) can employ an alternative auger with flights rotating up around the axis of rotation of the auger in a clockwise manner when viewed from the bottom of the auger, with the auger being rotated counterclockwise from the same perspective, to translate material upward along the auger. While various embodiments can employ either a clockwise or counterclockwise flighted auger in connection with any type of deck discharge, the combination of auger flight direction and rotation direction shown in FIG. 3 can be more efficient at transporting material than an embodiment reversing both of these directions, since the rotation of the auger at the auger/deck interface can push material initially downward as it is moved upward along the auger tube, thereby working with (instead of against) the gravitational force on the material.

Figure 4A:
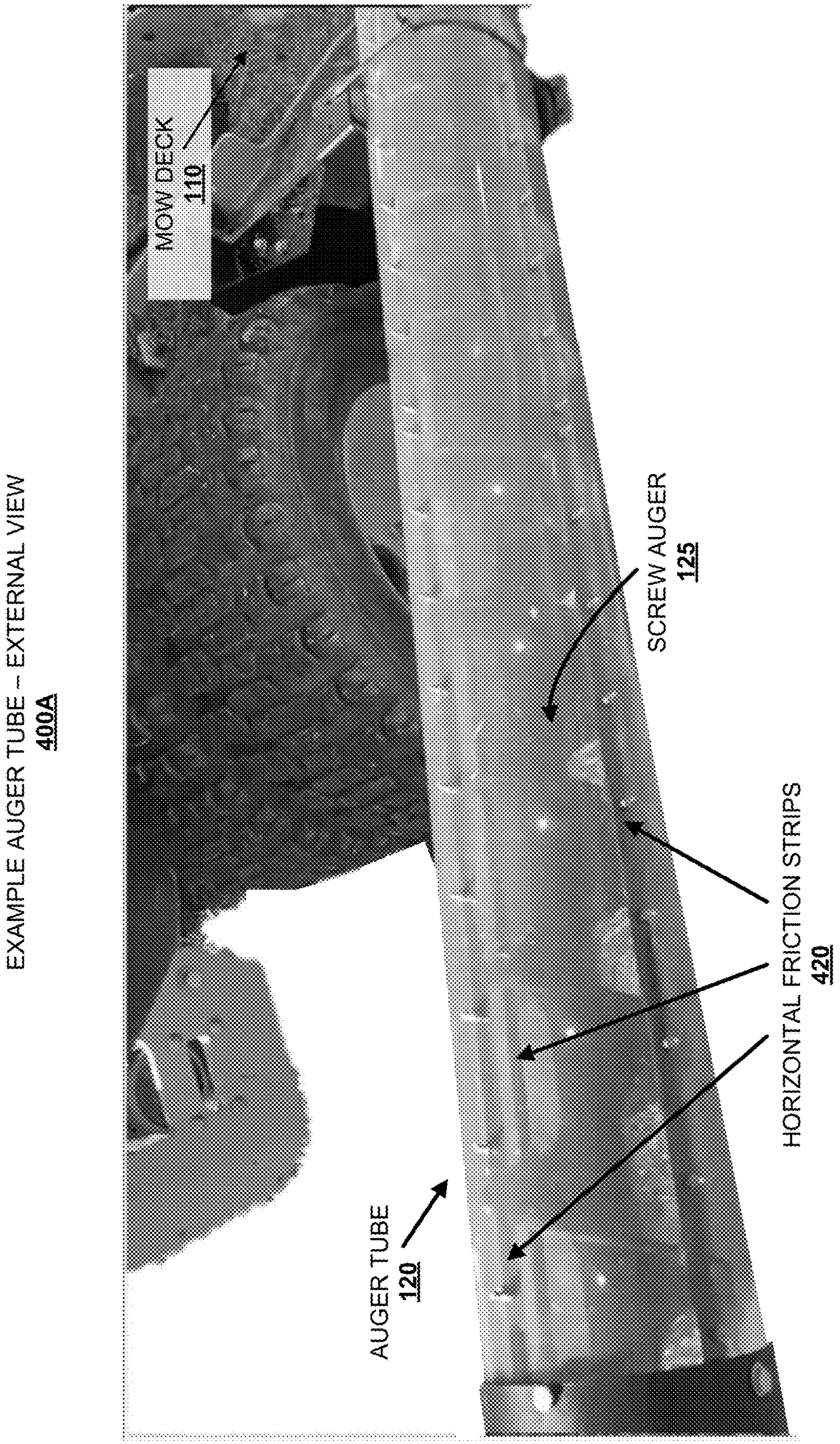
FIG. 4A shows an example auger and auger housing to enhance efficiency to enhance efficiency of transferring turf clippings along the auger in further embodiments.

FIG. 4A illustrates an external view 400A of an example auger tube according to further aspects of the disclosed embodiments. External view 400A shows a length of auger tube 120 with screw auger 125 contained therein. At a first end, auger tube 120 and screw auger 125 interface with mow deck 110 as described herein. Turf clippings are conveyed along the length of auger tube 120 from the first end to a second end (not depicted, but see FIGS. 7, 11, 12 and others infra).

In further aspects of the disclosed embodiments, the efficiency by which turf clippings are transferred along the length of auger tube 120 can be enhanced by one or more horizontal friction strip(s) 420. Horizontal friction strip(s) 420 can be secured to an interior surface of auger tube 120 extending from the first end of auger tube 120 near mow deck 110 to the second end as shown. In some aspects, horizontal friction strip(s) 420 can be embodied by multiple shorter segments extending along respective portions of the length of auger tube 120, optionally leaving gaps between some or all of the multiple shorter segments, as opposed to a single continuous strip along the length of auger tube 120 as shown in FIG. 4A.

Horizontal friction strip(s) 420 can contact edges of the flights of screw auger 125 in some aspects. In other aspects, a gap can remain between the edges of the auger flights and horizontal friction strip(s) 420. In either aspect(s), horizontal friction strip(s) 420 can have a material, dimension, surface, or the like, or suitable combination of the foregoing adapted to mitigate or prevent rotation of turf clippings, leaves, vegetation, etc., about an interior surface of auger tube 120 and thereby promote translation of the turf clippings, etc., along the length of auger tube 120. In some aspects, the material utilized for horizontal friction strip(s) 420 can be a rubber material, an elastomeric material or other suitable material providing a surface friction that opposes rotational movement of turf clippings and vegetation about the interior surface of auger tube 120. In further aspects, a thickness of horizontal friction strip(s) 420 can be selected to oppose rotational movement of turf clippings and vegetation about the interior surface of auger tube 120. In still further aspects, a surface roughness of horizontal friction strip(s) 420 can be provided to oppose rotational movement of turf clippings and vegetation about the interior surface of auger tube 120. In still other aspects, horizontal friction strip(s) 420 can have a characteristic known in the art or reasonably conveyed to one of ordinary skill in the art by way of the context provided herein that opposes rotational movement of turf clippings and vegetation about the interior surface of auger tube 120, or a suitable combination of the foregoing.

Figure 4B:
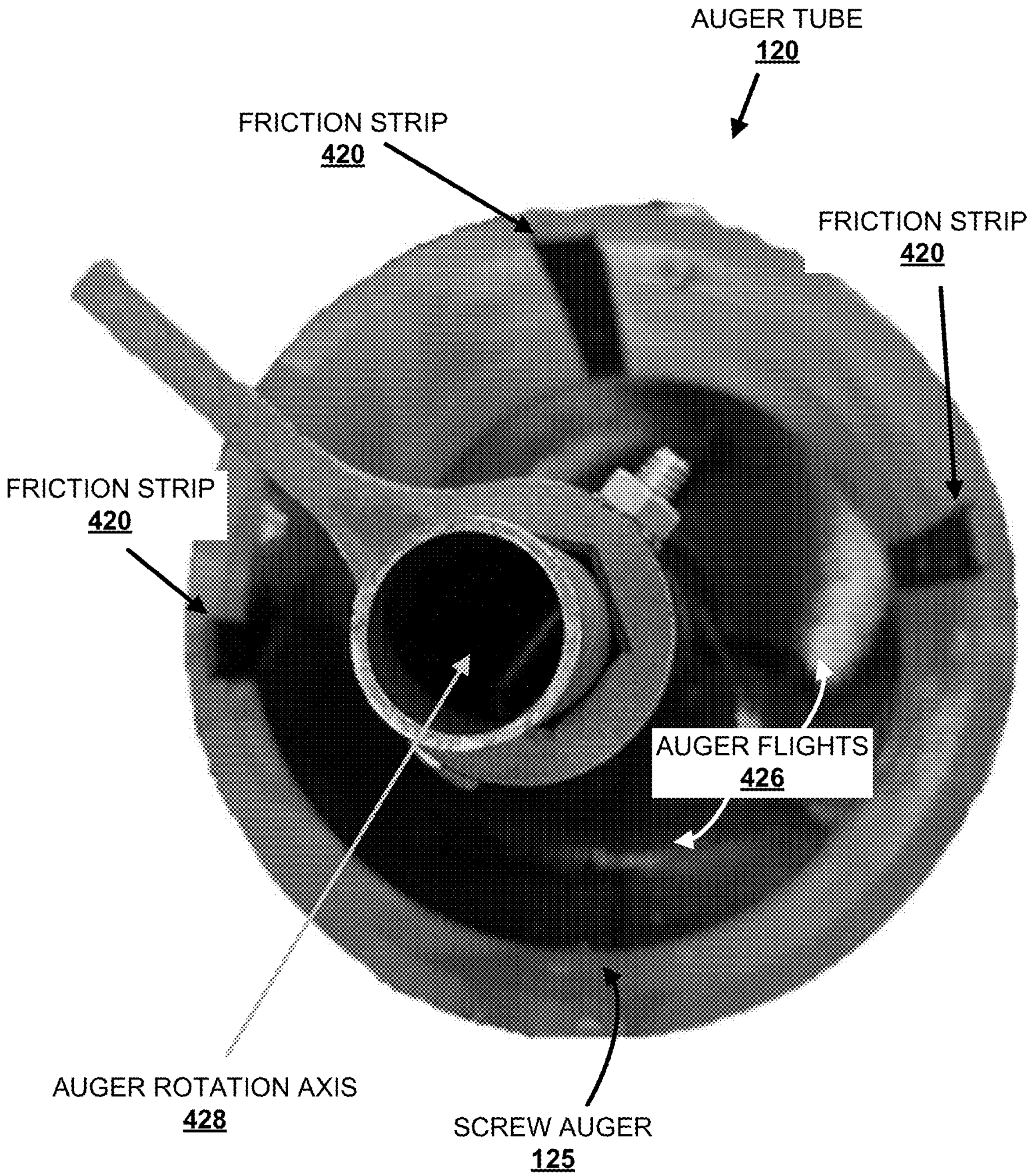
FIG. 4B is an image of a longitudinal view of the interior of the auger housing and longitudinal strips promoting efficient movement of turf clippings.

FIG. 4B shows an internal view 400B along a longitudinal axis of auger tube 120 and screw auger 125. An auger rotation axis 428 of screw auger 125 is shown in a foreground of internal view 400B, with one or more auger flights 426 distributed around a perimeter of auger rotation axis 428 and extending toward an interior circumference of an inner surface of auger tube 120 as shown. External edges of auger flights 426 can approach horizontal friction strips 420 leaving a small gap (e.g., a few millimeters (mm), 1-5 mm, or the like) between the external edges of auger flights 426 and horizontal friction strips 420, in some aspects. In other aspects, the external edges of auger flights 426 can contact horizontal friction strips 420.

In alternative or additional aspects of the closed embodiments, auger tube 120 can be a hollow shell that does not extend around an entire circumference of screw auger 125. See, e.g., FIG. 10, infra. In such embodiments, auger tube 120 surrounds a portion of screw auger 125 but not all of the circumference of screw auger 125. As an example, auger tube 120 can underlie approximately a bottom half of screw auger 125 up to about half the circumference of screw auger 125. In another example, auger tube 120 can surround about two thirds of screw auger 125, extending from a bottom thereof and coming up past half the circumference of screw auger 125. In at least some such aspects of the disclosure, auger tube 120 can surround another suitable portion between about one quarter the circumference and less than all of the circumference of screw auger 125. Where auger tube 120 surrounds less than the entire circumference of screw auger 125, fewer horizontal friction strips 420 can be provided.

Figure 5A:
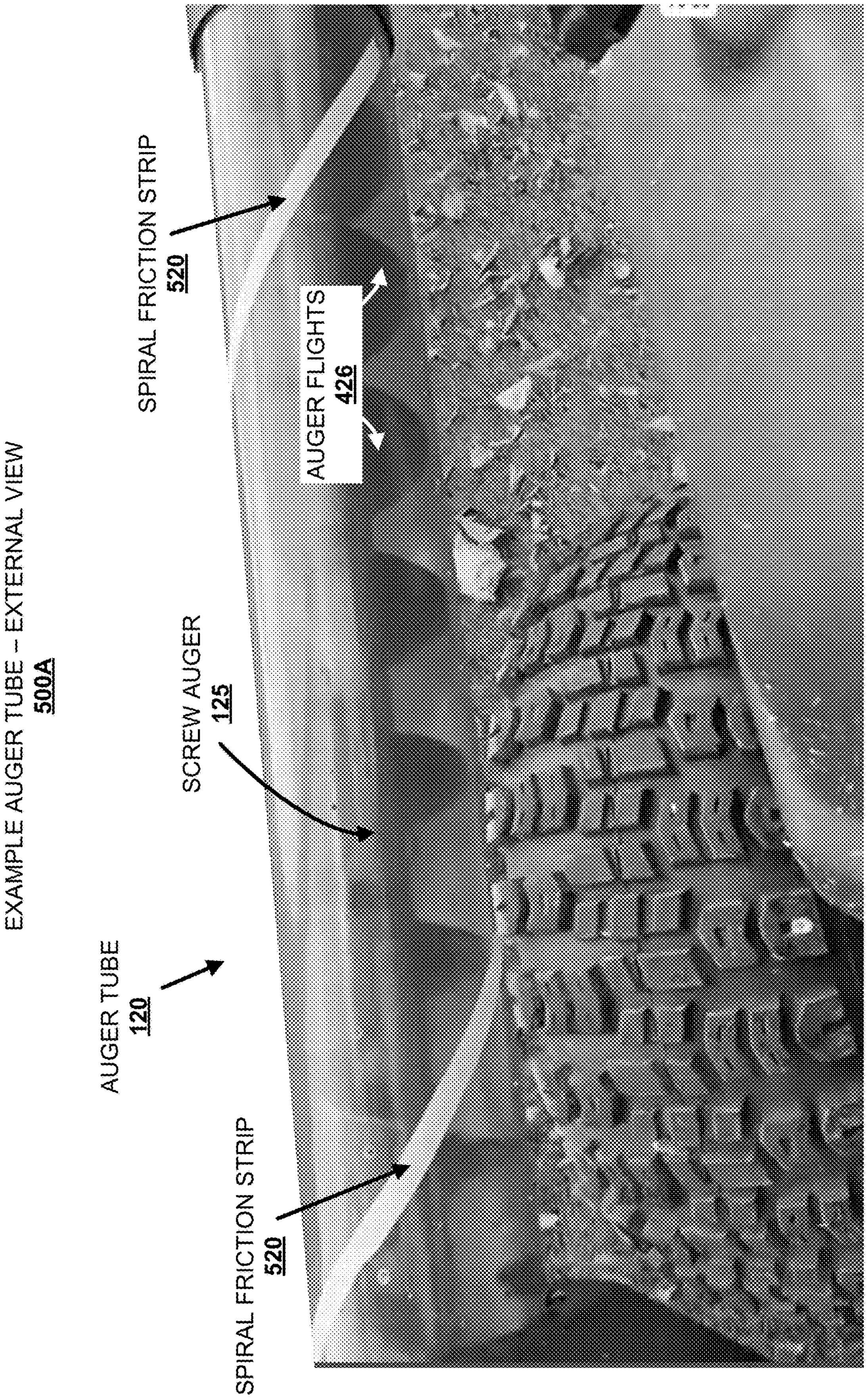
FIG. 5A shows a spiral strip within an interior of an auger housing in additional aspects of the disclosed embodiments.
Figure 5B:
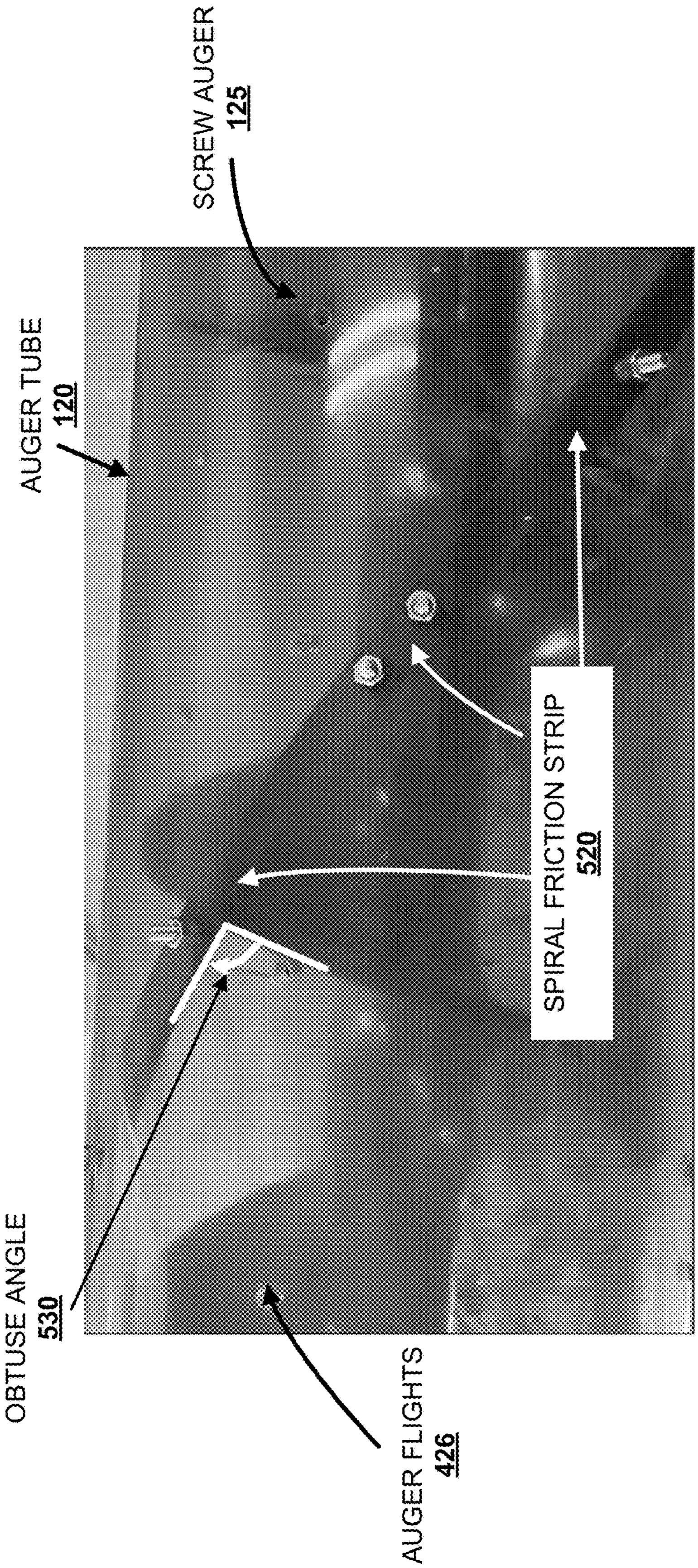
FIG. 5B depicts a closeup view of the interior of the auger housing of FIG. 5A and acute angle formed by the spiral strip and flights of the auger within the auger housing.

FIG. 5A depicts an external view 500A of an example auger tube according to still additional aspects of the disclosed embodiments. External view 500A shows auger tube 120 having spiral friction strips 520. Spiral friction strips 520 can be positioned on an interior surface of auger tube 120 as described herein, and contact edges of auger flights 426 of screw auger 125 to resist rotation of turf clippings, leaves and other vegetation about the inner circumference of auger tube 120. As shown in FIG. 5B, closeup view 500B of the example augur tube shows spiral friction strip 520 secured to the interior surface of auger tube 120. Moreover, the layout of spiral friction strip 520 can be such as to form an obtuse angle 530 with an edge of auger flight 426 in a direction of rotation of auger flight 426. More particularly, as a rotating auger flight edge facing an effective translation direction 310 of screw auger 125 (e.g., see FIG. 3, supra) moves into (rather than away from) spiral friction strip 520, an obtuse angle is formed between that rotating auger flight edge and the spiral friction strip 520. This obtuse angle 530 can mitigate or avoid trapping of turf clippings or other vegetation or material between the edge of auger flight 426 and spiral friction strip 520.

The auger flight edge facing away from the effective translation direction will not be advancing turf clippings against the spiral friction strip 520, and thus the obtuse angle is not necessary on that face of auger flight 426. Moreover, the advancing auger flight edge exiting or leaving spiral friction strip 520 pulls away from spiral friction strip 520 (instead of pushing into it) and the obtuse angle is not necessary at that angle either. The obtuse angle 530 can be formed at the advancing rotating auger flight edge as shown without detriment.

Figure 6:
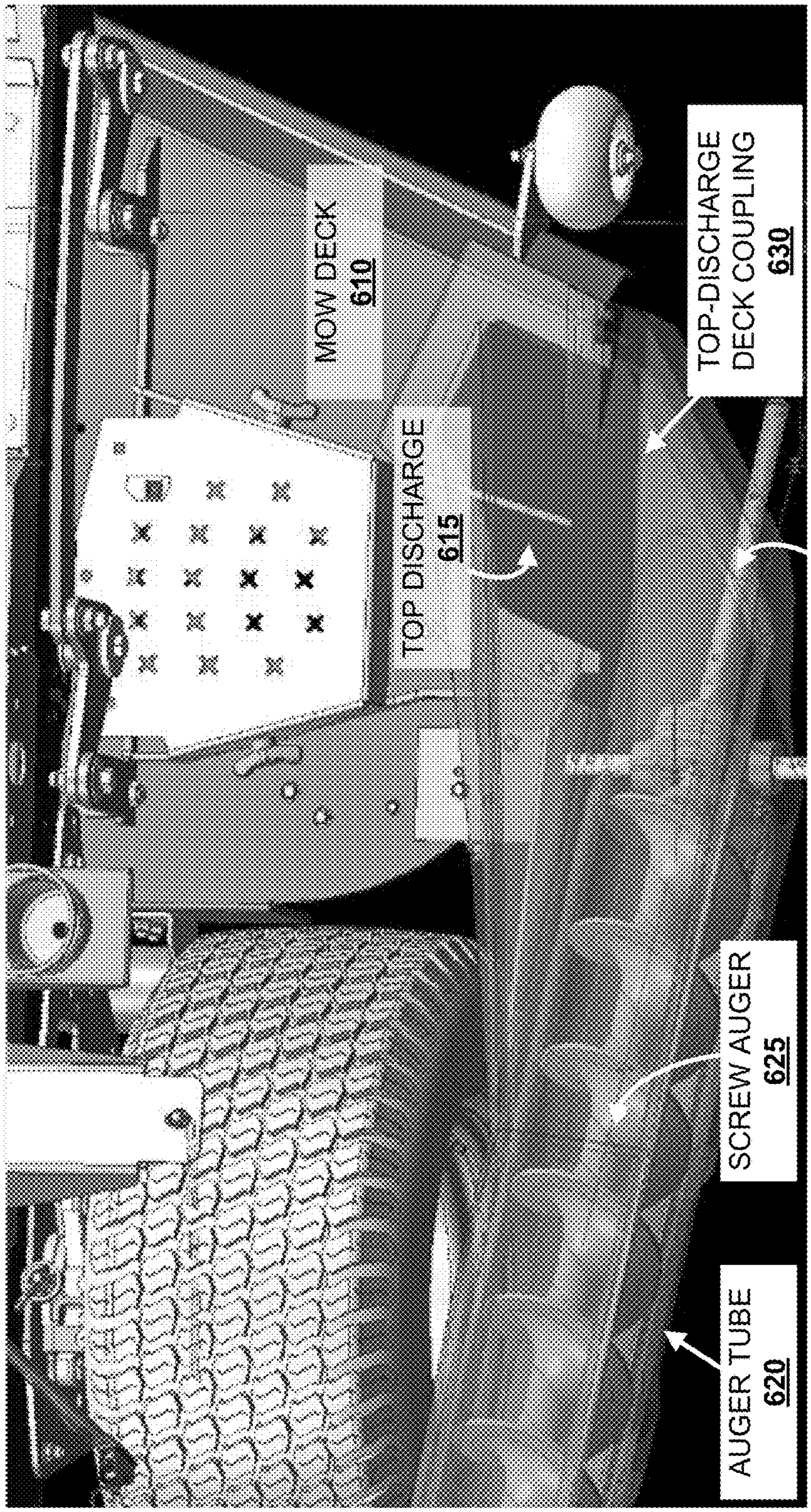
FIG. 6 shows a drawing of a top discharge deck and an auger coupling that secures an auger to the top discharge deck in an aspect of the disclosed embodiments.

FIG. 6 is a drawing of an example mowing apparatus 600 with top-discharge deck and auger apparatus according to further aspects of the disclosed embodiments. Mowing apparatus 600 includes a mow deck 610 having a top discharge opening 615, as is evident through the partially transparent top-discharge deck coupling 630. Top-discharge deck coupling 630 has a hood portion that extends partially over a top surface of mow deck 610 to cover the opening defined by top discharge 615. The transparent view of top-discharge deck coupling 630 and auger tube 620 also shows auger motor drive 638 coupled to a screw auger 625. The hood portion of top-discharge deck coupling 630 provides an opening to convey turf clippings (or other vegetation) out from mow deck 610 through top discharge 615 to screw auger 625 to convey the turf clippings away from mow deck 610.

Figure 7:
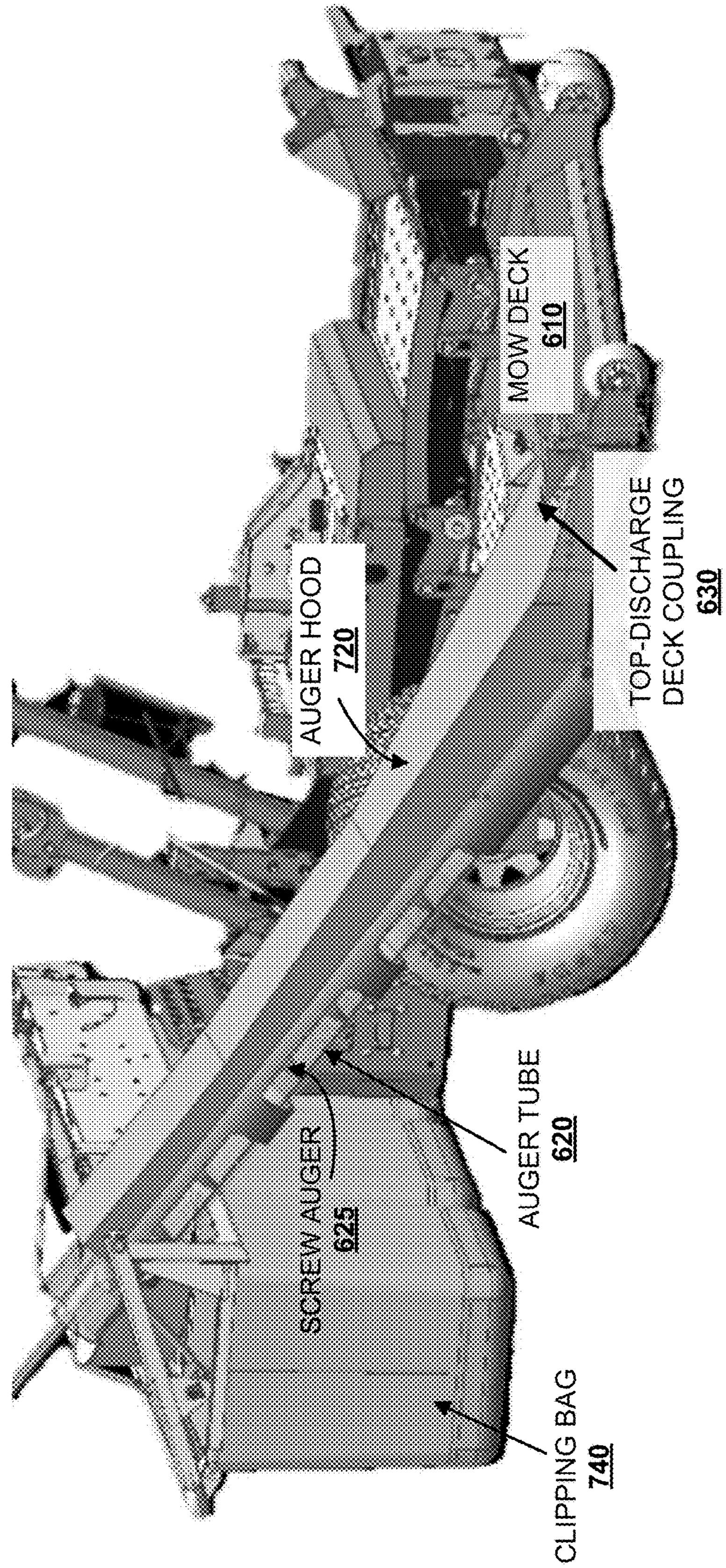
FIG. 7 is a perspective drawing of the top discharge deck and auger coupling as well as a hooded auger housing in one or more additional embodiments.

FIG. 7 provides a drawing of a perspective view 700 of a mowing apparatus 600 with a top-discharge deck according to still further embodiments of the present disclosure. Mowing apparatus 600 shows top-discharge deck coupling 630 and auger tube 620 in a solid, non-transparent view. Further, auger tube 620 includes an auger hood 720 covering a screw auger 625 contained within an auger tube 620. Turf clippings output from mow deck 610 into top-discharge deck coupling 630 at a first end of auger tube 620 are conveyed by screw auger 625 to a second end of auger tube 620 near a clipping bag 740. The turf clippings can be expelled from auger tube 620 into clipping bag 740 according to aspects of the disclosed embodiments. For instance, an ejection housing (e.g., See FIGS. 11, 12 and 19, infra, among others) coupled to auger tube 620 at the second end thereof can facilitate expulsion of turf clippings and other vegetation from auger tube 620 to clipping bag 740, in various aspects of the disclosed embodiments.

Figure 8:
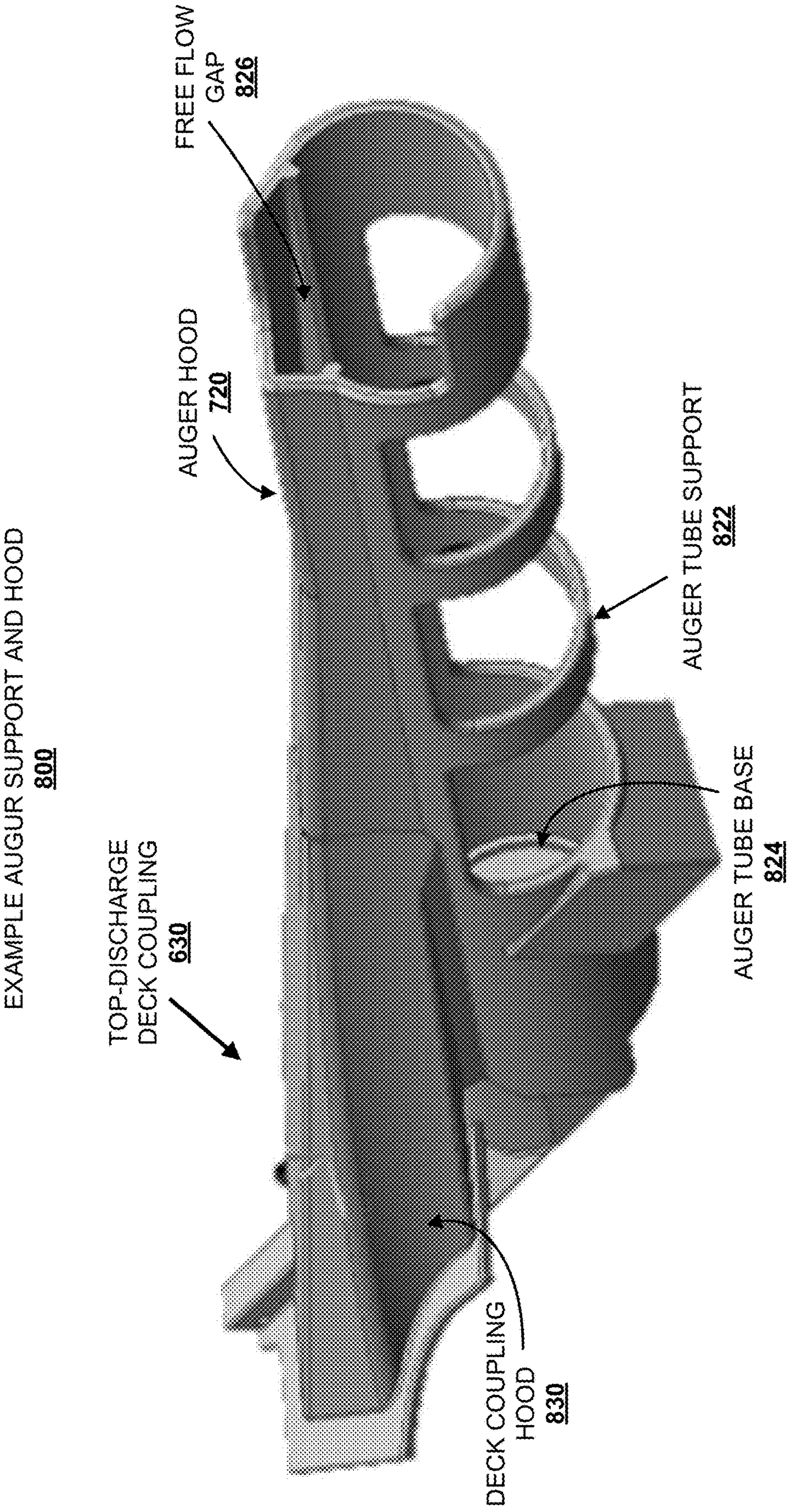
FIG. 8 is a drawing of a top discharge auger coupling and auger housing support in an aspect(s) of one or more embodiments.

FIG. 8 illustrates an example auger support and hood 800 for an auger tube according to still further aspects of the disclosed embodiments. Support and hood 800 includes top-discharge deck coupling 630 at a far end thereof, including a deck coupling hood 830. Deck coupling hood 830 can be shaped to cover an opening defined in a top of a mow deck 610. Additionally, deck coupling hood 830 can have an interior portion that extends between the opening defined in mow deck 610 and an auger tube base 824 to allow turf clippings leaving mow deck 610 to engage a screw auger 625 seated within auger tube base 824.

Auger support and hood 800 can include auger tube supports 822 providing physical support for an underside of auger tube 620. In some aspects of the disclosed embodiments, an auger hood 720 overlying auger tube 620 can have a free flow gap 826 allowing turf clippings blown above a screw auger 625 to continue partially or wholly along auger hood 720 through free flow gap 826. Accordingly, free flow gap 826 provides a path for airflow from top-discharge deck coupling 630 above screw auger 625 to a second end of auger tube 620. This enables turf clippings moving rapidly within an airflow vortex from having to be stopped by contact with screw auger 625, enhancing efficiency of the transfer of turf clippings through the auger tube 620 and auger hood 720. Turf clippings conveyed by the airflow through free flow gap 826 can therefore enter auger support and hood 800 at deck coupling hood 830 and exit at a second end through free flow gap 826. In various embodiments, the shape of free flow gap 826 can be designed for efficient transport of grass clippings from the deck toward the top of the auger tube 620. For example, if the initial motion of material leaving the mow deck (e.g., mow deck 110) is approximately parabolic, relevant portion(s) of deck coupling hood 830 and/or auger hood 720 can also comprise segment(s) of a parabolic arc or otherwise be high enough to allow material to flow freely without redirecting material, thereby reducing any additional energy required to transport material from the mow deck to the top of the auger tube 620. Additional shape variations can be applied to deck coupling hood 830 and/or auger hood 720, for example, based on modeling and/or testing of the flow of air and material through auger tube 620. Based on testing of prototypes, for lighter material, a substantial portion of the material will be carried through free flow gap 826 along the entire length of the auger tube 620, while other materials, after falling to screw auger 625, can be brought the remainder of the distance to the top of the auger tube 620 by screw auger 625 directly (e.g., via physical contact between screw auger 625 and the material) or indirectly (e.g., wherein material is moved by air flowing around or near screw auger 625) (see, e.g., FIG. 28, discussed infra).

Figure 9:
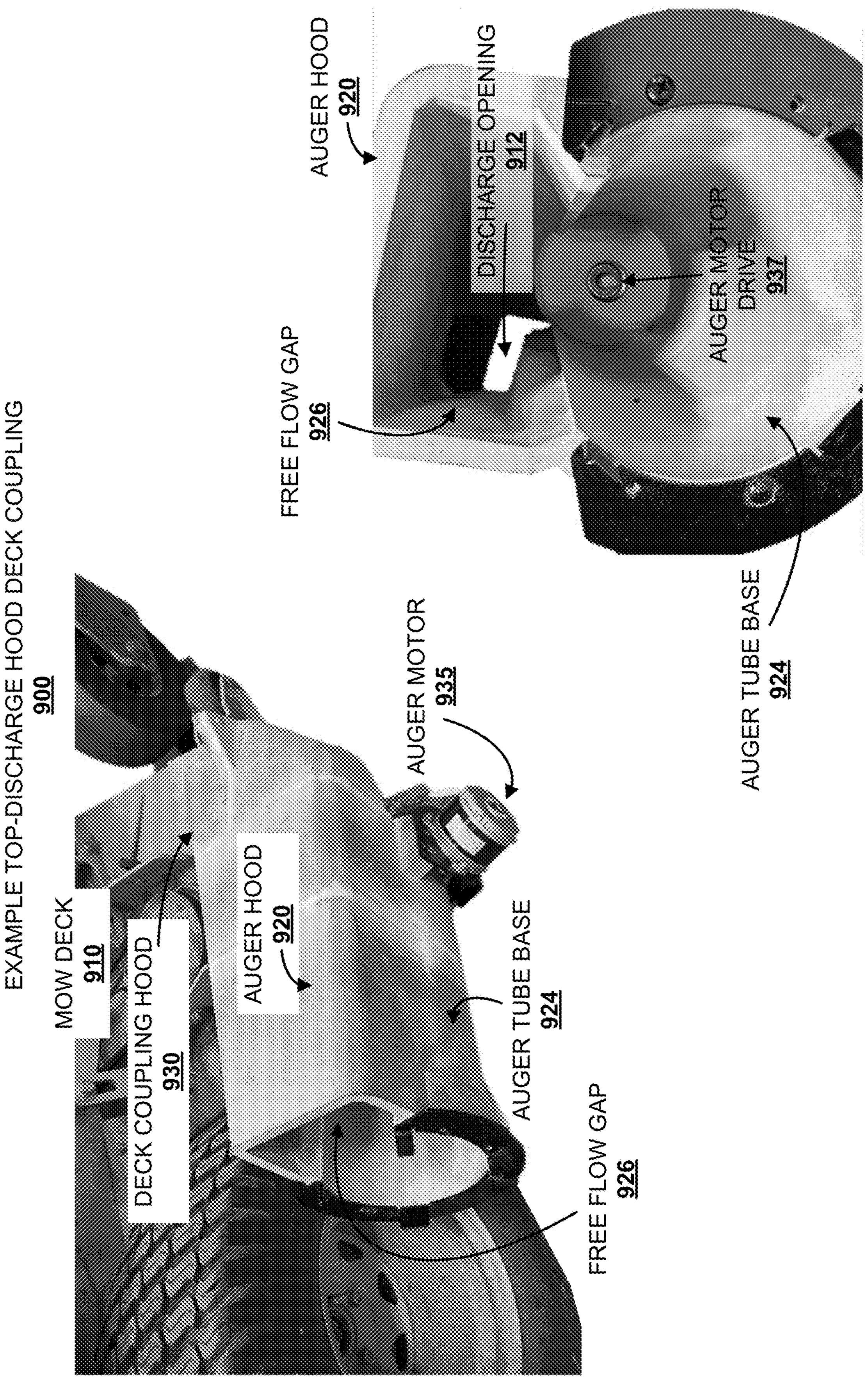
FIG. 9 provides a perspective view and axial view of a top discharge auger coupling to secure an auger to a mow deck in an additional aspect of the disclosed embodiments.

FIG. 9 depicts an example top-discharge hood deck coupling 900 according to still further aspects of the disclosed embodiments. As shown in the upper left image of FIG. 9, deck coupling 900 includes a deck coupling hood 930 that extends to and covers a top-discharge opening defined in a mow deck 910 of a mowing apparatus. Deck coupling hood 930 conveys turf clippings from the mow deck 910 into an auger tube base 924 and an auger hood 920. An auger device can be seated within auger tube base 924 and coupled to an auger motor 935 by way of a bearing, one or more gears, or other coupling to a driveshaft output of auger motor 935. Turf clippings conveyed from deck coupling hood 930 onto the auger can be transferred by the auger out from deck coupling hood 930. A free flow gap 926 within auger hood 920 overlies the auger and allows turf clippings conveyed by an airflow to bypass the auger within auger hood 920, or to drop down onto the auger beyond deck coupling hood 930, or the like.

While FIG. 9 illustrates an auger motor 935 proximate to mow deck 910 and a lower end of the auger tube, in various embodiments, different techniques can be employed to rotate an auger in various embodiments discussed herein. A dedicated auger motor (e.g., such as auger motor 935, etc.) can be employed in various embodiments, such as electrically-powered embodiments (e.g., powering the auger motor with the same battery/ies used to power the outdoor power equipment, etc.) and/or some embodiments driven via an internal combustion engine (e.g., using gasoline, diesel, etc.), such as via electricity generated by a magneto of the internal combustion engine (e.g., on larger outdoor power equipment, such as commercial mowing apparatuses, etc.), which can be selected to provide sufficient current (e.g., 30 A or more, 45 A or more, etc.) to power all relevant electrical systems of the outdoor power equipment, including the auger system. In such embodiments, the auger (e.g., screw auger 125, etc.) can be driven at its lower end by a motor, for example via a motor located proximate to the deck and lower end of the auger tube, similarly to auger motor 935. Alternatively, the auger (e.g., 125, etc.) can be driven at its upper end by a motor, for example, an auger motor located proximate to a top end of the auger tube (e.g., see, for example, FIGS. 26 and 28-30, discussed infra). Embodiments employing an auger motor can have the motor shaft perpendicular to the auger (e.g., driving the auger via worm/bevel/hypoid gearing, etc., which can provide a gear ratio to rotate the auger slower than the motor shaft, etc.), can have a shaft parallel to the axis of rotation of the auger, or can have the motor shaft coaxial with the auger (e.g., wherein planetary gearing, etc. can be employed to drive the auger at a reduced speed relative to the motor shaft if desired, etc.).

Alternatively, an auger can be driven by an internal combustion engine of the outdoor power equipment, such as by coupling rotation of the auger to another component driven by the internal combustion engine (e.g., a mow spindle of the mow deck), such as via gearing, belt(s), hydraulic motor(s), etc. In one illustrative example, a first hydraulic motor can be driven by a mow spindle of the mow deck, and a second hydraulic motor can be hydraulic linked to and driven by the first hydraulic motor, wherein the second hydraulic motor can drive the auger.

In various embodiments, a motor and/or gear ratio can be selected based on target operating characteristics of the auger system and/or outdoor power equipment comprising the auger system, such as power available for operating the auger system, rotation speed of the motor (or other component(s) driving the auger), rotation speed(s) (e.g., within a selected range) of the auger, torque, etc. The example embodiment shown in FIGS. 23-31 employed a 3 kW motor with a 10:1 gear reduction, but various embodiments can employ greater or lesser power motors (e.g., 0.5-3.5 kW, 1 kW-3 kW, etc.) and greater or lesser gear ratios (e.g., 5:1-12:1, 6:1-10:1, etc.).

The lower right image of FIG. 9 provides an axial interior view of deck coupling 900. Discharge opening 912 is in fluid communication with a discharge opening in the mow deck. Air and material carried by the air enter deck coupling 900 via discharge opening 912. An auger seated within auger tube base 924 can mechanically couple to auger motor drive 937 and be rotated by auger motor 935. As is evident from the axial interior view, free flow gap 926 provides a path above an auger seated within auger tube base 924 for turf clippings and other material within an air vortex to be transferred along a length of, though above, the auger.

Figure 10:
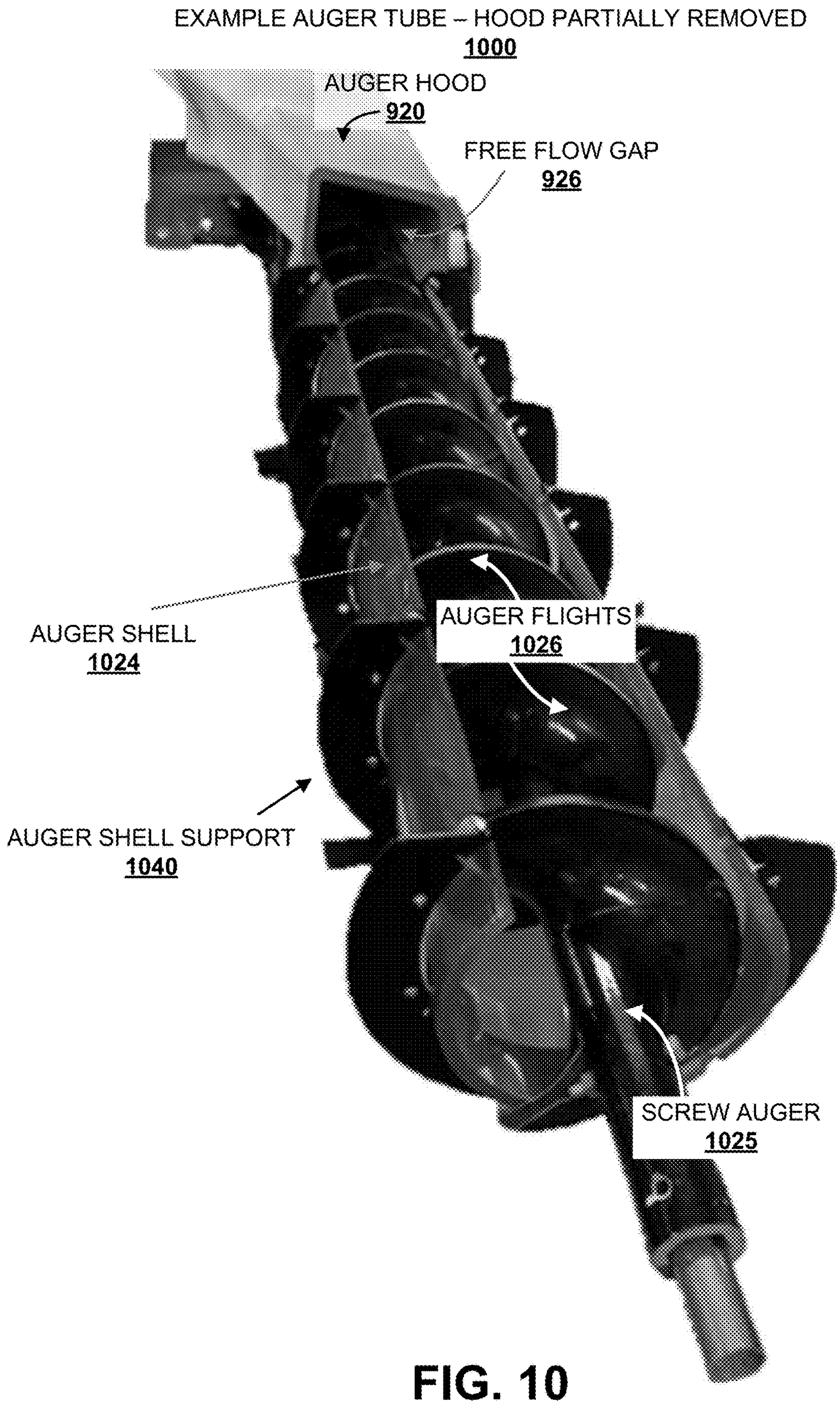
FIG. 10 is an image of an auger and auger housing with an air gap along a portion of a circumference of the auger housing in additional aspects of disclosed embodiments.
Figure 14:
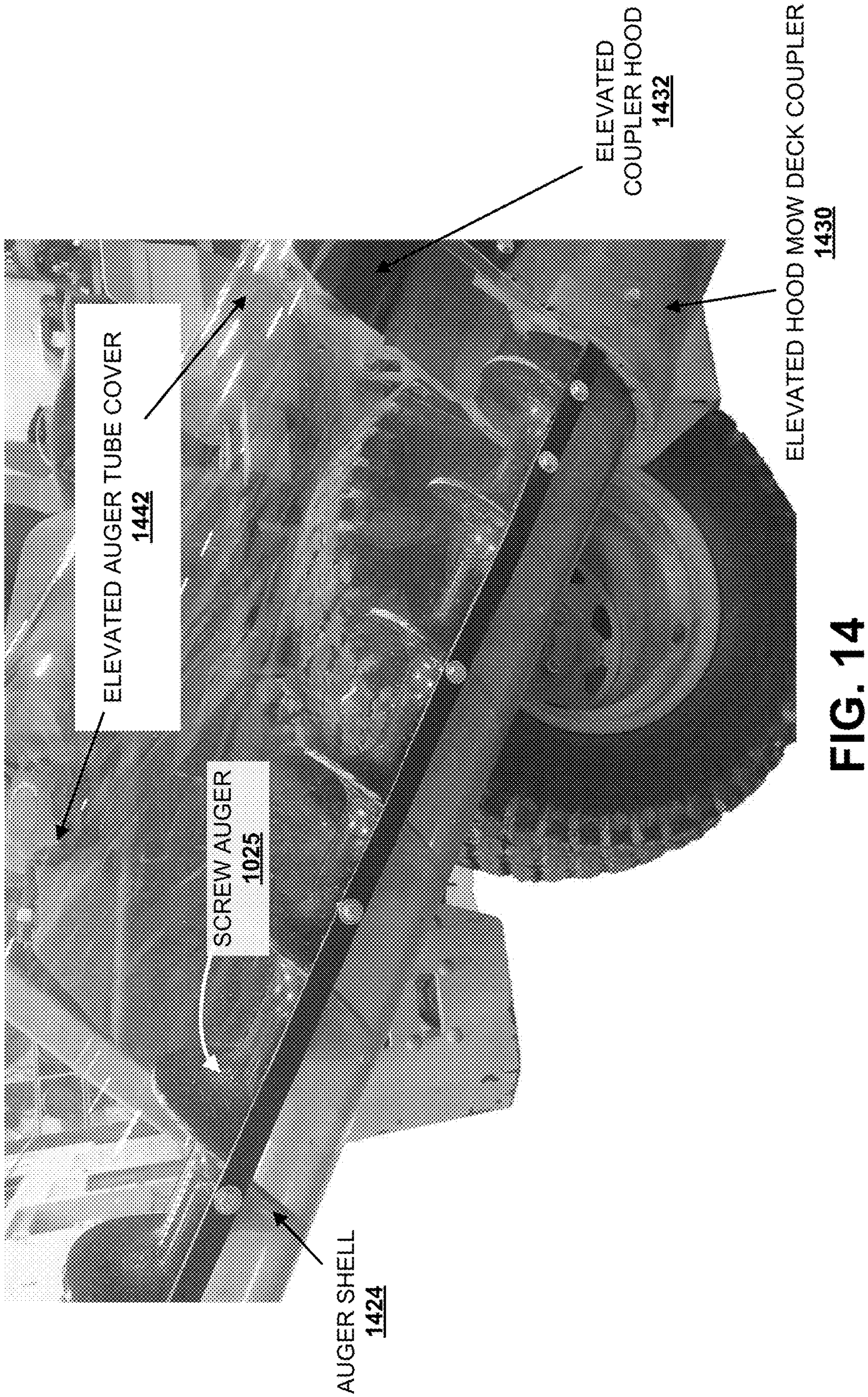
FIG. 14 is an image of an auger housing with an elevated hood according to one or more other embodiments.
Figure 15:
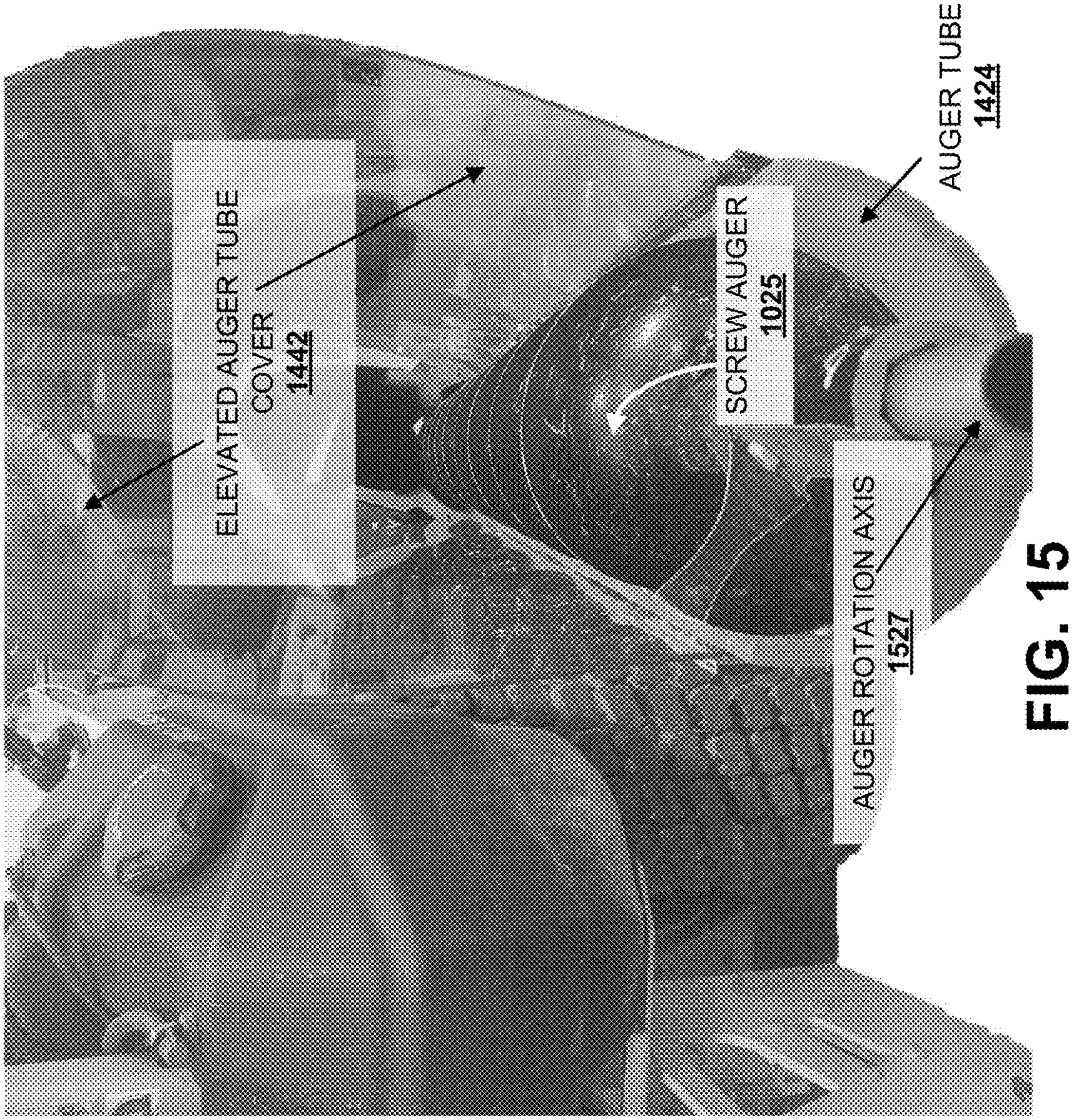
FIG. 15 is a longitudinal view of the auger housing with elevated hood.

In some embodiments, an auger tube that houses a disclosed auger can have an open top that exposes an upper portion of an auger to the air flow within free flow gap 926 (e.g., see FIGS. 10, 14 and 15, infra). This allows material starting within free flow gap 926 above the auger—within deck coupling 900 for example—with insufficient momentum to continue through free flow gap 926 to a second end of the auger tube to drop onto the auger at some position along the length of the auger. Such material can physically couple to flights of the auger at some distance beyond deck coupling 900 and be conveyed to the second end of the auger tube by the auger.

Figure 9A:
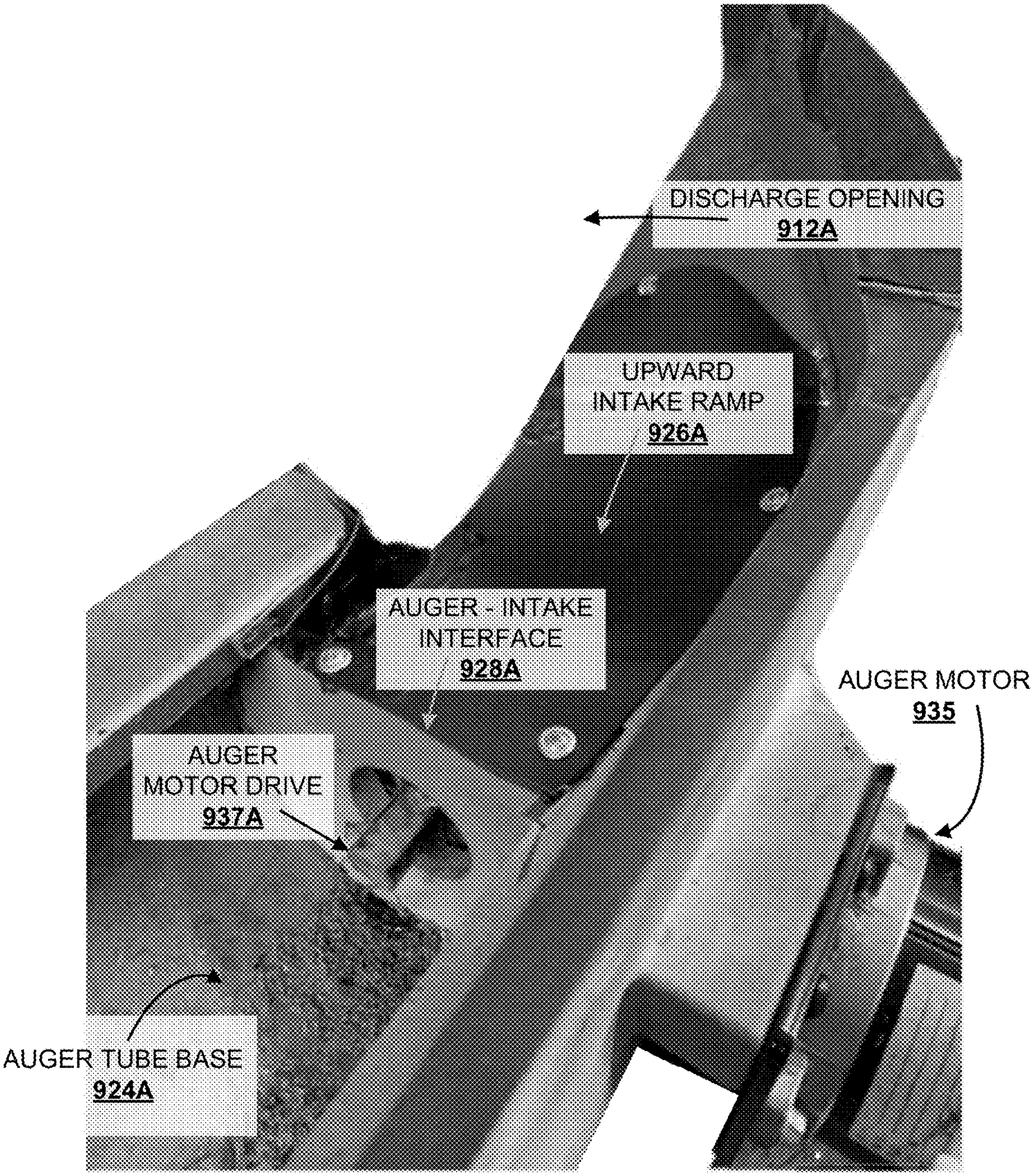
FIG. 9A provides an overhead interior view of the top discharge auger coupling of FIG. 9 with top removed.

FIG. 9A shows a perspective overhead view 900A of deck coupling 900 with a cover removed to highlight one or more aspects of the disclosed embodiments. As shown, auger tube base 924A can provide a seat into which an auger can be physically coupled to auger motor drive 937A. Auger motor drive 937 is mechanically powered by auger motor 935 and will rotate the auger when so powered.

Auger tube base 924A provides a surface at a bottom of an auger—intake interface 928A, which effectively serves as an interchange between discharge opening 912A and the auger seated within auger tube base 924A. Auger—intake interface 928A serves as an endpoint for an upward intake ramp 926A over which turf clippings, leaves, vegetation, etc., entering through discharge opening 912A exit a mow deck of a turf maintenance apparatus and engage the auger, or continue along a free flow gap 926 (or both) as discussed above at FIG. 9, supra. In one or more aspects of the disclosed embodiments, a depth of auger—intake interface 928A to a bottom of auger tube base 924A can be in a range from about 3 in to about 6 in (e.g., 4 in., 5 in., etc.).

Upward intake ramp 926A provides a smooth surface and relatively slow curvature to minimize disrupting the momentum of turf clippings exiting a mow deck and entering deck coupling 900. Accordingly, upward intake ramp 926A can reduce clogging of turf clippings at discharge opening 912A by avoiding a rapid stopping of turf clippings at an input of deck coupling 900, instead providing a smoothly rising ramp and gradual curvature to promote continuing the momentum of turf clippings onto the auger at auger—intake interface 928A or even above the auger through free flow gap 926. Additionally, one or more curved surfaces or baffles can be employed to redirect the horizontal motion of material to be substantially perpendicular to the horizontal component of the axis of the auger, so as to minimize loss of momentum and energy of material that would result from a sharp transition between the horizontal motion of the material as it leaves the mow deck 910 and motion along the direction of the screw auger 1025.

FIG. 10 shows an overhead perspective view 1000 of an auger and auger tube with an auger tube hood removed, highlighting additional aspects of the disclosed embodiments. An auger tube hood (or auger shell hood) as shown in FIG. 10, infra, can continue from free flow gap 926 at an output of auger hood 920 along a length of screw auger 1025 in various embodiments. As shown, the auger tube is labeled as an auger shell 1024 is not a complete cylinder surrounding an entire circumference of screw auger 1025. Rather, auger shell 1024 is open along a portion of the circumference of screw auger 1025 forming a hollow partial shell rather than a continuous tube. The loss in structural integrity of the hollow partial shell as compared to the continuous tube can be structurally bolstered by one or more auger shell supports 1040.

The opening of auger shell 1024 physically exposes auger flights 1026 to a free flow gap (extending from free flow gap 926 of auger hood 920) underneath an auger shell hood (see, e.g., FIGS. 10, 14, 15, infra, among others) that covers screw auger 1025 and auger shell 1024. Turf clippings and other material exiting auger hood 920 through free flow gap 926 and above screw auger 1025 can still drop onto auger flights 1026 if such clippings have insufficient momentum to continue along an entire length of auger shell 1024. Rotation of auger flights 1026 will then carry such turf clippings that fall upon screw auger 1025 somewhere beyond auger hood 920 to the end of auger shell 1024 instead.

By opening free flow gap 926 and providing a path above screw auger 1025 for turf clippings to continue partway or wholly above screw auger 1025 along the length of auger shell 1024, congestion of turf clippings within auger hood 920 is reduced and efficient transfer of higher volumes of clippings, leaves and vegetation is promoted by the disclosed embodiments. In addition, heavy, wet or dense material that cannot be sustained aloft by an air vortex within free flow gap 926 can be easily conveyed by screw auger 1025 from a first end to a second end thereof, whereas lightweight material held aloft by the air vortex need not congest the heavier material within auger hood 920 or at least a portion of auger shell 1024 but can travel above screw auger 1025 at least a portion of its length.

Figure 11:
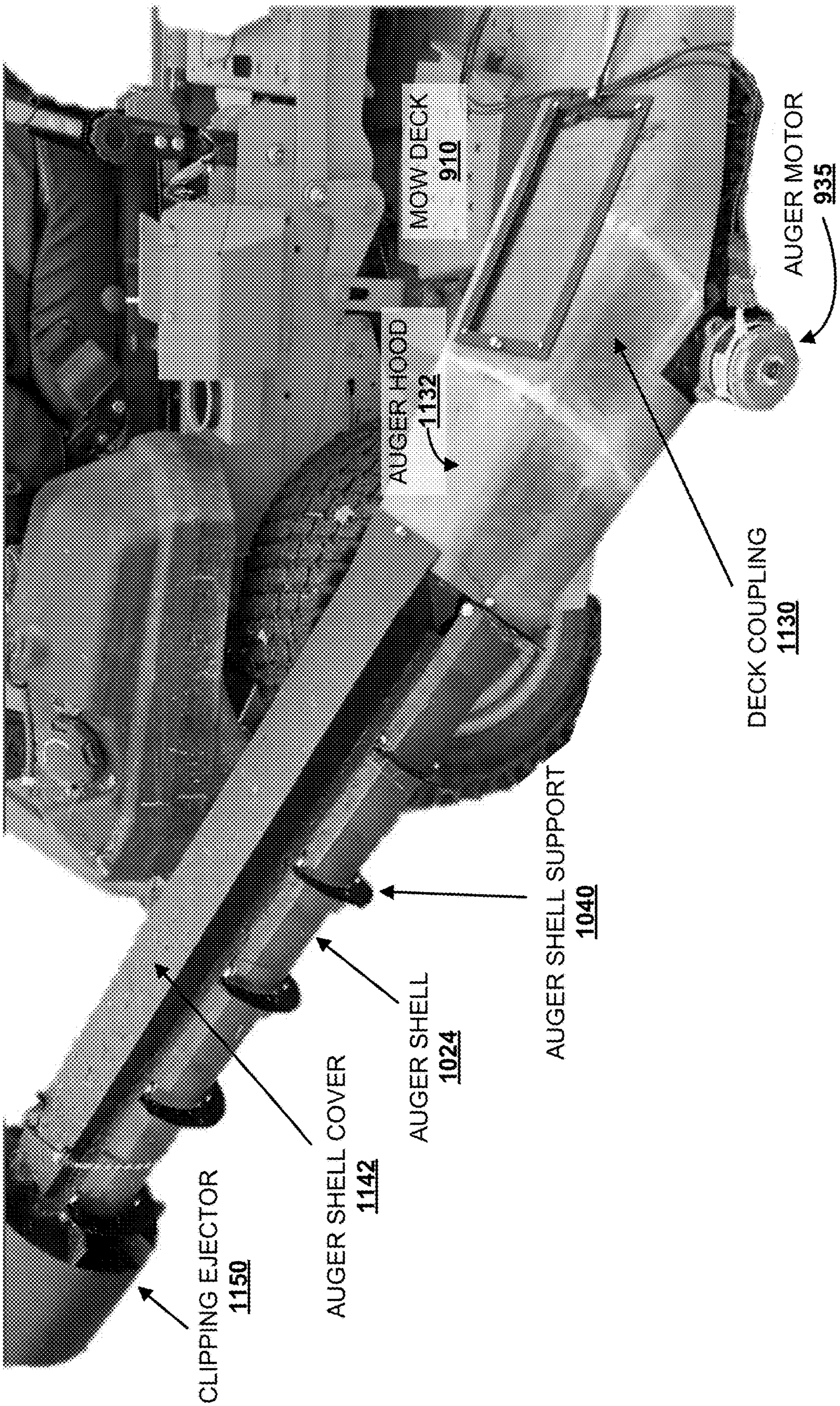
FIG. 11 is a side view of a top discharge coupler and an auger housing according to additional embodiments.

FIG. 11 illustrates an external view of an example auger apparatus 1100 according to further aspects of the disclosed embodiments. Auger apparatus 1100 is presented from a side perspective view in FIG. 11. Shown is a deck coupling 1130 that connects auger apparatus 1100 to a mow deck 910 of a turf maintenance apparatus. An auger shell 1024 extends outward from deck coupling 1130 away from the mow deck 910 conveying turf clippings, leaves, vegetation and other material expelled from mow deck 910 toward a clipping ejector 1150 at a far end of auger shell 1024. The material can be removed from clipping ejector 1150 to be expelled onto the ground, or output into a receptacle or bag secured to the turf maintenance apparatus. In various embodiments, clipping ejector 1150 can be driven by the same motor, mow spindle, etc. as the auger and rotate with the auger, can be driven with the auger but rotate with a different speed/torque (e.g., coupled to the auger via planetary gearing, etc., coupled to the same motor as the auger but via different gearing, etc.), or can be driven separately from the auger (e.g., by a separate motor, etc.).

Deck coupling 1130 is secured to mow deck 910 at a first end and secured to auger shell 1024 and auger shell cover 1142 at a second end of deck coupling 1130. Auger shell supports 1040 can provide structural support for auger shell 1024 as described above at FIG. 10, supra. Auger shell cover 1142 maintains an air gap above an auger within auger shell 1024. The air gap can be extended to clipping ejector 1150 in one or more embodiments, allowing turf clippings to be transported from deck coupling 1130 to clipping ejector 1150 by the auger within auger shell 1024 or the air gap within auger shell cover 1142, or both.

Figure 12:
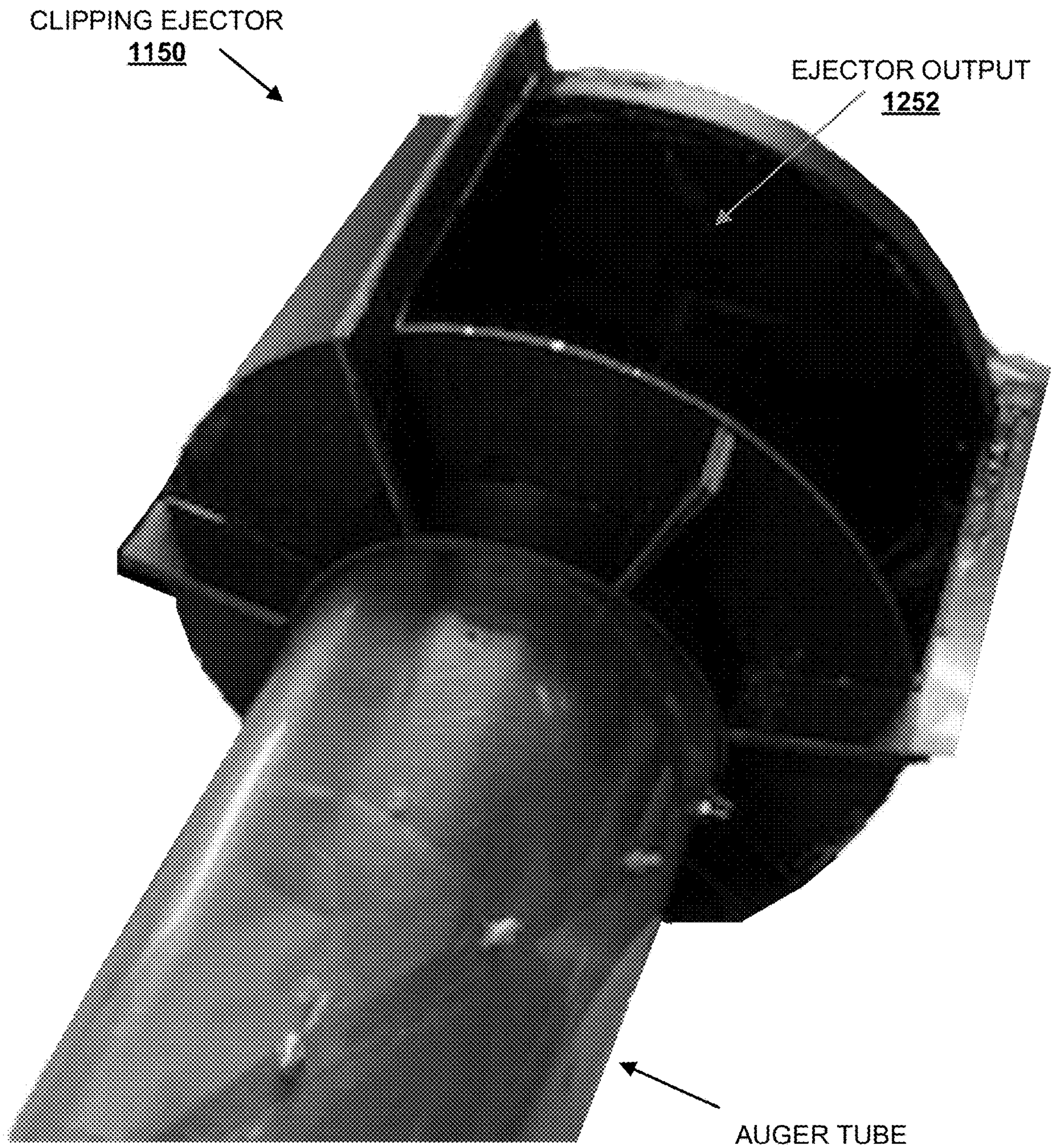
FIG. 12 is an image of an ejection housing for expelling turf clippings from an auger in yet additional embodiments.

FIG. 12 provides an image of an overhead perspective view 1200 of a clipping ejector 1150 at a terminating end of an auger apparatus, according to one or more additional embodiments of the present disclosure. The auger apparatus includes an auger tube 1224 having clipping ejector 1150 at and end thereof. Clipping ejector 1150 includes an ejector output 1252 for expelling turf clippings from auger tube 1224 into a target direction adjacent an opening in clipping ejector 1150 defined by ejector output 1252.

Figure 13:
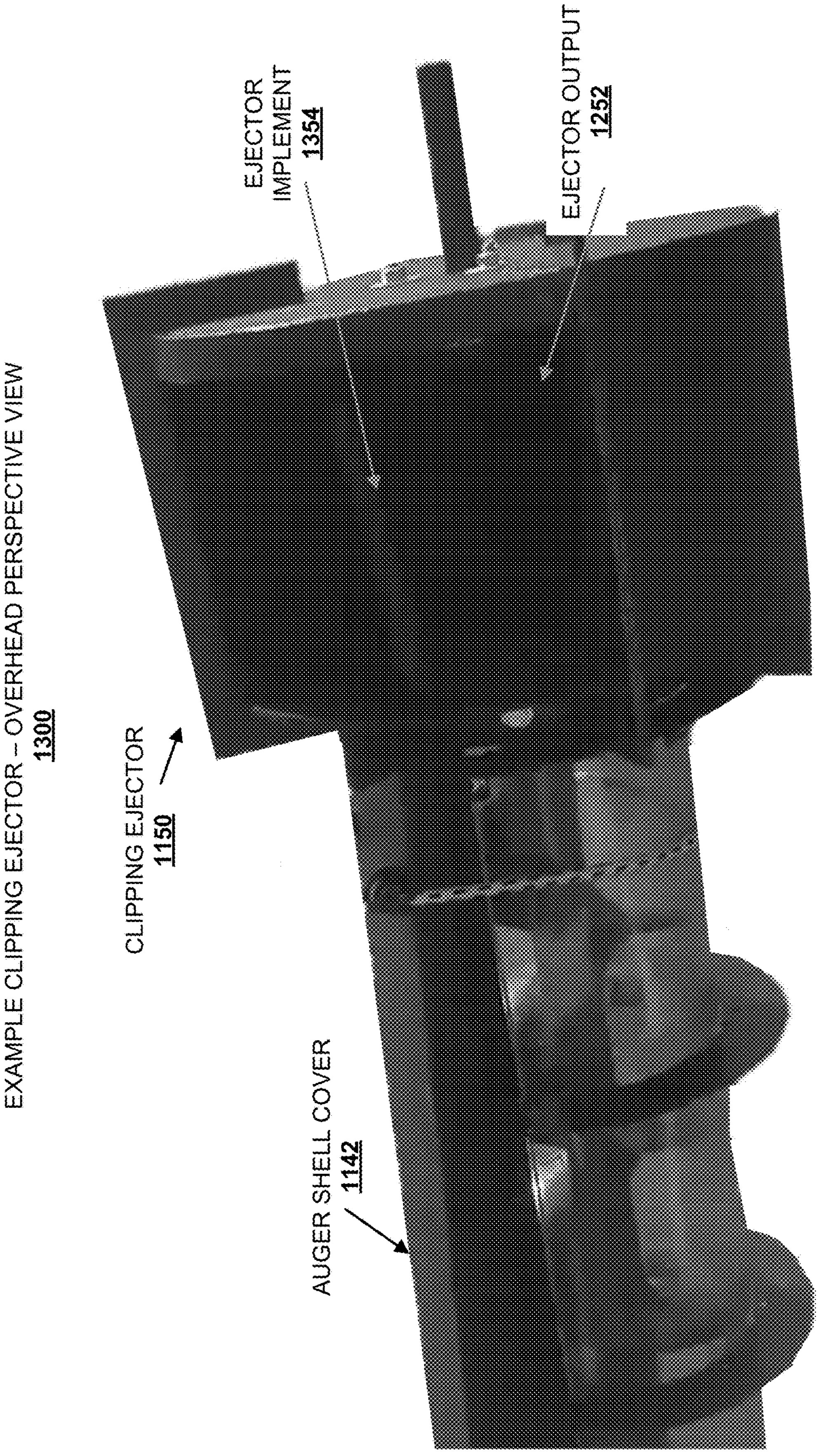
FIG. 13 is a perspective view of the ejection housing of FIG. 12.

FIG. 13 is an overhead view 1300 of clipping ejector 1150 illustrating additional aspects of the disclosed embodiments. An auger within an auger shell or auger tube output turf clippings and material into clipping ejector 1150, when the auger is rotating. Likewise, turf clippings and other lightweight material blown through a free air gap under auger shell cover 1142 is also output into clipping ejector 1150. An ejector implement 1354 terminates the end of the auger and includes an ejection surface that rotates within clipping ejector 1150. In some aspects, ejector implement 1354 can be secured to a rotation axis of the auger and rotate in conjunction with the auger. In other aspects, ejector implement 1354 can rotate on a separate axis independent from the auger. In a further embodiment, the ejection surface that rotates within clipping ejector 1150 can have a length greater than a radius of auger flights of the auger. Accordingly, a far edge of the ejection surface can rotate with greater angular velocity than the auger flights (even in embodiments where ejector implement 1354 is rotationally coupled to the auger), and provide sufficient momentum to expel turf clippings several feet from clipping ejector 1150 (e.g., see FIG. 21, infra).

FIG. 14 shows a side view of an elevated auger apparatus 1400 according to alternative or additional aspects of the disclosed embodiments. Elevated auger apparatus 1400 can comprise an auger shell 1424 that supports a screw auger 1025 configured to rotate within the auger shell 1424. In one or more aspects, auger shell 1424 can encompass about half a circumference of screw auger 1025. However, the subject disclosure is not so limited and in other aspects auger shell 1424 can encompass from about one quarter to about three quarters of the circumference of screw auger 1025. A cross-sectional geometry of auger shell 1424 can be semi-circular, or approximately circular, in some embodiments, or can have an outward chamfer at upper edges of auger shell 1424 departing from semi-circular geometry.

Auger shell 1424 and screw auger 1025 can extend from an elevated hood mow deck coupler 1430. The elevated coupler hood 1432 covers screw auger 1025 and can provide a large air gap above screw auger 1025 and under an elevated auger tube cover 1442. In an aspect, a height of elevated auger tube cover 1442 above a rotation axis of screw auger 1025 can be about a diameter of screw auger 1025 or greater. In another aspect, the height of elevated auger tube cover 1442 above the rotation axis can be in a range from one to two diameters of screw auger 1025. In still another aspect, the height of elevated auger tube cover 1442 above the rotation axis can be between about two diameters and about three diameters of screw auger 1025. In another aspect, the height of elevated auger tube cover 1442 above the rotation axis can be a range from about twelve inches to about eighteen inches (e.g., 13 in., 14 in., 15 in., 16.5 in., or any suitable value or range there between).

According to various embodiments of the present disclosure, an auger disclosed herein can have a diameter. This includes screw auger 1025 but can also include other auger apparatuses disclosed herein. The diameter of the auger can be measured from a first edge of auger flights surrounding the rotation axis of the auger on a first side of the auger (e.g., a bottom side of the auger) to a second edge of auger flights surrounding the rotation axis of the auger on a second side of the auger opposite the first side of the auger (e.g., a top side of the auger). In an embodiment, the diameter of the auger can have a value that is in proportion to a width of a mow deck of an associated mowing apparatus, such as mow deck 910. For instance, where a width of the mow deck is 60 inches, the auger can have a diameter that has a ratio to the width of the deck that has a given value or is within a given range of values. For example, the mow deck width to auger diameter ratio can be 8:1, 10:1, 12:1, or any suitable range there between (e.g., a range from 8:1 to 12:1). In other embodiments, the diameter of the auger can be in a range from about 4 inches (") to about 10", or any suitable value or range there between (e.g., 4", 5", 6", 7", 8" . . . 10"). In some embodiments, a rotation speed of auger can be correlated at least in part with the auger diameter. For instance, in an embodiment, a lower auger diameter (e.g., 4", 5", 6", etc.) can be associated with a relatively high auger rotation speed whereas a higher auger diameter (e.g., 9", 10", 11", and so forth) can be associated with a relatively low auger rotation speed.

Figure 15A:
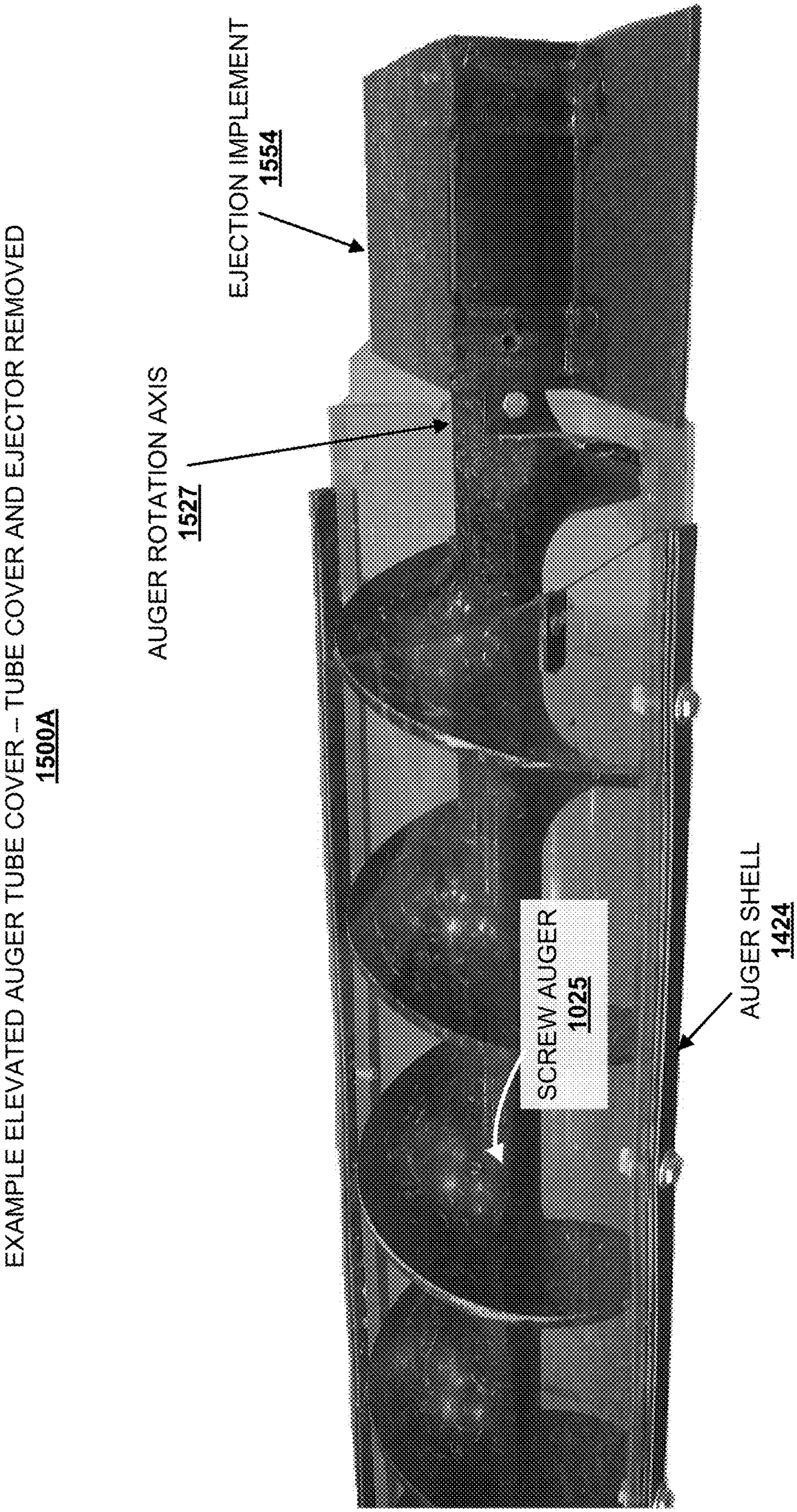
FIG. 15A is an overhead view of the auger and an ejection implement terminated an end of the auger.

FIG. 15 depicts a longitudinal axial view 1500 of elevated auger apparatus 1400 along an auger rotation axis 1527 thereof, in further aspects of the disclosed embodiments. Axial view 1500 indicates the relative height of elevated auger tube cover 1442 above screw auger 1025. FIG. 15A depicts an overhead view 1500A of elevated auger apparatus 1400 with an ejection implement 1554 terminating an end of screw auger 1025. In the embodiment shown in overhead view 1500A, ejection implement 1554 is secured to auger rotation axis 1527 and rotates together with screw auger 1025. Turf clippings and other material conveyed along a length of screw auger 1025 in conjunction with the rotation of screw auger 1025 can be expelled from auger shell 1424 in a direction perpendicular (or approximately perpendicular) from auger rotation axis 1527. In further embodiments, the direction can be controlled by an output port formed within an ejection housing as described herein (see, e.g., FIGS. 12 and 13, supra as well as FIGS. 19, 20 and 21 infra).

In one or more embodiments, ejection implement 1554 can have one or more ejection surfaces. Examples include one ejection surface (also referred to as ejection blades, or the like), two ejection surfaces (as shown in FIG. 15A), three ejection surfaces (as shown in Figures ###, discussed infra), four ejection surfaces, up to six ejection surfaces. The blades can be equally spaced about a circumference of auger rotation axis 1527 of screw auger 1025, and can comprise flat surfaces that project radially outward from the rotation axis 1527, can be flat surfaces parallel to but offset from a surface projecting radially offset from the rotation axis 1527 (e.g., as in FIG. 15A), or can be curved surfaces projecting outward from the rotation axis 1527 or a point offset from but proximate to the rotation axis 1527. In an embodiment (s), an end of screw auger 1025 to which ejection implement 1554 is secured can define at least one torque-transfer surface. The torque-transfer surface can be a smooth cylinder in some embodiments (e.g., see FIG. 15, supra) or can be a non-smooth surface. A non-smooth surface can define one or more surface segments about a cross-section of the end of auger rotation axis 1527. For instance, the end of auger rotation axis 1527 can have a polygonal cross-section. Examples include a (regular or irregular) hexagonal cross-section, heptagonal cross-section, pentagonal cross-section, a rectangular cross-section, or the like. In such embodiment, ejection implement 1554 can have a hollow sleeve portion conformally fitting the multi-segmented cross-section that slides over the end of auger rotation axis 1527 to secure ejection implement 1554 to the end of auger rotation axis 1527. In other embodiments, an ejection blade can be secured independently to a first torque-transfer surface segment of the cross-section, and a second ejection blade can be secured to a second torque-transfer surface segment of the cross section. A third ejection blade can be secured to a third torque-transfer surface, and so forth.

Figure 15B:
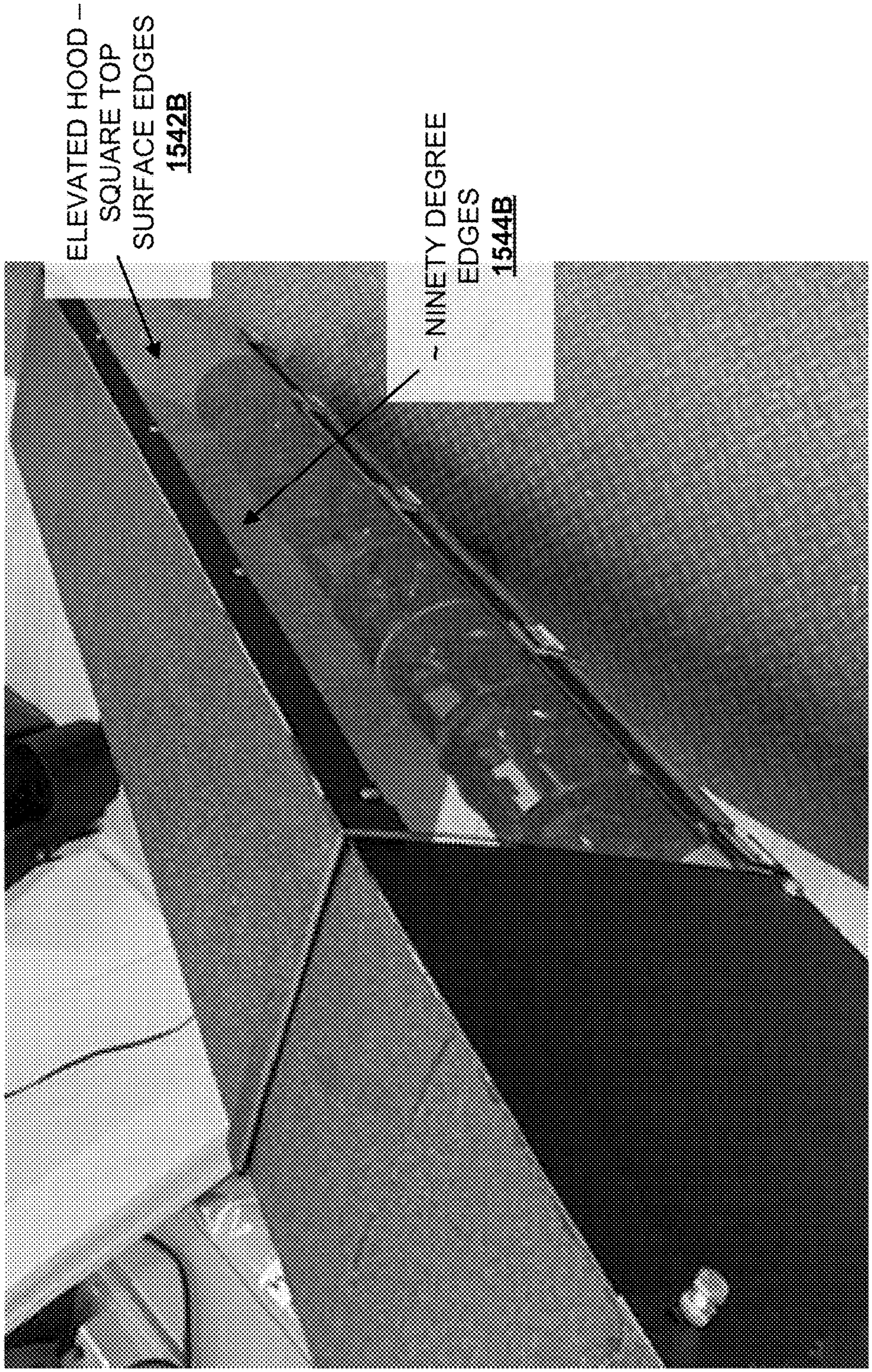
FIG. 15B illustrates an auger housing having an upper surface with approximately flat shape and square or approximately square outer edge.
Figure 15C:
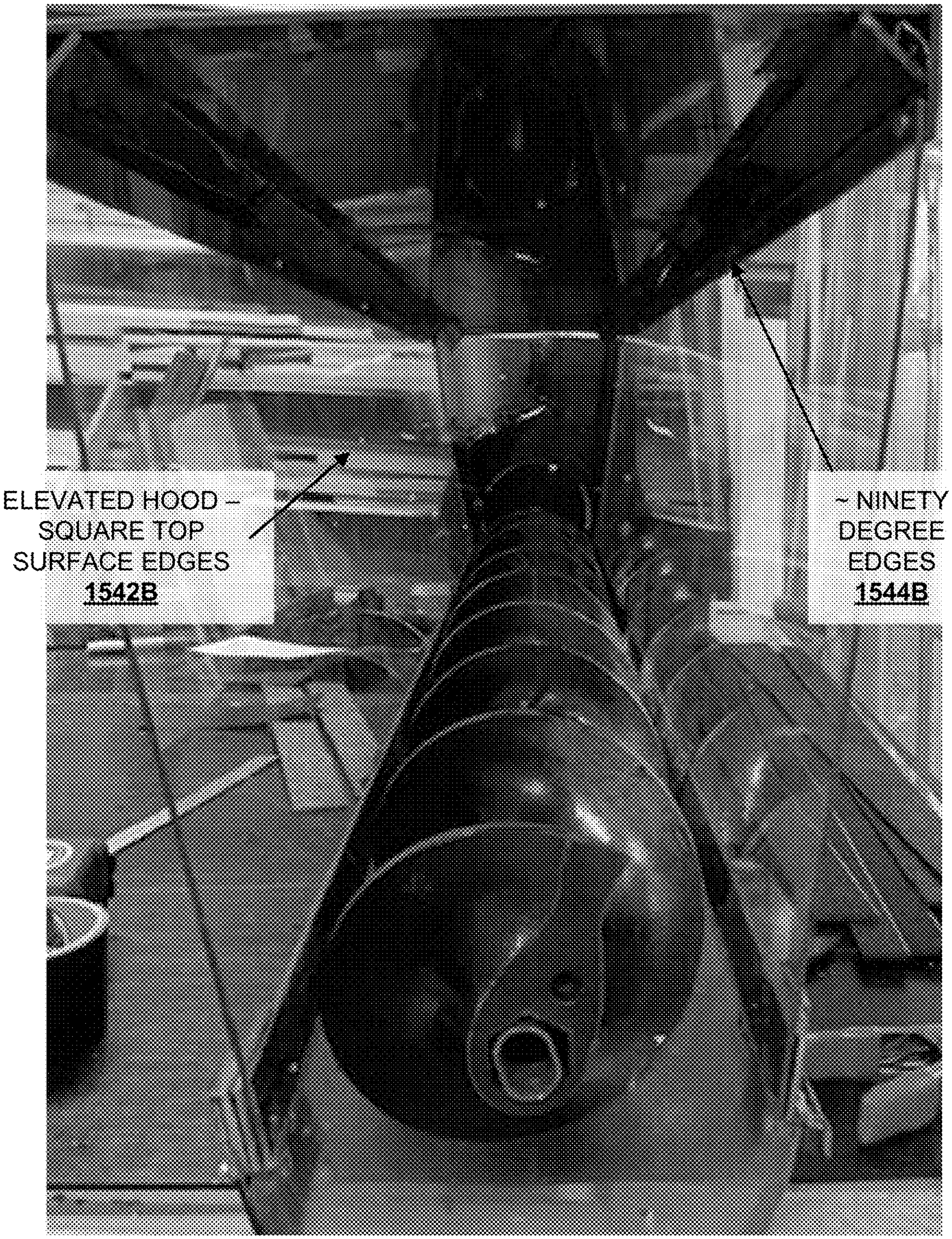
FIG. 15C depicts a longitudinal internal view of the auger housing of FIG. 15B in one or more aspects of the disclosed embodiments.

FIG. 15B depicts an alternate elevated auger tube cover 1500B in further aspects of the disclosed embodiments. Elevated auger tube cover 1500B can have a top surface 1542B that is flat or substantially flat in one or more embodiments. Moreover, one or more top surface edges 1544B can have a ninety degree or substantially ninety degree edge with a sidewall surface. In some embodiments, the ninety degree edge 1544B can be at east at an edge between an outer surface and top surface 1542B as shown. FIG. 15C shows a longitudinal internal view 1500C with substantially ninety degree edges 1544B with both sidewall surfaces and the top surface 1542B.

Figure 16:
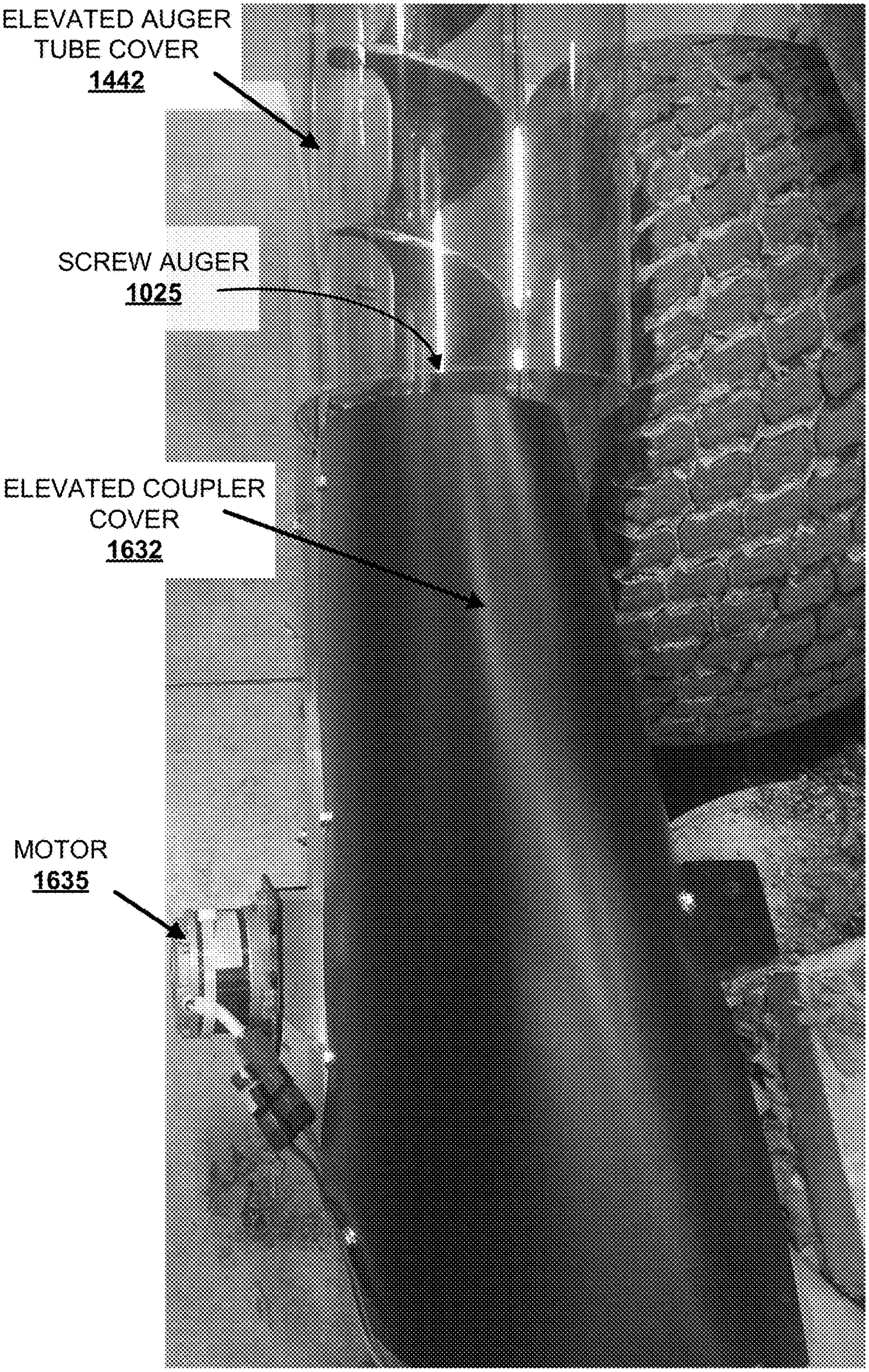
FIG. 16 is an overhead view of an example mow deck coupler for an auger housing with elevated hood.

FIG. 16 depicts an overhead view 1600 of an elevated coupler cover 1632 overlying elevated hood mow deck coupler 1430. Elevated coupler cover 1632 connects to elevated auger tube cover 1442 and guides turf clippings output by a mow deck into elevated hood mow deck coupler 1430 toward the elevated auger tube cover 1442. A screw auger 1025 powered by motor 1635 receives turf clippings, leaves and other material both near an interface of screw auger 1025 and elevated hood mow deck coupler 1430 and along a length of screw auger 1025. The overhead height of elevated coupler cover 1632 and elevated auger tube cover 1442 provides an increased volume through which turf clippings can be transferred from the mow deck onto and along screw auger 1025, minimizing bottlenecks for transferring clippings and promoting efficient transfer of large volumes of turf clippings and other vegetation. In various embodiments, elevated coupler cover 1632 or a similar cover can provide a transition between a mow deck and an auger tube that can allow the auger tube to receive material from the mow deck at a variety of heights of the mow deck. For example, the auger tube can have an upper end at a fixed height from the ground and a lower end that can move upward or downward with the mow deck, with the auger tube rotating about the fixed height upper end as the mow deck is raised or lowered. Instead of a rigid connection to the mow deck, the auger tube can be connected to elevated coupler cover 1632 or a similar element in a manner that maintains the bottom end of the auger tube at the same height as or a fixed vertical displacement from the mow deck, while allowing the auger tube to rotate around the connection to elevated coupler cover 1632, etc. Additionally, while the connection between elevated auger tube cover 1442 and elevated coupler cover 1632 is shown as partially open, in various embodiments, the connection can overlap and/or comprise flexible material to prevent material from escaping through the connection. In other embodiments, the angle of the auger tube can remain fixed, and both the lower end and the upper end of the auger tube can move upward or downward with the mow deck.

Figure 17:
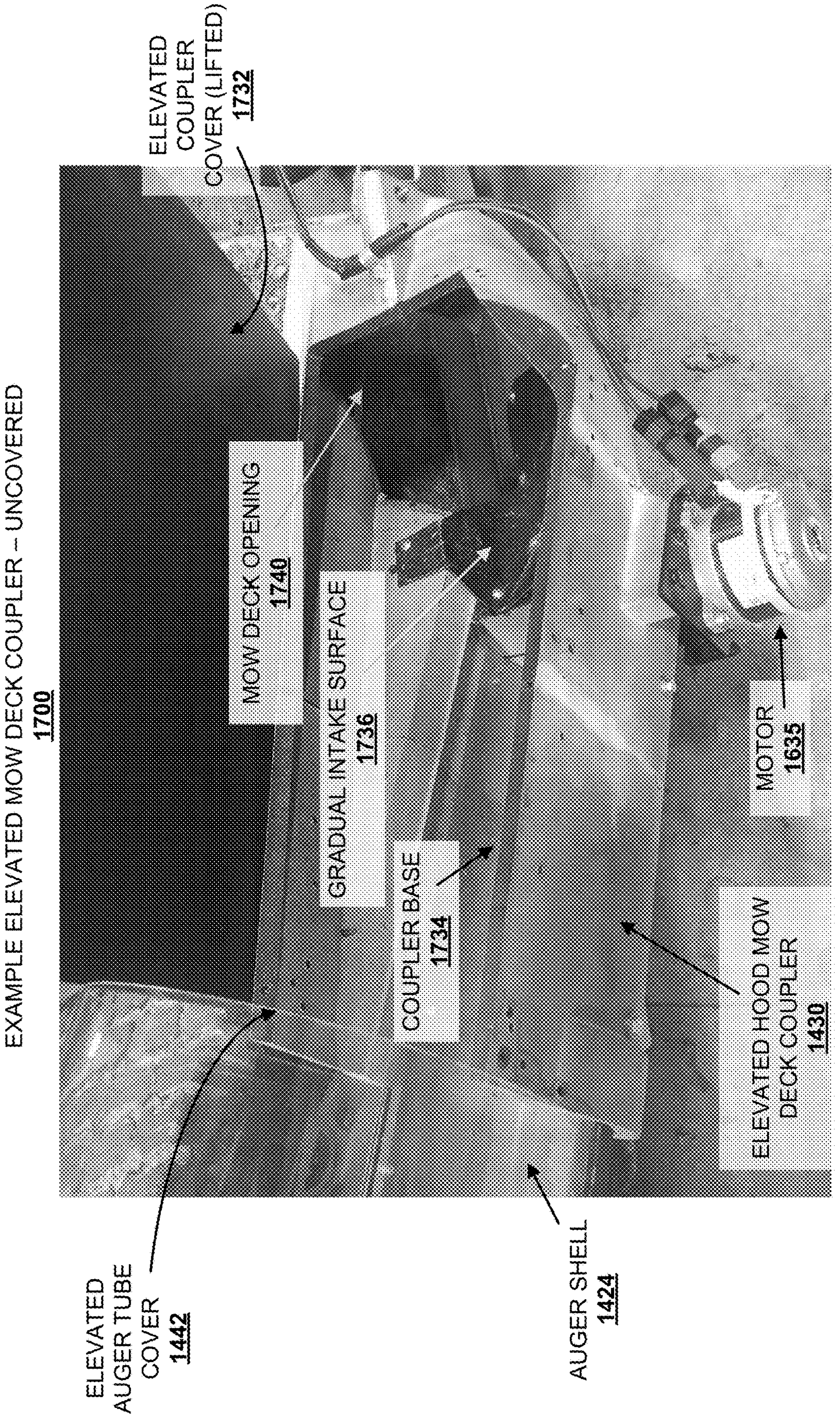
FIG. 17 is an overhead view of an interior of the example mow deck coupler of FIG. 16 with a cover removed.

FIG. 17 provides an uncovered view 1700 of elevated hood mow deck coupler 1430 in one or more embodiments, with elevated coupler cover (lifted) 1732 positioned to expose an interior of elevated hood mow deck coupler 1430. A mow deck opening 1740 is fluidly in communication with an ejection port in a mow deck of a mowing apparatus (e.g., see FIG. 18A, infra). A gradual intake interface 1736 conveys material received into mow deck opening 1740 upward toward auger shell 1424. The upward slope of gradual intake interface 1736 can direct material into a free flow gap along the top of the elevated auger tube cover 1442, such that some lighter material can travel the length of the auger tube in air flowing above the auger, while other material can be pushed to the top of the auger tube by the auger and/or air flowing with and around the auger.

FIG. 18 is a close-up view 1800 of the interior of elevated hood mow deck coupler 1430. Close-up view 1800 shows gradual intake surface 1736 that terminates in a base-intake interface 1836 where gradual intake surface 1736 falls off to a coupler base 1734 where an auger is seated and rotationally coupled to a motor drive 1837. A distance from a floor of coupler base 1734 to a top of base—intake interface 1836 can be in a range from about 4 inches to about 6 inches (e.g., 4.5 inches, 5 inches, 5.5 inches, etc.). The gradual intake surface 1736 and elevated hood mow deck coupler 1430 are adapted to facilitate transfer of a large volume of turf clippings and vegetation to minimize bottlenecks within elevated hood mow deck coupler 1430.

FIG. 18A depicts an example top-discharge mow deck 1800A for an elevated hood mow deck coupler according to further aspects of the disclosed embodiments. Mow deck 1810A is secured to a turf maintenance apparatus as shown, and includes a blade motor 1820A for driving a blade within mow deck 1810A to cut vegetation within mow deck 1810A. A deck-coupler interface 1820A defines an expulsion port to eject turf clippings, leaves, vegetation and so forth from mow deck 1810A.

Figure 19:
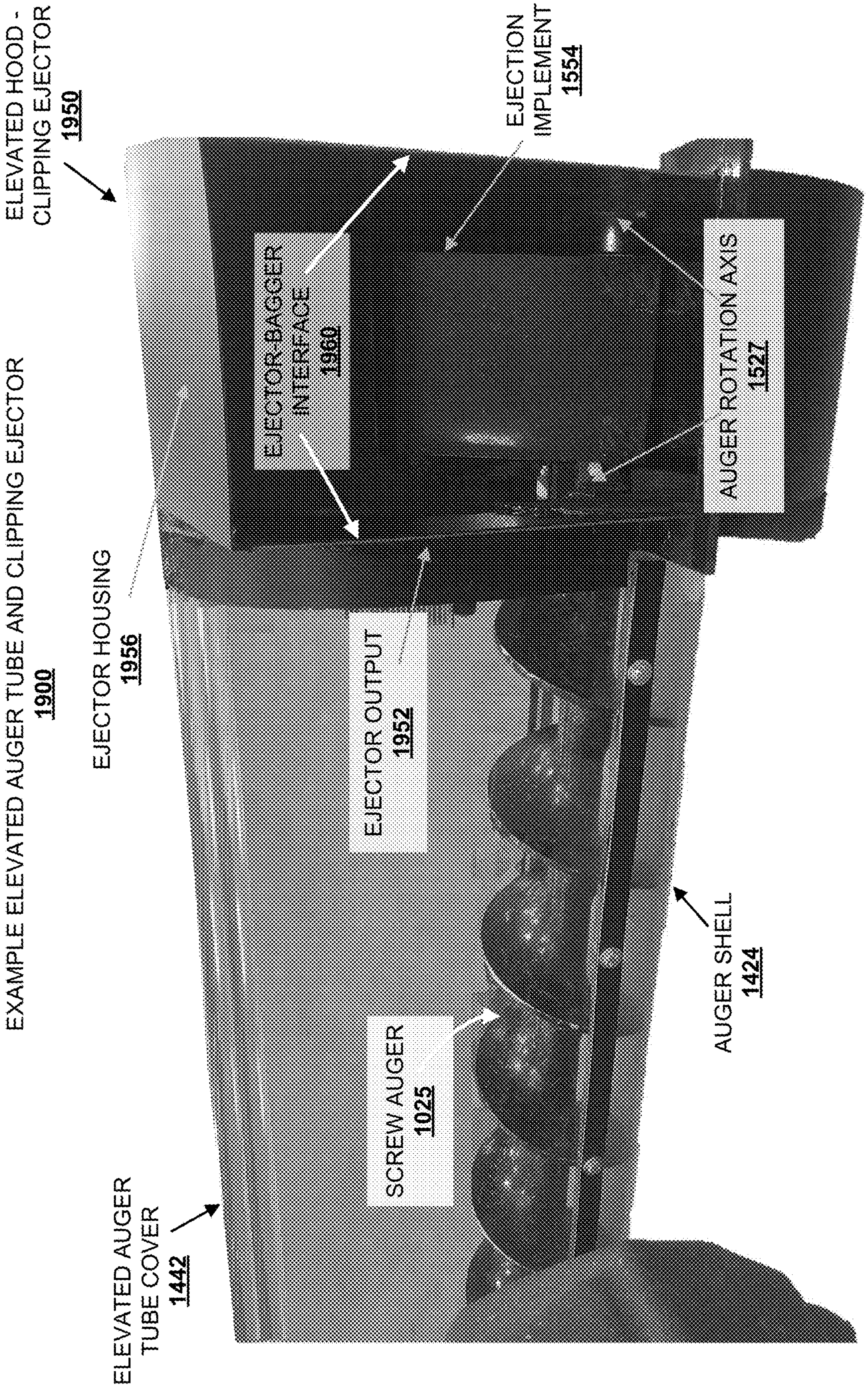
FIG. 19 is an example ejector housing for the auger housing with elevated hood shown in FIG. 16.

FIG. 19 shows an image of an overhead perspective view 1900 of an example elevated auger apparatus according to alternative or additional embodiments of the present disclosure. Overhead perspective view 1900 shows an elevated hood clipping ejector 1950 coupled to auger shell 1424, screw auger 1025 and elevated auger tube cover 1442. Specifically, elevated hood clipping ejector 1950 is configured to receive turf clippings and vegetation material from screw auger 1025 and from elevated auger tube cover 1442. An ejection implement 1554 secured to auger rotation axis 1527 can expel the turf clippings and vegetation material from an ejection—bagger interface 1960 out from elevated hood—clipping ejector 1950. An ejector housing 1956 limits a direction into which the turf clippings and vegetation are expelled to an opening defined by ejector—bagger interface 1960. Where a receptacle, clipping bag or the like secured to the turf maintenance apparatus has an input coupled to ejector—bagger interface 1960, the turf clippings can be expelled into the receptacle or clipping bag. While ejector—bagger interface 1960 in FIG. 19 is shown with a substantially rectangular shape of a specific size, in various embodiments, other shapes (e.g., square, rounded, etc.) of various sizes can alternatively be employed for ejector—bagger interfaces in connection with clipping ejectors discussed herein.

Figure 20:
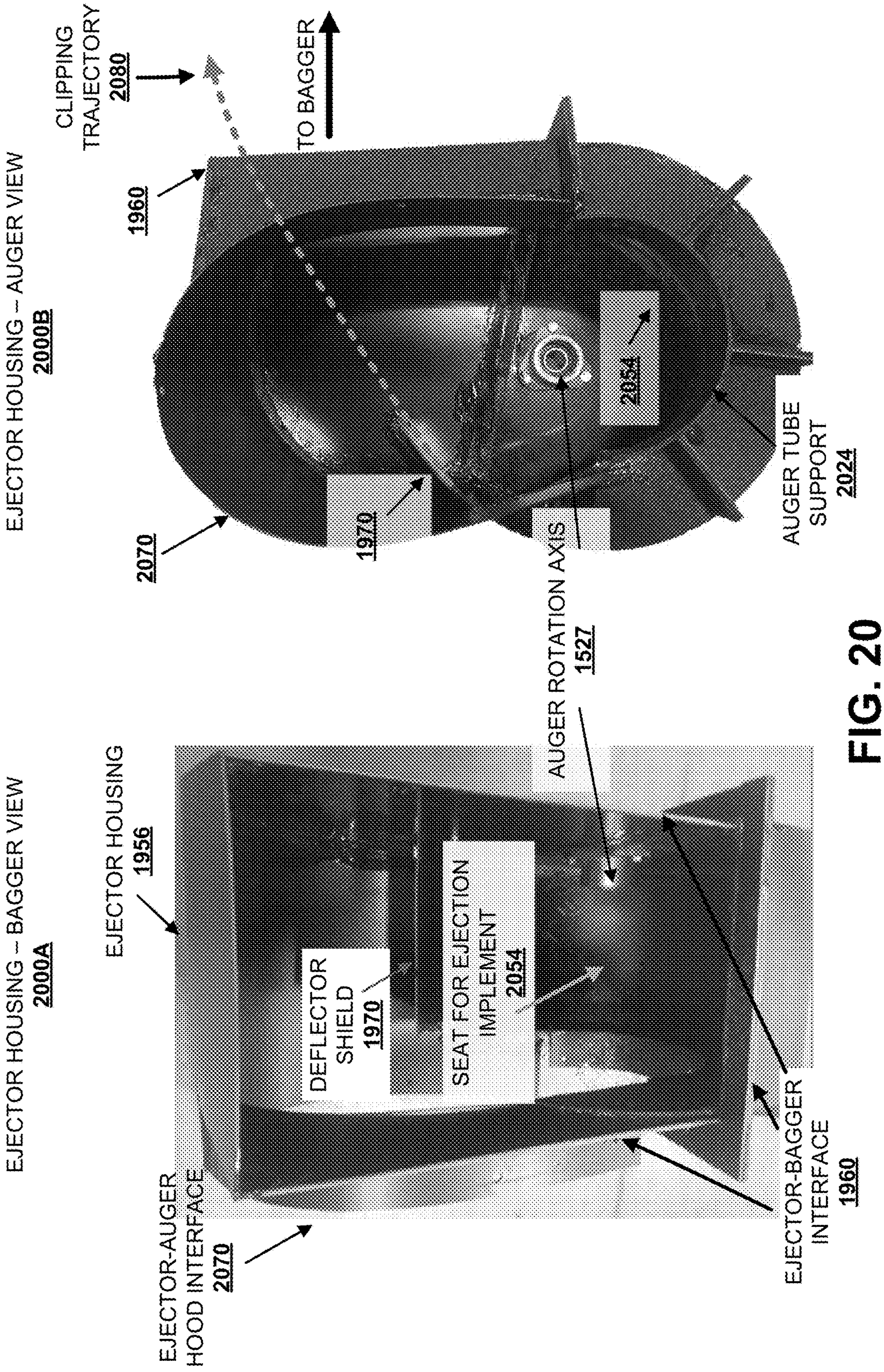
FIG. 20 depicts an output view and an input view of the interior of the example ejector housing of FIG. 19 in one or more aspects of the disclosed embodiments.

FIG. 20 shows images of ejector housing 1956 separated from auger shell 1424 and a turf maintenance apparatus to highlight additional aspects of the disclosed embodiments. Shown in a bagger view 2000A from within a bagger looking into ejector-bagger interface 1960, and an auger view from within an auger tube into an ejector-auger hood interface 2070 of ejector housing 1956.

Ejector-auger hood interface 2070 receives an auger shell 1424 and screw auger 1025 and turf clippings are provided to ejector housing 1956 through ejector-auger hood interface 2070. An ejection implement (not depicted) is secured to a rotation axis of a screw auger 1025 seated at auger rotation axis 1527, and rotates within a seat for ejection implement 2054. Ejector-bagger interface 1960 defines an opening into which the ejection implement expels turf clippings received from the screw auger and elevated auger tube cover 1442. A deflector shield 1970 over seat for ejection implement 2054 can help define a clipping trajectory 2080 to further define the direction into which the ejection implement expels turf clippings from ejector housing 1956.

Figure 21:
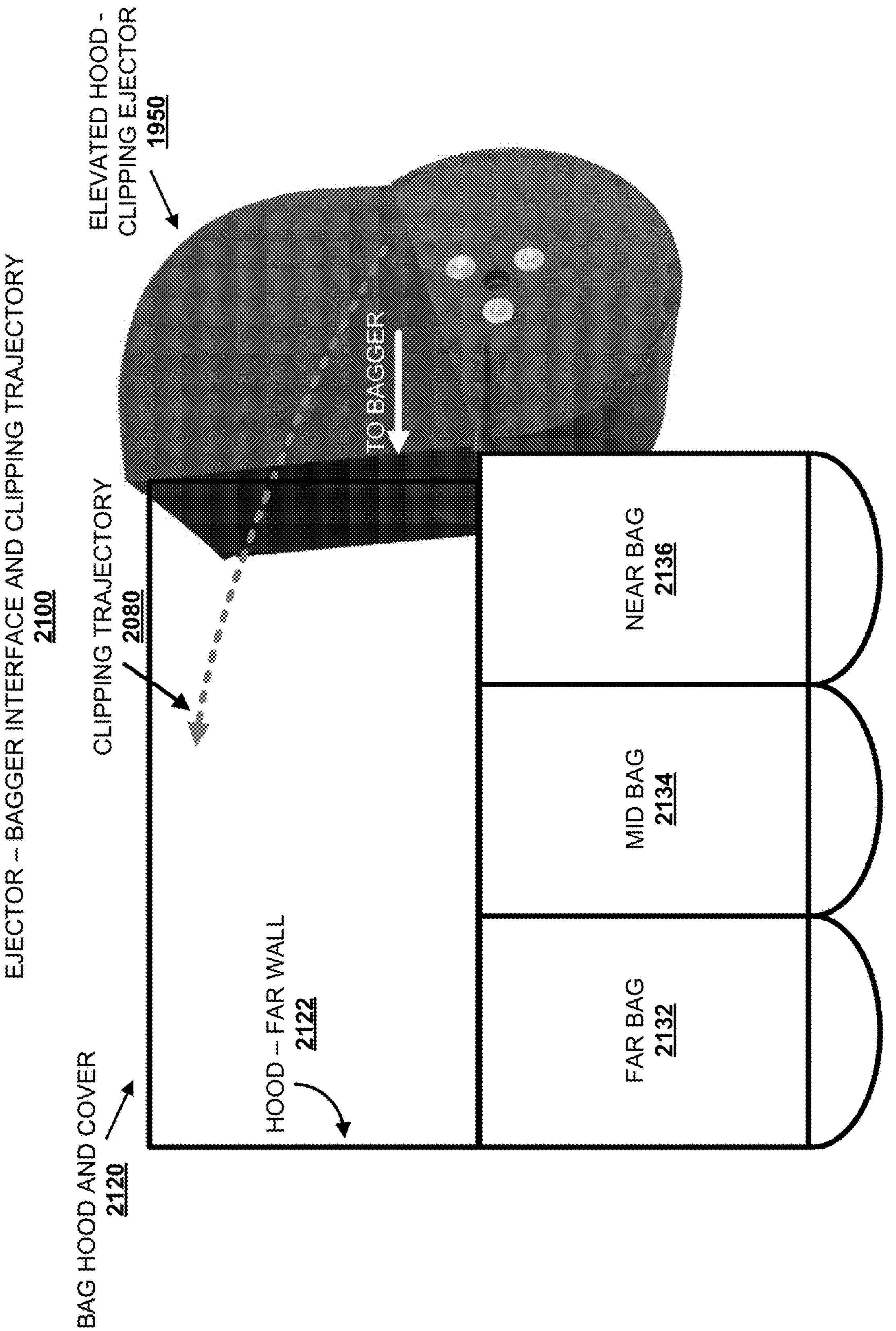
FIG. 21 shows a receptacle hood coupled to the elevated hood ejector housing and trajectory of turf clippings expelled from the ejector housing.

FIG. 21 provides a drawing of an ejector—bagger interface 2100 and clipping trajectory from elevated hood—clipping ejector 1950 according to various aspects of the disclosed embodiments. As shown, a bag hood and cover is coupled to elevated hood clipping ejector 1950 at an ejector-bagger interface 1960. Clipping trajectory 2080 can be established in part by an opening defined by ejector-bagger interface 1960 and by a deflector shield 1970. Clipping trajectory 2080 can direct turf clippings upward out through ejector-bagger interface 1960 toward a far wall 2122 of bag hood and cover 2120. Turf clippings can fill a far bag 2132 first, followed by a mid bag 2134 and finally a near bag 2136 to facilitate complete utilization and filling of a clipping bag or receptacle. In various embodiments, material ejected substantially simultaneously from clipping ejector 1950 can comprise some material that will end up in far bag 2132, some material that ends up in mid bag 2134, and/or some material that ends up in near bag 2136, for example, depending on the characteristics of clipping ejector 1950. Clipping ejector 1950 can be designed such that far bag 2132 will fill at an equal or faster rate than mid bag 2134, which will fill at an equal or faster rate than near bag 2136, ensuring that there is no unused space in far bag 2132 or mid bag 2134 which could otherwise result if mid bag 2134 and/or near bag 2136 filled up first and blocked additional material from entering far bag 2132 and/or mid bag 2134. However, even if mid bag 2134 fills faster than far bag 2132 or near bag 2136 fills faster than mid bag 2134 or far bag 2132, unused space can still be substantially reduced if they fill at close to the same rate.

Figure 22:
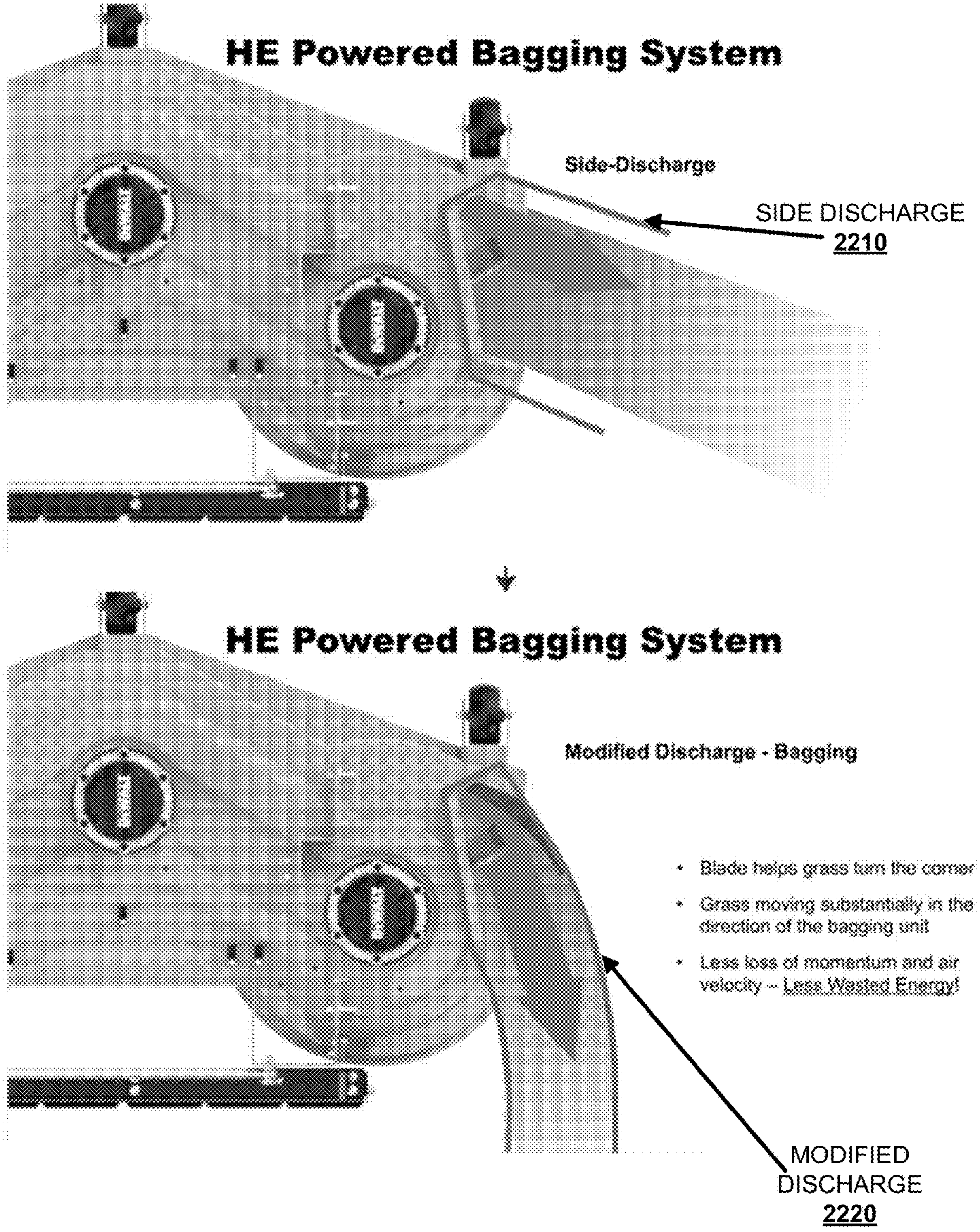
FIG. 22 illustrates a comparison between a mow deck employing side discharge (top image) and a mow deck employing a modified discharge (bottom image), in connection with various embodiments discussed herein.

FIG. 22 shows a comparison between a mow deck employing side discharge (top image) and a mow deck employing a modified discharge (bottom image), in connection with various embodiments discussed herein. While embodiments have been discussed herein in connection with a side discharge, similar embodiments can be employed in connection with a modified discharge (e.g., a rearward-directed side discharge, etc.) as shown in the bottom image of FIG. 22. For a situation where material is to be directed to a bagging system at the rear of a mowing apparatus, the side discharge will have a more abrupt turn to redirect the material toward the bagging system, which will result in a significant loss of energy and momentum from both the material and the accompanying air flow, as well as the potential of buildup of material, potentially leading to clogging. In contrast, the modified discharge (e.g., rearward-directed side discharge, etc.) of the lower image can comprise a curved (or a plurality of segments with adjacent segments deviating from each other by a relatively small angle such as 25 degrees or less (e.g., 20 degrees or less, 15 degrees or less, 10 degrees or less, etc.), or a combination of the two, etc.) surface on the front inner surface to allow the blades (e.g., and/or accompanying air flow) to help turn toward the rear of the mowing apparatus, by still providing nearby motion pushing material and air in a direction substantially toward the rear of the mowing apparatus. As a result, when exiting the modified discharge (e.g., rearward-directed side discharge, etc.), the material and accompanying air will already be moving close to the appropriate direction to reach the bagging system (e.g., wherein the difference in horizontal components of the trajectories of material entering a mow deck coupler via the modified difference and of material traveling within the auger are within 45 degrees of each other, within 40 degrees of each other, within 35 degrees of each other, within 30 degrees of each other, within 25 degrees of each other, within 20 degrees of each other, etc.), while retaining most of the energy and momentum provided to it by the movement of the blades. In embodiments employing an auger system to move material from the mow deck to the rear of a mowing apparatus (e.g., for bagging, ground discharge, etc.), a modified discharge (e.g., rearward-directed side discharge, etc.) such as shown in the bottom of FIG. 22 can have material entering the auger system with greater energy and momentum than a side discharge, thus reducing the amount of additional energy the auger system needs to provide to move the material to the top of the auger system.

This energy saving is an advantage for any outdoor power equipment but is especially important in electrically powered outdoor power equipment, where reducing energy spent can significantly improve runtime. For mowing apparatuses that employ a blower to move material to a bagging system, the blower uses power in a range from around 2 kW to around 5 kW. Prototype embodiments of auger systems such as those discussed herein can operate on substantially less power, such as 500 W or less (e.g., 300 W, etc.), with preliminary testing showing rare spikes of power to around 1 kW in situations involving clumps of wet, heavy, or dense material. The moment of inertia and/or weight of the auger (and any elements rotating with the auger) can vary between embodiments. In embodiments employing a relatively lighter (or lower moment of inertia) auger, relatively less power is employed to start rotation of the auger, but relatively more is employed to continue rotating the auger when clumps, etc. become stuck between the auger and auger tube and apply a braking torque. In contrast, in embodiments employing a relatively heavier (or higher moment of inertia) auger, relatively more power is employed to start rotation of the auger, but relatively less is employed to continue rotating the auger when clumps, etc. become stuck between the auger and auger tube and apply a braking torque. Because starting rotation of the auger occurs over a very short time compared to expected operating times, a relatively heavier auger can be employed in various embodiments based on situations involving anticipated braking torques (e.g., from material clumps, rigid material such as sticks that can be broken by the auger, etc.). In some embodiments, an auger system can comprise one or more components rotating with the auger (e.g., always rotating with the auger, selectably rotating with the auger, etc.) to increase its effective moment of inertia (e.g., one or more fixed or variable flywheel(s), etc.).

FIGS. 23-31 comprise images of an additional embodiment of an auger system for an outdoor power equipment, according to various aspects discussed herein.

Figure 23:
FIG. 23 illustrates an elevated side view of a joint or pivot axis between an auger tube and a mow deck coupler, according to various aspects discussed herein.

Referring to FIG. 23, illustrated is an elevated side view 2300 of a joint or pivot axis 2333 between an auger tube 2320 and a mow deck coupler 2330, according to various aspects discussed herein. In various embodiments, an upper end of auger tube 2320 can have a fixed height relative to the outdoor power equipment (e.g., mowing apparatus, etc.). However, in some outdoor power equipment, a lower end of auger tube 2320 can receive material from a portion of the outdoor power equipment that can have an adjustable height, such as a mow deck (e.g., mow deck 110, etc.). In such embodiments, mow deck coupler 2330 and auger tube 2330 can be connected at a joint or pivot axis 2333, which can keep auger tube 2320 and mow deck coupler 2330 connected while allowing auger tube 2320 to rotate through a range of angles depending on the fixed position of the upper end of auger tube 2320 and the position of the lower end of auger tube 2320, which is held at a fixed position relative to the adjustable height of the mow deck. In the embodiment shown in FIG. 23, the auger extends through the auger tube 2320 but is substantially outside of and rotatable relative to the mow deck coupler 2330. Although not shown in the Figures, the interface between auger tube 2320 and mow deck coupler 2330 can be covered (e.g., with a cover that can be one or more of flexible, rotatable, segmented, etc.), which can provide advantages such as improving the flow of air from mow deck coupler 2330 to auger tube 2320.

Figure 23A:
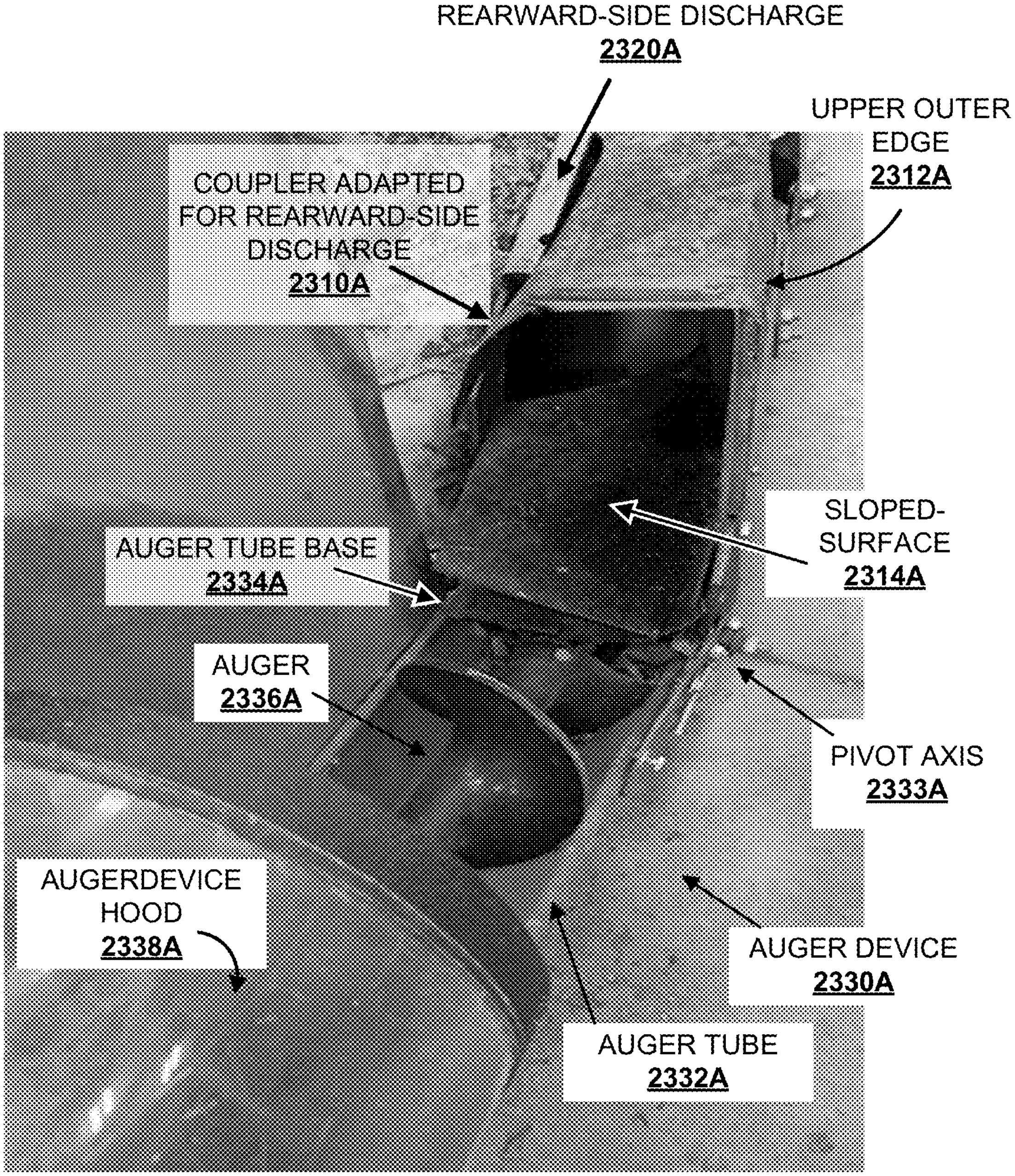
FIG. 23A depicts an auger housing interface to a side-rearward mow deck coupler with a portion of an auger housing hood removed, in various aspects.
Figure 23B:
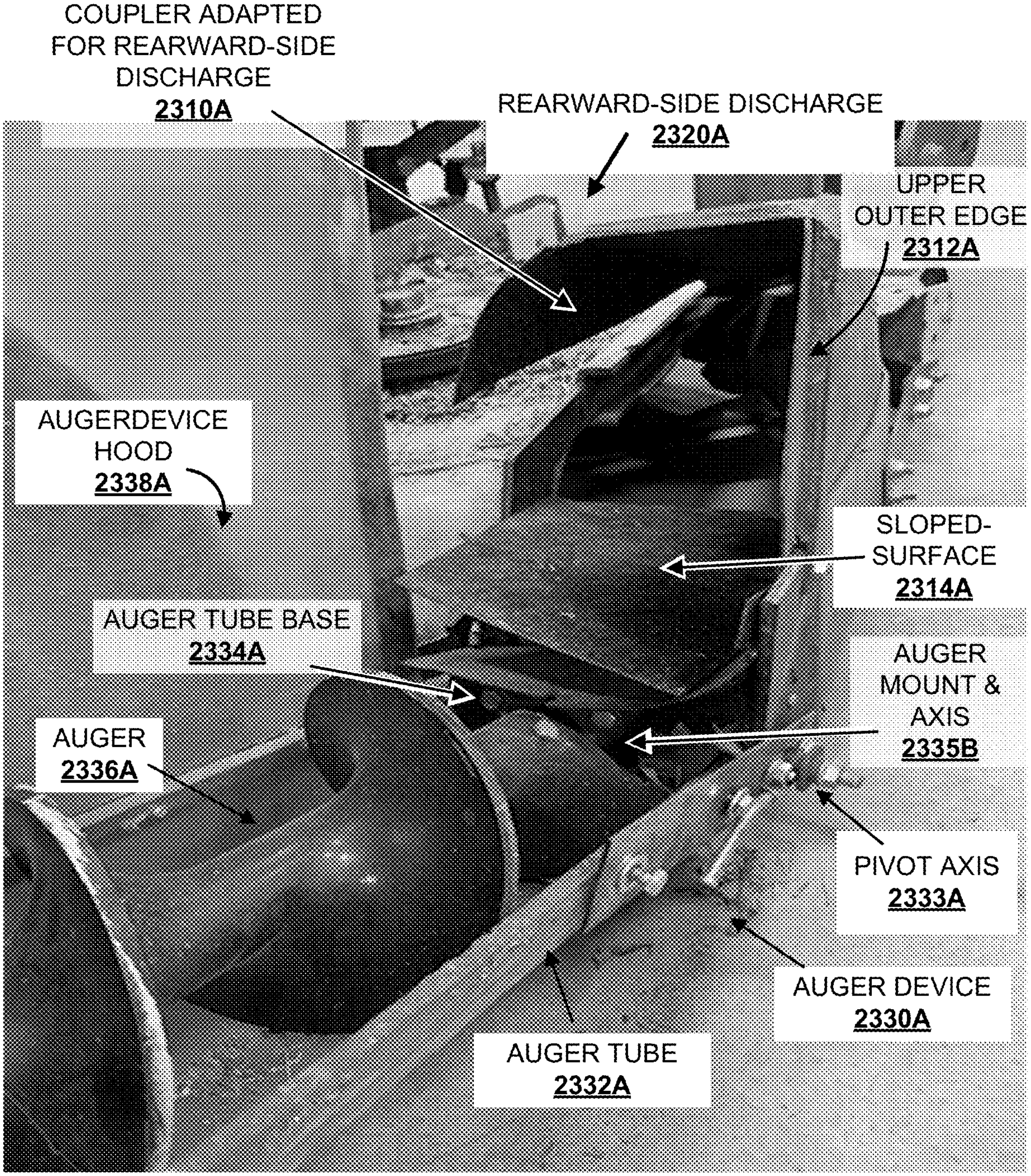
FIG. 23B depicts a close up view of the auger housing interface to the side-rearward mow deck in further aspects.
Figure 23C:
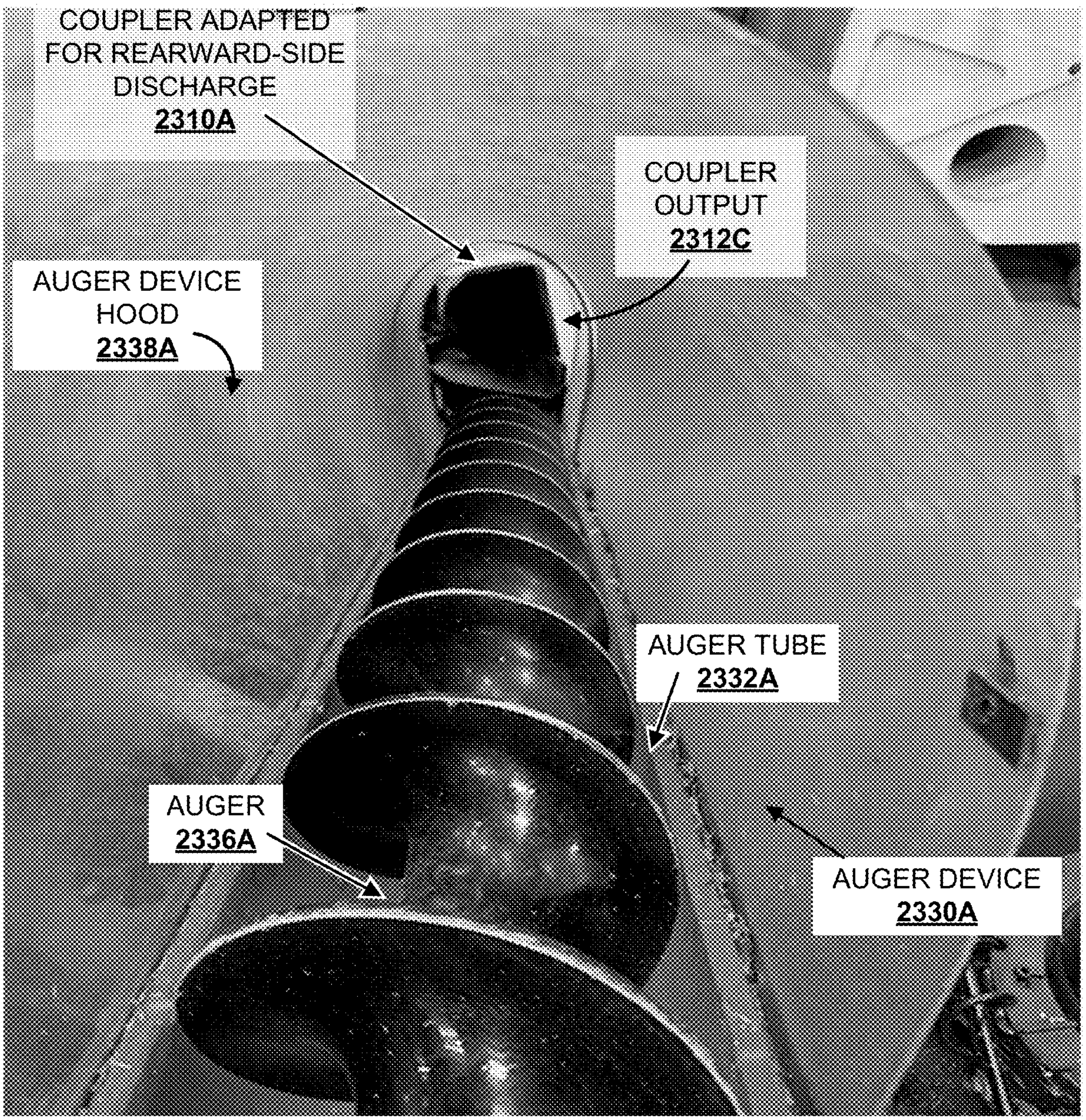
FIG. 23C depicts a longitudinal internal view of the auger housing and mow deck coupler output, in additional aspects of the disclosed embodiments.

FIG. 23A depicts an interface 2300A between an auger tube base 2334A and a coupler 2310A adapted to receive a rearward-side discharge 2320A from a mow deck. A portion of an auger device hood 2338A is removed in the image shown in FIG. 23A. An auger 2336A is visible within an auger tube 2332A underlying the auger 2336A and auger device hood 2338A. Coupler 2310A can be adapted to have a substantially flat upper surface in an aspect(s). Further, an upper outer edge 2312A can be substantially at a right angle to an outer sidewall of coupler 2310A. A bottom surface of coupler 2310A can have an upward sloped surface 2314A to direct material exiting a mow deck and entering coupler 2310A upward into auger device 2330A above auger 2336A within auger device hood 2338A. Clipping material falling onto auger 2336A can be transferred along auger device 2330A by rotation of auger 2336A, whereas clipping material maintained within auger device hood 2338A by airflow from a mow deck can move along auger device 2330A above auger 2336A. FIG. 23B shows a close up view 2300B of interface 2300A. A pivot axis 2333A is shown allowing auger tube 2332A to move flexibly with respect to coupler 2310A at auger tube base 2334A. An auger mount & axis 2335B serves to secure one end of auger 2336A and allow auger 2336A to rotate. Close up view 2300B can also show a vertical orientation of sloped surface 2314A being near an upper extent of an auger flight of auger 2336A. FIG. 23C shows a longitudinal internal view 2300C also showing an orientation of coupler output 2312C relative auger 2336A within auger device 2330A.

Figure 24:
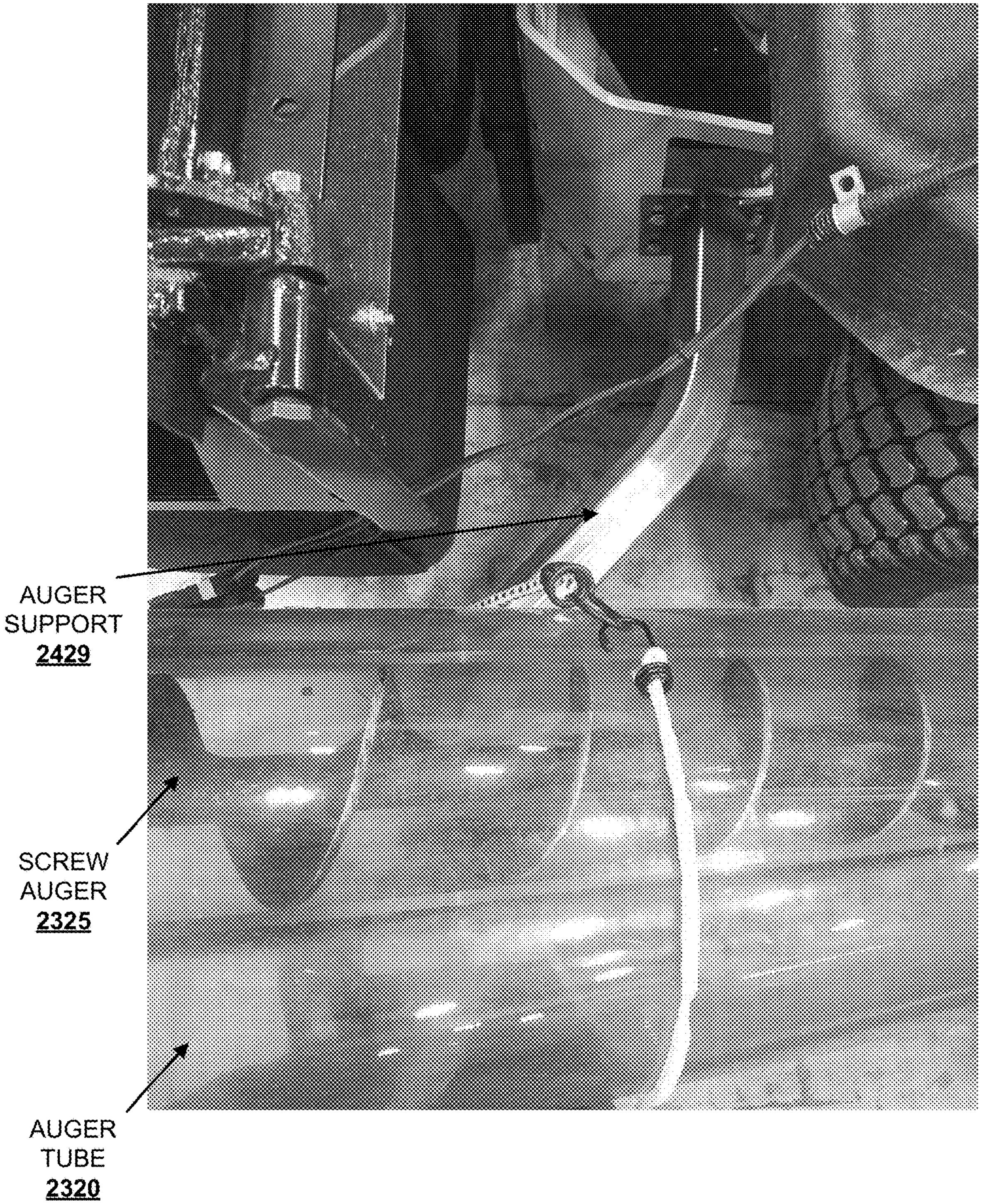
FIG. 24 illustrates a top view of an example auger support that can provide additional structural support to auger tube and screw auger, according to various aspects discussed herein.
Figure 28:
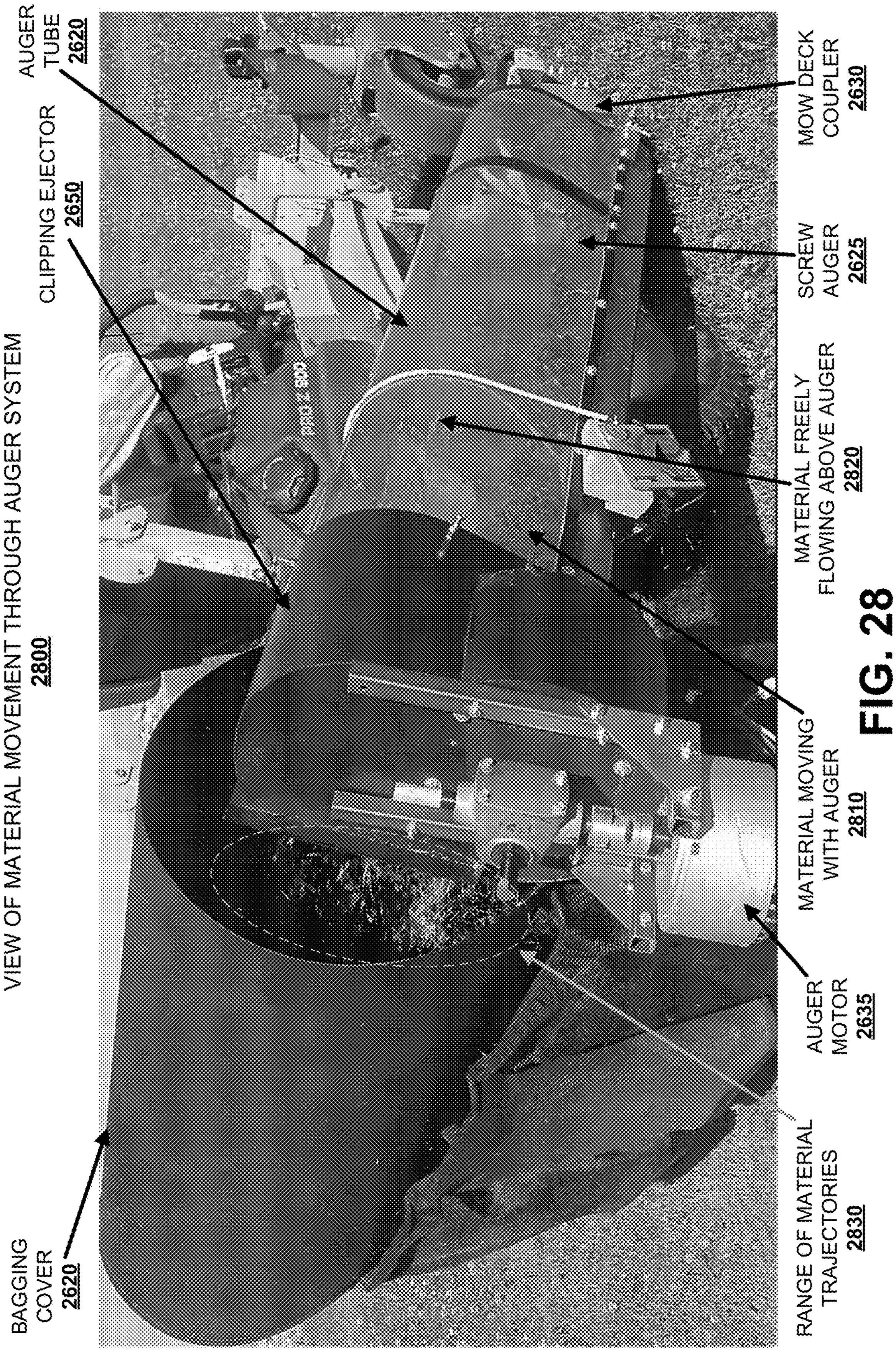
FIG. 28 illustrates a rear perspective view of a mowing machine employing an auger system during operation, according to various aspects discussed herein.

FIG. 24 illustrates a top view 2400 of an example auger support 2429 that can provide additional structural support to auger tube 2320 and screw auger 2325, according to various aspects discussed herein. In some embodiments, one or more auger supports 2429 can be provided connecting auger tube 2324 and a frame, bagging system frame, or other portion of an outdoor power equipment to provide structural support to the auger tube 2320 and screw auger 2325. The example auger support 2429 shown in FIG. 24 contacts the auger tube 2320 near a bagging system, approximately two-thirds to 80% of the way from the bottom to the top of the auger tube 2320, approximately one foot away from a clipping ejector (not shown in FIG. 24, but see FIG. 28, showing relative positions of both a clipping ejector and connection to an auger support). The other end of auger support 2429 is connected to the frame of the outdoor power equipment proximate to its rear. While a single auger support 2429 is shown in FIG. 24, some embodiments can employ no auger supports, a single auger support at a different location (see, e.g., FIG. 4A), or two or more auger supports.

Figure 25:
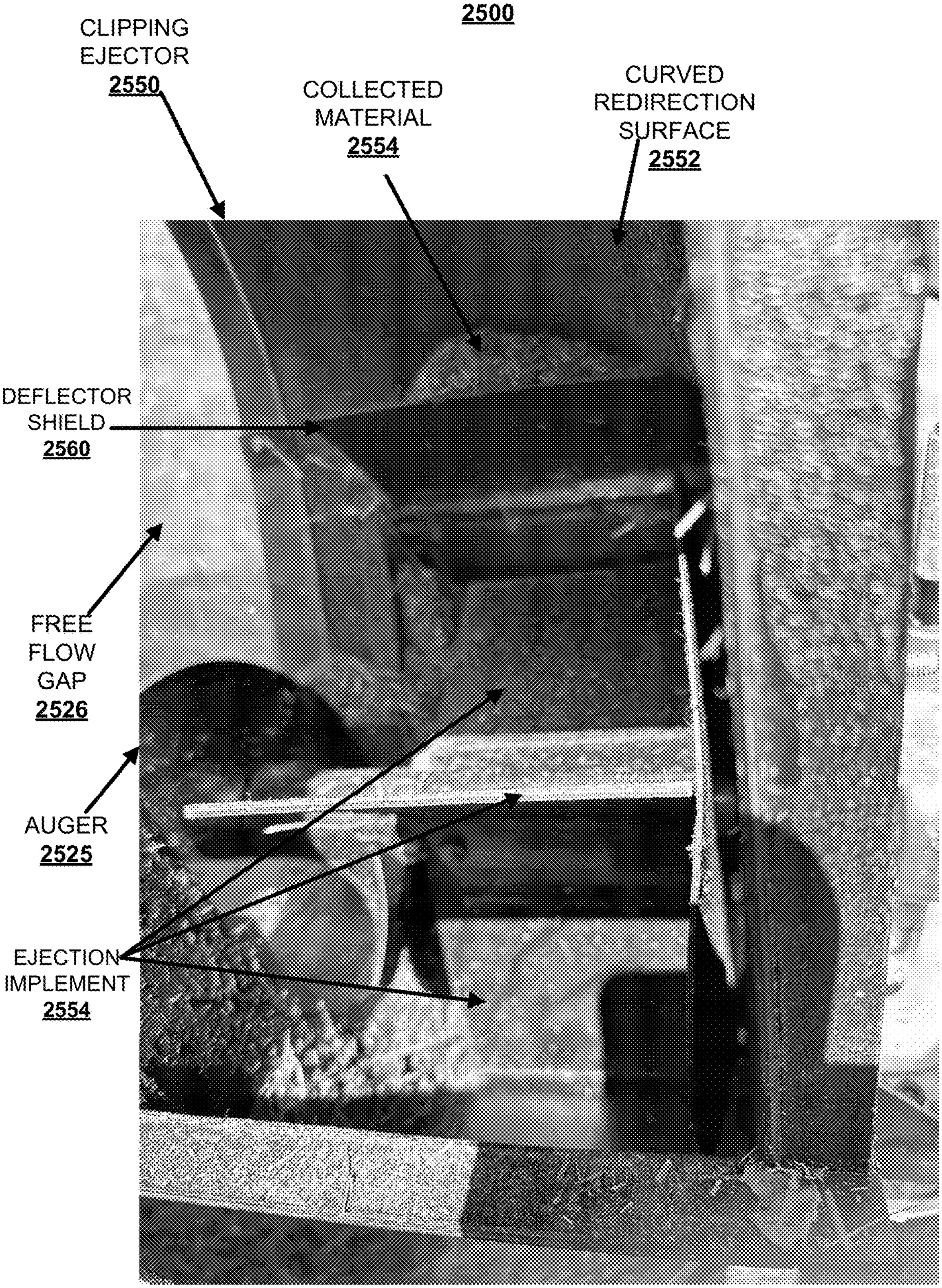
FIG. 25 illustrates a side view of an example clipping ejector, according to various aspects discussed herein.

FIG. 25 shows a side view 2500 of an example clipping ejector 2550, according to various aspects discussed herein. Clipping ejector 2550 can be similar to other clipping ejectors discussed herein, with some variations noted below. Clipping ejector 2550 comprises three ejection implements 2554 (e.g., approximately 120 degrees apart from each other, etc.), which can provide for more efficient ejection of material than embodiments comprising two implements approximately 180 degrees apart. In addition to material ejected provided to ejection implements 2554 via auger 2525, lighter material flowing through free flow gap 2526 can enter ejection implement 2550 above ejection implements 2554 and deflector shield 2560, as can be seen in collected material 2554. Because of this, the upper portion of clipping ejector 2550 can comprise a curved redirection surface 2552 (e.g., curving from the left side of surface 2552 (substantially within the plane of FIG. 25) to the right side of surface 2552 (substantially perpendicular to the left side of surface 2552 and outward from the plane of FIG. 25) to redirect material received via free flow gap 2526 in the same direction as material ejected by ejection implements 2554. Additionally, although not shown in FIG. 25, an upper surface of deflector shield 2560 can provide a similar curved surface to prevent material collecting as shown at 2554, and instead direct that material toward a bagging system, ground discharge, etc. In various such embodiments, an upper portion of clipping ejector 2550 can be parabolically shaped or high enough to allow unimpeded or substantially unimpeded parabolic motion of material from clipping ejector 2550, thereby minimizing additional energy required to move material to a bagging system, ground, etc. Depending on a target range of trajectories for the material, the upper surface of clipping ejector 2550 can be flat or curved, and can be angled upward, downward, or horizontal at an exit from clipping ejector 2550.

Figure 26:
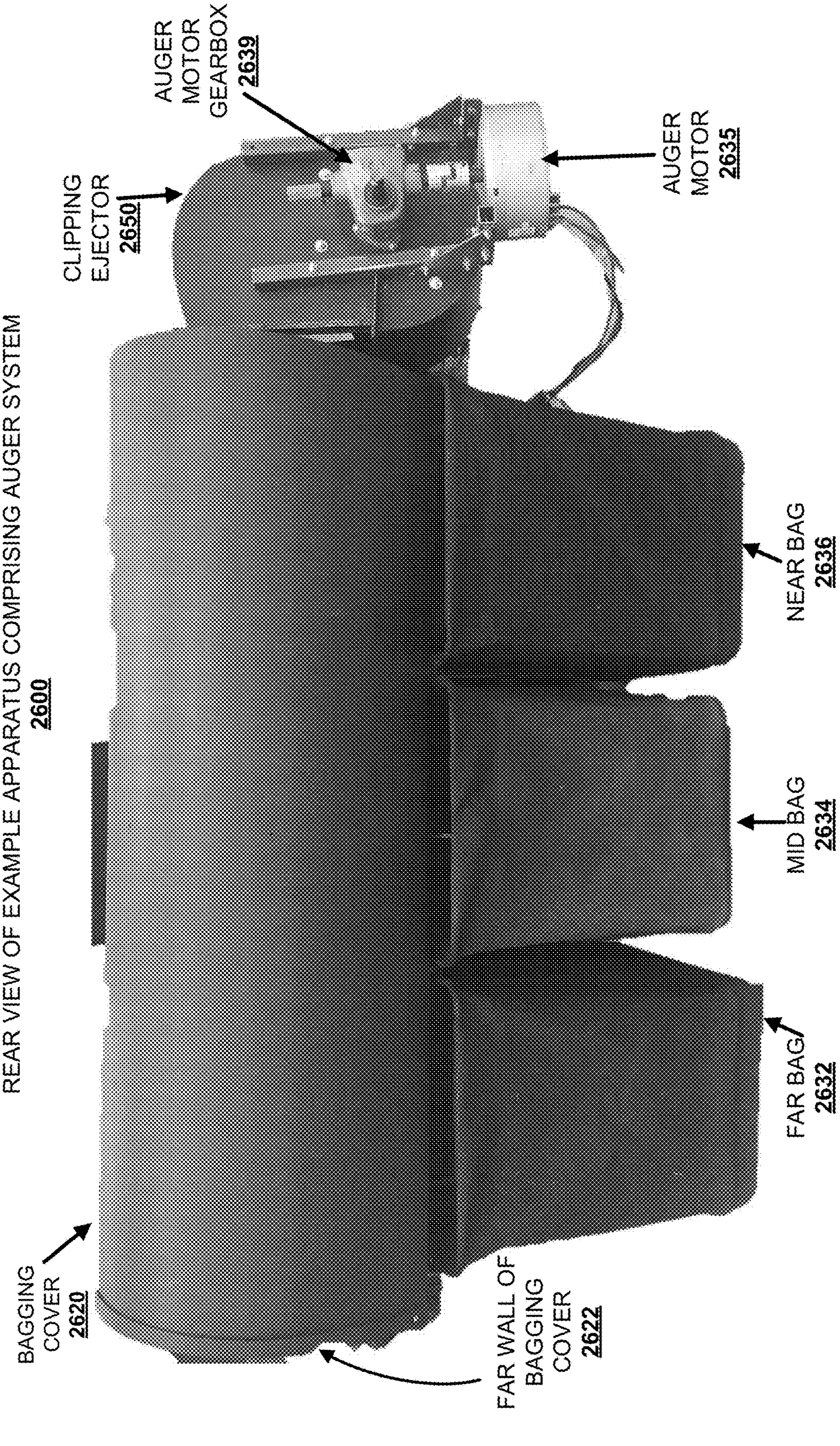
FIG. 26 illustrates a rear view of an example mowing apparatus comprising an auger system and bagging system, according to various aspects discussed herein.
Figure 26A:
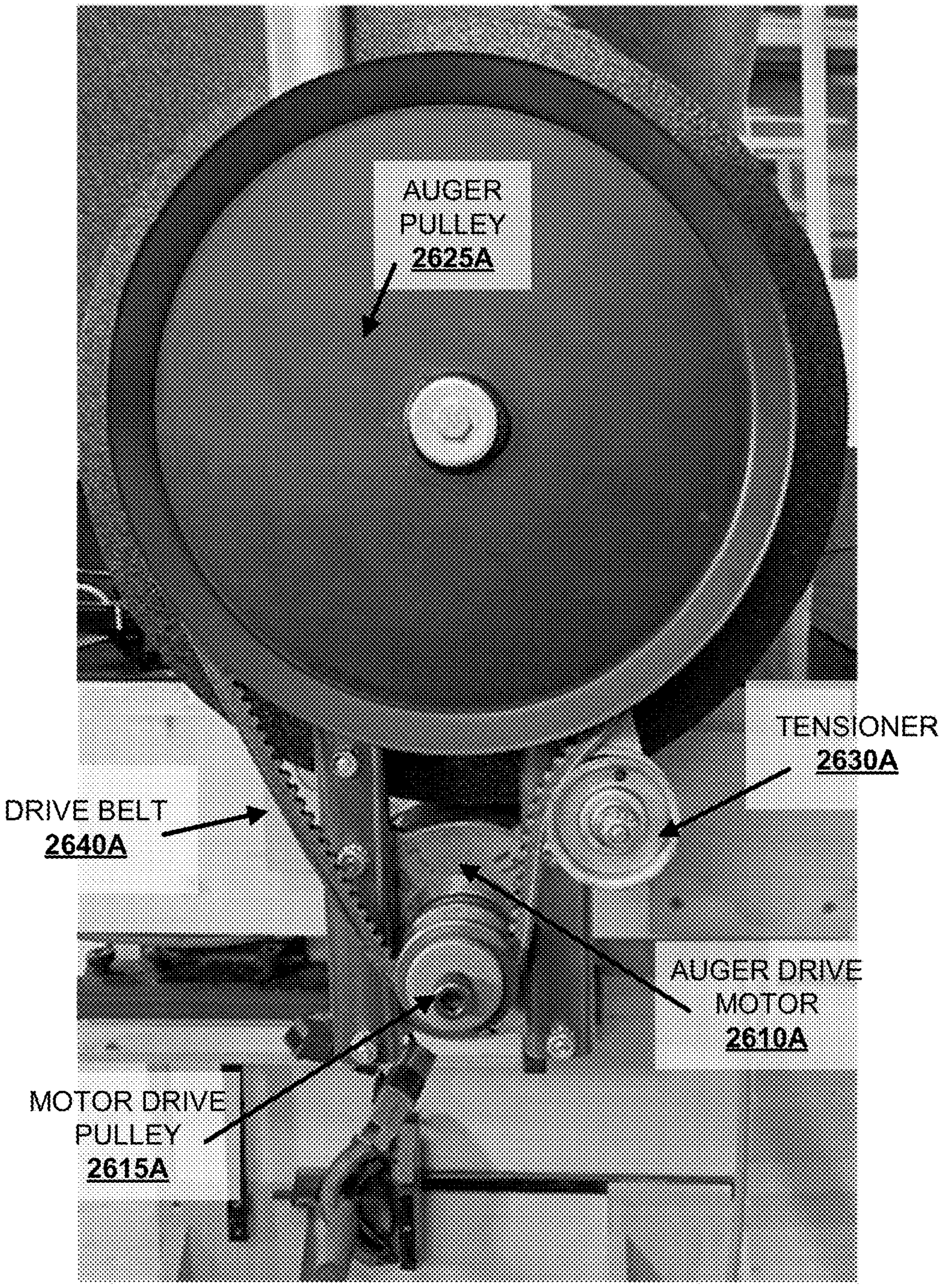
FIG. 26A depicts an example belt and pulley drive for providing mechanical power for an auger device, in alternative or additional aspects of the disclosure.
Figure 27:
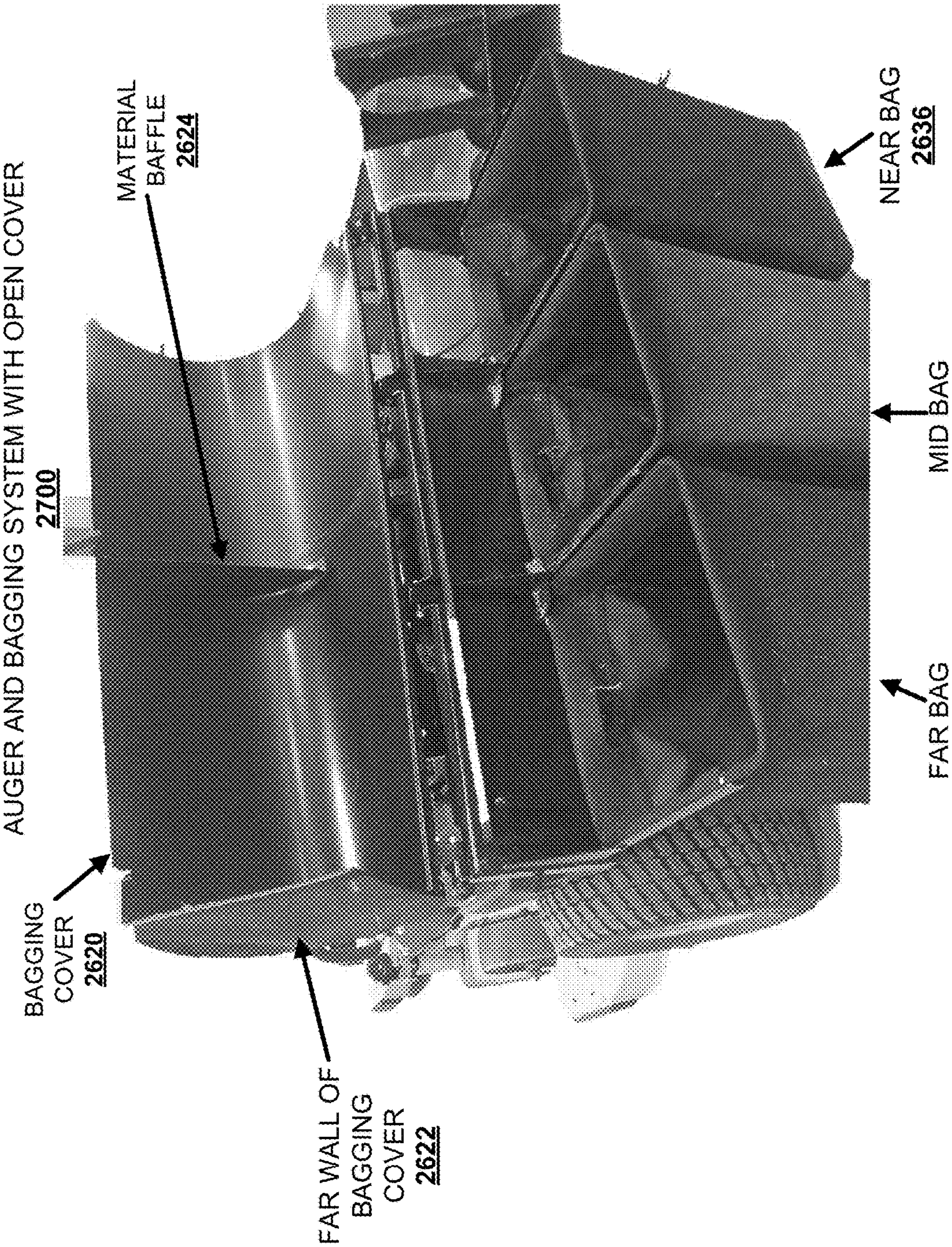
FIG. 27 illustrates a rear perspective view of an auger system and bagging system with the bagging cover open, according to various embodiments discussed herein.

Referring to FIG. 26, shown is a rear view 2600 of an example mowing apparatus comprising an auger system and bagging system, according to various aspects discussed herein. In the embodiment shown, auger motor 2635, located proximate to a clipping ejector 2650 and bagging system, can drive ejection implements (not shown) of clipping ejector 2650 and a screw auger (not shown) that delivers material to clipping ejector 2650. In the embodiment shown, the shaft of auger motor 2635 is substantially perpendicular to that of the screw auger and clipping ejector 2650, which auger motor 2635 drives at a reduced speed via auger motor gearbox 2639 (a 10:1 reduction via worm gears in the embodiment shown, but other embodiments can employ greater or lesser gear reductions or other gearing such as bevel, hypoid, etc.). FIG. 26A shows an alternative aspect of the disclosed embodiments in which a belt and pulley motor drive mechanism 2600A can replace auger motor 2635 and gearbox 2639 for powering movement of a screw auger. An auger drive motor 2610A (e.g., which can be a lower power motor than auger motor 2635 in some embodiments) can provide mechanical power to a motor drive pulley 2615A. A drive belt 2640A transfers rotational output from motor drive pulley 2615A to an auger pulley 2625A coupled to a rotational axis of a disclosed auger device. A tensioner 2630A can be provided to maintain a tension on drive belt 2640A and can be adjustable to adjust the tension in some aspects of the disclosed embodiments. FIG. 27 shows a rear perspective view 2700 of the auger system and bagging system with the bagging cover 2620 open, according to various embodiments discussed herein. Although not shown, in other embodiments, the shaft of auger motor 2635 can be at substantially any angle relative to that of the auger and clipping ejector 2650, including parallel or coaxial (e.g., and driven via a planetary gearset). Material can be directed from clipping ejector through an open area under bagging cover 2620 and above far bag 2632, mid bag 2634, and near bag 2636. The angle of ejection from clipping ejector 2650 and the height and/or top profile of bagging cover 2620 can provide for substantially parabolic motion of material through at least a portion of its motion under bagging cover 2620.

Figure 29:
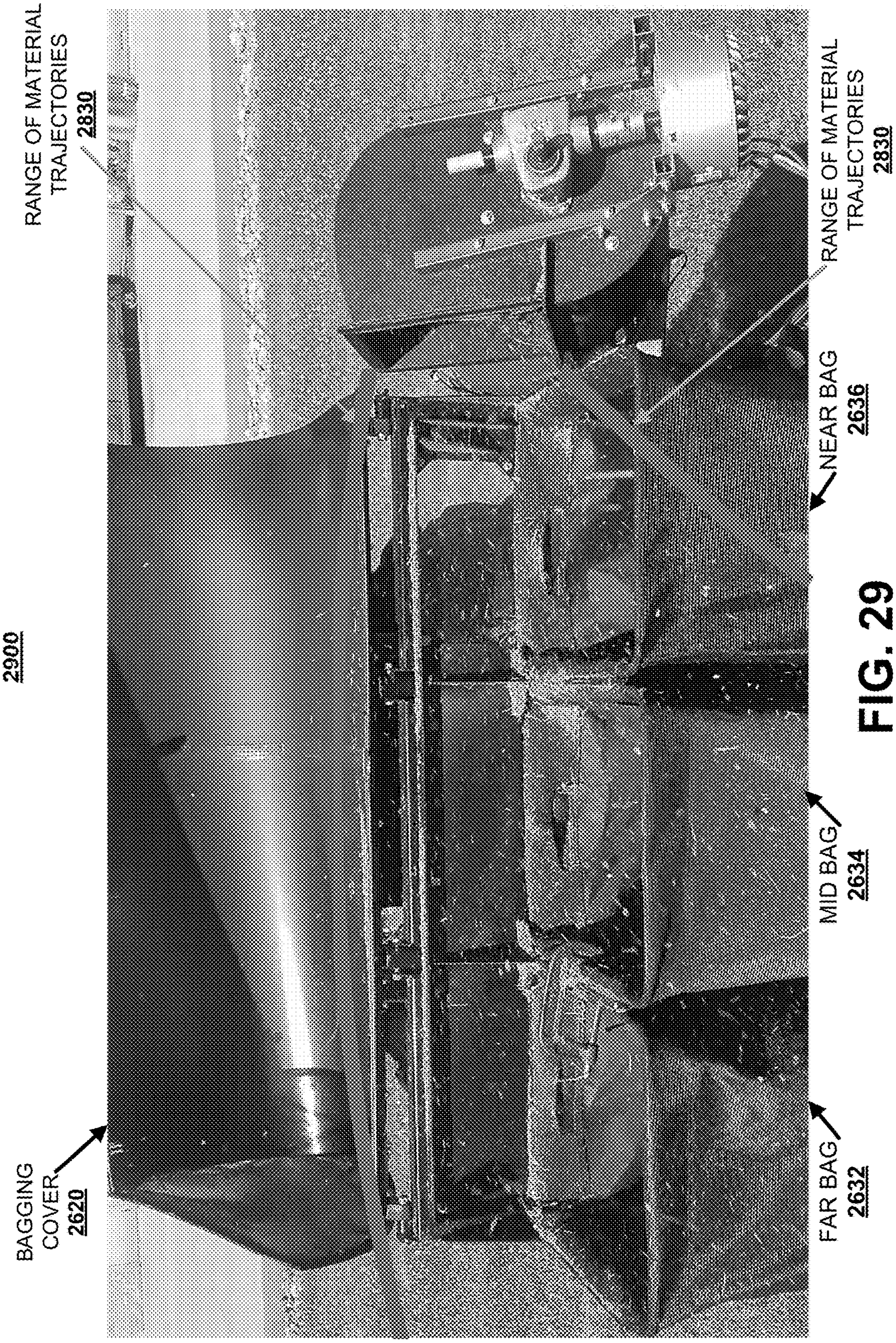
FIG. 29 illustrates an elevated rear view of material moving out of an auger system according to various aspects discussed herein.
Figure 30:
FIG. 30 illustrates an elevated side view of material moving out of an auger system according to various aspects discussed herein.

In general, ejected material will not follow a single trajectory but individual pieces or portions of material will have a trajectory within a range of trajectories (see, for example, FIGS. 28-30, discussed infra). Some portion of material may strike the far wall 2622 of bagging cover 2620 and fall into far bag 2632. Some material can have an unimpeded trajectory that ends in one of far bag 2632, mid bag 2634, or near bag 2636. Even distribution of material landing unimpeded in far bag 2632, mid bag 2634, and near bag 2636 can provide efficient usage of both bagging space and energy. If the material is not evenly distributed, relatively more material landing in far bag 2632 than mid bag 2634 and relatively more material landing in mid bag 2634 than near bag 2636 can also provide efficient usage of bagging space (while still relatively energy efficient), as material that would otherwise land in far bag 2632 will end up in mid bag 2634 when far bag 2632 is full, and material that would otherwise land in mid bag 2634 will end up in near bag 2636 when mid bag 2634 is full (filling mid bag 2634 before far bag 2632 or near bag 2636 before mid bag 2634 and/or far bag 2632 can occur in some embodiments, but will result in less efficient usage of bagging space).

In some embodiments, one or more baffles or redirection surfaces can be employed, such as optional material baffle 2624, to ensure optimal or near optimal distribution of material between far bag 2632, mid bag 2634, and near bag 2636. In other embodiments, the range of trajectories from clipping ejector 2650 can be selected or adjustable (e.g., through rotation of clipping ejector 2650, the angle of one or more deflector shields, etc.) to ensure optimal or near optimal distribution of material between far bag 2632, mid bag 2634, and near bag 2636.

FIG. 28 shows a rear perspective view 2800 of a mowing machine employing an auger system during operation, according to various aspects discussed herein. The mowing machine in FIG. 28 is in operation, with grass being actively cut by blades of the mow deck and provided via a mow deck coupler 2630 to auger tube 2620. Auger motor 2635 is driving screw auger 2625 in FIG. 28, and material is moving upward through auger tube 2620 from the mow deck coupler 2630 to clipping ejector 2650. Some material will be pushed upward by screw auger 2625 and/or air flowing with and around screw auger 2625, as seen at 2810. As shown at 2820, some material will freely flow through an upper portion of auger tube 2620 above screw auger 2625 (e.g., some for a portion of the distance up auger tube 2620 and/or some for the entire length of auger tube 2620). In the embodiment shown in FIG. 28, ejection implements (not shown in FIG. 28, but see FIG. 25) of clipping ejector 2650 rotate with screw auger 2625, and material entering clipping ejector 2650 is one of ejected from clipping ejector 2650 by the ejection implements and/or redirected by one or more surfaces within clipping ejector 2650 (e.g., curved redirection surface 2552, deflector shield 2560, the top inner surface of clipping ejector 2650, etc.) to exit clipping ejector 2650 at a range of material trajectories 2830. Material leaving clipping ejector 2650 can be collected by a bagging system (e.g., the example bagging system discussed herein, discharged to the ground, etc.

FIG. 29 shows an elevated rear view 2900 of material moving out of an auger system according to various aspects discussed herein. Referring to FIG. 30, illustrated is an elevated side view 3000 of material moving out of an auger system according to various aspects discussed herein. The range of material trajectories 2830 shown in FIGS. 29-30 corresponds approximately to the region between the two solid curved arcs. Bagging cover 2620 is open to show the range of material trajectories. In FIGS. 29-30, at least a portion of the range of material trajectories 2830 is directed behind (relative to the front of the mowing apparatus, as shown in FIG. 30) far bag 2632, mid bag 2634, and near bag 2636, allowing for better illustration of the range of material trajectories 2830. Positioning of clipper ejector 2650 closer to the front of the outdoor power equipment and/or adding/changing internal redirection surfaces in clipper ejector 2650 (e.g., on an inner upper/rear surface of clipping ejector 2650) can ensure the range of material trajectories 2850 is not directed behind or in front of the bagging system.

As can be seen in FIGS. 29-30, a first portion of the range of material trajectories extends beyond far bag 2632, a second portion will enter the far bag 2632, a third portion will enter the mid bag 2634, and a fourth portion will enter the near bag 2636, facilitating distribution of material across far bag 2632, mid bag 2634, and near bag 2636, while ensuring far bag 2632 fills before mid bag 2632, which fills before near bag 2636.

In some embodiments (for example, depending on the material, etc.), the range of material trajectories can be adjustable to ensure proper distribution of material (e.g., to a bagging system, ground discharge, etc.). Adjustment of the range of material trajectories can be facilitated in a variety of ways, such as by: movement and/or rotation of clipping ejector 2650; movement, rotation, insertion, removal and/or replacement of one or more redirection surfaces (e.g., deflector shield 2560, etc.) and/or ejection implements (e.g., ejection implements 2554, etc.); varying the speed of rotation of an auger and/or ejection implements; etc. Replacement can be with different components that can vary from the replaced components with respect to one or more of shape, size, orientation, presence, absence, and/or size of holes through which air can pass, etc. Providing holes (e.g., in flights of an auger, in ejection implements, in a housing of a clipping ejector, etc.) of a size such that air but not material (or not a majority of the material for material with a range of sizes, etc.) can pass through the holes can alter the range of material trajectories 2830 and can also reduce drag and thus energy otherwise expended in moving air. For some combinations of embodiments and the material moved by the auger system, air holes can provide for a more energy-efficient system for movement of material to a material ejector (e.g., clipping ejector 2650) and/or from the material ejector to a storage component/system (e.g., bagging system, etc.), ground discharge, etc.

Figure 31:
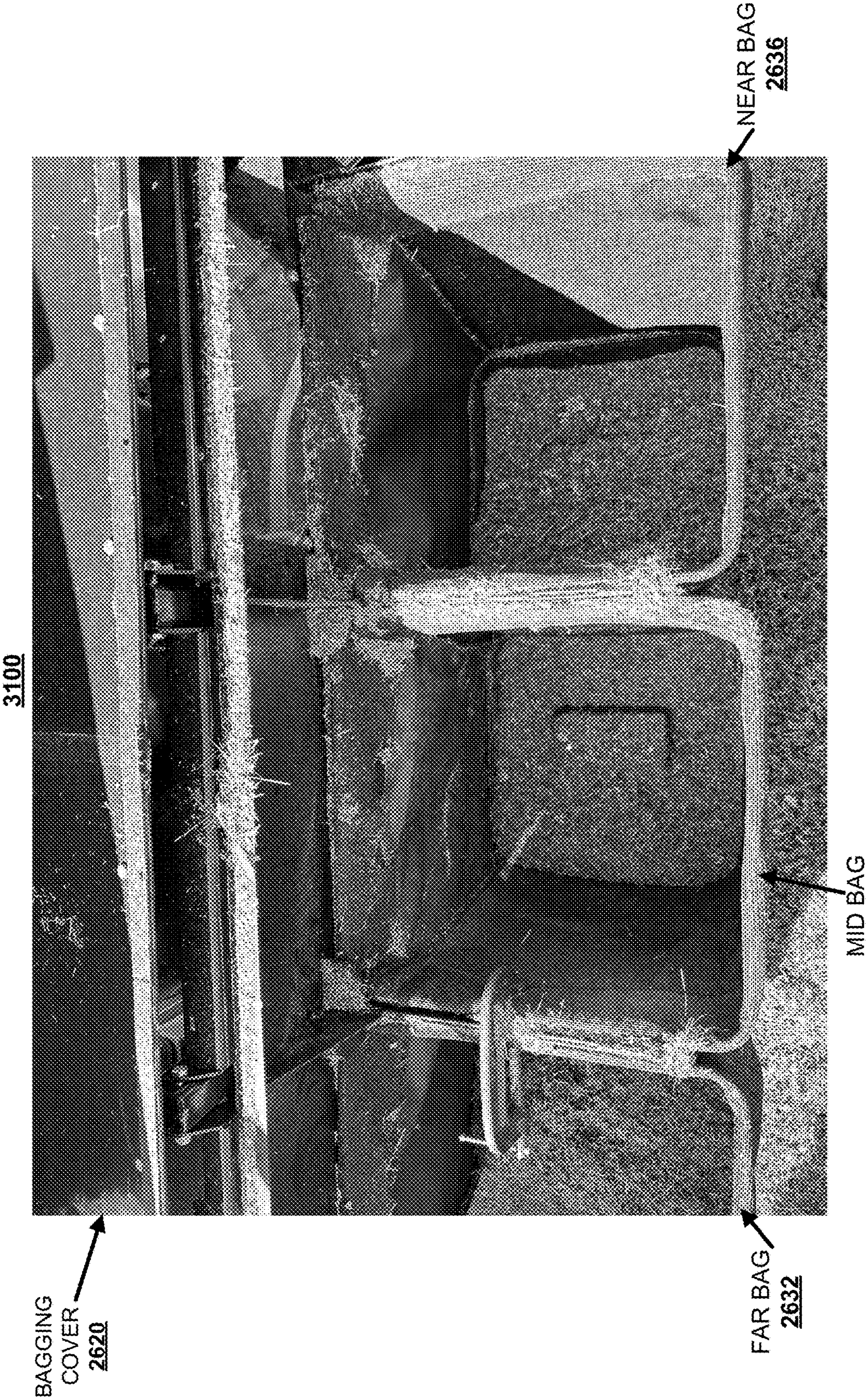
FIG. 31 illustrates a top view of a bagging system showing distribution of material by an auger system according to various aspects discussed herein.

Referring to FIG. 31, illustrated is a top view 3100 of a bagging system showing distribution of material by an auger system according to various aspects discussed herein. FIG. 31 shows material (turf clippings) relatively evenly distributed between the mid bag 2634 and near bag 2636, with more material in far bag 2632.

Although the disclosure herein relates in general to systems, apparatuses, and methods employing auger(s) for moving material in connection with outdoor power equipment, for the purposes of illustration, specific embodiments are presented related to a scenario wherein the material is turf clippings and the outdoor power equipment is a mowing apparatus. Accordingly, while illustrated embodiments comprise specific features and/or details, the same and/or different features and/or details can be employed in other embodiments in addition to and/or instead of the specific features/details shown or described for moving turf clippings in connection with a mowing apparatus.

As one example, each of the augers shown and described in connection with example embodiments has had a uniform pitch (e.g., in terms of distance between adjacent flights and/or angle of flights) and been formed of a continuous rigid material. However, in various embodiments, one or more of these can vary, such as in the following non-limiting examples: the weight, density, and/or material of the auger can vary; the auger pitch can vary along the length of the auger (e.g., increasing and/or decreasing through part or all of its length); two or more rigid augers (or one or more flexible augers) in series could be employed, through a linear, piecewise linear, or curved auger tube; at least some of the auger can be flexible or brushed/bristled (e.g., all, an outer portion of some or all flights, etc.), which can potentially allow more opportunities for the auger to move rigid material (e.g., small stones, etc.) upward by allowing one or more flights of the auger to attempt to move and/or bypass lodged/stuck material instead of becoming stuck on material that cannot be dislodged initially; an outer edge of some or all of the auger can be sharpened, serrated, etc. to facilitate breaking apart some material (e.g., pieces of wood, etc.); some or all auger flights can have openings that allow air, water/moisture and/or some material to pass through; etc.

As another example, the speed and/or torque of rotation of the auger and/or ejection implements can be constant or can vary based on one or more conditions, such as: the material and/or properties of the material (e.g., density, weight, etc.), operator input (e.g., selection of an energy-saving mode, a turbo mode, etc.), operating conditions such as current battery level (e.g., automatically switching to an energy-saving mode at lower battery level, etc.) or vehicle speed (e.g., reducing power to the auger system at lower vehicle speeds, etc.), etc.

Additionally, while components are discussed herein as part of systems comprising other components for ease of illustration and to show potential interactions between components, in some embodiments, one or more of these components can be omitted or can be substituted with other elements. As an example, one embodiment can comprise a modified side discharge (e.g., rearward-directed side discharge, etc.) connected to a mow deck coupler, which is connected to an auger tube and auger, which is driven by an auger motor that also drives one or more ejection implements of a clipping ejector to transfer material to a bagging system (e.g., such an embodiment can be driven by and further comprise a motor, or can be driven via another source of power/motion of the outdoor power equipment such as the rotation of a mow spindle). However, another embodiment can be a clipping ejector to transfer material to a bagging system. Such an embodiment could be combined with any of a variety of means for transferring material to the clipping ejector, including those discussed herein, but also including a blower, etc. that receives clippings from a mow deck via one of a side or top discharge. Another embodiment could omit the clipping ejector and employ a bagging or collection system that receives material from the top end of an auger without employing a clipping ejector. A further embodiment could employ a modified side discharge (e.g., rearward-directed side discharge, etc.) that transfers material to a bagging system connected to an output of the modified side discharge (e.g., rearward-directed side discharge, etc.). Another embodiment can comprise an auger and auger tube that receive material from an outdoor power equipment (e.g., a mow deck of a mowing apparatus, brushes of a sweeper, etc.) and move material from a first end of the auger and auger tube to a second end of the auger and auger tube. Optionally such an embodiment can include one or more of a material ejector or a collection system. Additional embodiments can include one or more of a modified side discharge (e.g., rearward-directed side discharge, etc.), a mow deck coupler, an auger tube and auger, and/or a material ejector.

Generally, the illustrated embodiments are not provided as strict limitations on how the disclosed aspects can be practiced by one of ordinary skill in the art but are intended to be provided as examples that can be modified, interchanged, added to or subtracted from as would be suitable to one of ordinary skill in the art to accomplish the purposes and objectives described herein. As an example, an arrangement of components depicted in one embodiment can be swapped with components depicted in another embodiment, optionally excluding some components or including other components illustrated in a third embodiment, according to design creativity of one of ordinary skill in the art. As a further example, components of disclosed devices can be implemented as connected to other components rather than included within the parent device. Alternatively, the opposite orientation can be implemented within the scope of the disclosure: one component (e.g., auger motor 935) depicted separate from another component (e.g., auger motor drive 937) can be aggregated as a single component in some embodiments (e.g., auger motor 935 can be internal to auger hood 920 and secured within auger tube base 924). Additionally, it is noted that one or more disclosed processes can be combined into a single process providing aggregate functionality. Still further, components of disclosed machines/devices/sensors/control units can also interact with one or more other components not specifically described herein but known by those of skill in the art.

In regard to the various functions performed by the above described components, machines, apparatuses, devices, processes, control operations and the like, the terms (including a reference to a "means") used to describe such components, etc., are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as mechanical structures, mechanical drives, electronic or electro-mechanical drive controllers, and electronic hardware configured to implement the functions, or a computer-readable medium having computer-executable instructions for performing the acts or events of the various processes or control operations described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be construed as being limited to those illustrations. Rather, any suitable combination or subset of elements from one drawing(s) can be applied to other embodiments in other drawings where suitable to one of ordinary skill in the art to accomplish objectives disclosed herein, objectives known in the art, or objectives and operation reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A conveyance system for an outdoor power equipment, comprising:

a screw auger with a central axis and one or more flights distributed in a spiral manner around the central axis along a length of the screw auger;

an auger housing extending along the length of the screw auger that forms a shell about at least a portion of the circumference of the screw auger and within which the screw auger is configured to rotate about its central axis, wherein the auger housing and screw auger are configured to transport material received at a first end of the auger housing out of a second end of the auger housing;

a coupler, wherein a first end of the coupler is configured to secure to and to substantially cover an opening in the outdoor power apparatus, wherein a second end of the coupler is connected to the first end of the auger housing, and wherein the coupler is configured to receive the material from the opening in the outdoor power apparatus and to provide the material to the first end of the auger housing; and an ejector housing having an ejector-auger interface connected to the second end of the auger housing, wherein the ejector housing comprises a rotatable implement configured to rotate within the ejector housing that is proximate to the second end of the auger housing, the ejector housing having a receptacle interface that serves as an output port for the ejector housing, wherein the ejector housing is configured to receive the material from the auger housing and to expel the material via the output port, wherein the rotatable implement is configured to expel at least a portion of the material.

2. The conveyance system of claim 1, further comprising an auger motor configured to rotate the screw auger.

3. The conveyance system of claim 2, wherein the rotatable implement is configured to rotate with the screw auger, and wherein the auger motor is further configured to rotate the rotatable implement.

4. The conveyance system of claim 2, wherein a shaft of the auger motor is one of coaxial with or parallel to the central axis of the screw auger.

5. The conveyance system of claim 2, wherein the auger motor is configured to drive the screw auger via a planetary gearset with a gear ratio of at least 5:1 and at most 12:1.

6. The conveyance system of claim 5, further comprises a pulley and belt assembly facilitating rotation of the screw auger in response to power output by the motor, wherein the pulley and belt assembly comprise a motor pulley coupled to the auger motor, an auger pulley coupled to the screw auger and a belt coupling the motor pulley to the auger motor.

7. The conveyance system of claim 2, wherein a shaft of the auger motor is perpendicular to the central axis of the screw auger.

8. The conveyance system of claim 2, wherein the auger motor is one of proximate to the ejector housing or proximate to the first end of the auger housing.

9. The conveyance system of claim 1, wherein the auger tube comprises an elevated hood above the screw auger and the shell, wherein the auger housing comprises a free flow area above the screw auger and below the elevated hood that is configured to allow air and at least a portion of the material to flow through the auger housing above the screw auger.

10. The conveyance system of claim 9, wherein the coupler comprises an intake surface configured to direct the material upward as it passes through the coupler, and wherein the coupler is configured to provide the material to the first end of the auger housing via a lower end of the free flow area, and wherein the auger housing has a top surface that is one or both of:

substantially flat; or forms a right edge with an outer sidewall surface of the auger housing.

11. The conveyance system of claim 9, wherein the coupler is configured to provide the material to the first end of the auger housing such that the material follows a first set of parabolic trajectories, and wherein a lower portion of the elevated hood has a shape that provides clearance for the first set of parabolic trajectories.

12. The conveyance system of claim 9, wherein the ejector housing further comprises one or more redirection surfaces configured to redirect a second portion of the material to expel the second portion via the output port, wherein the second portion is received via the free flow area, and wherein the second portion is distinct from the first portion.

13. The conveyance system of claim 1, wherein the second end of the coupler is connected to the first end of the auger housing at a pivot axis, and wherein the auger housing is configured to rotate about the pivot axis in response to vertical motion of the coupler.

14. The conveyance system of claim 1, wherein the screw auger is rotated based on a rotating component of the outdoor power equipment.

15. The conveyance system of claim 1, wherein the ejector housing is configured to expel the material via the output port into a material collection system of the outdoor power equipment.

16. The conveyance system of claim 15, wherein the ejector housing further comprises a deflector shield above the rotating implement and overlying a segment of an upper portion of an arc through which the rotating implement rotates, wherein the deflector shield is configured to direct the portion of the material expelled by the rotating implement out the output port of the ejector housing with a second set of parabolic trajectories shaped such that an upper surface of the material collection system and an upper surface of the ejector housing both provide clearance for the second set of parabolic trajectories.

17. The conveyance system of claim 1, further comprising one or more auger supports configured to connect at a first end to a frame of the outdoor power equipment and at a second end to the auger housing between the first and second ends of the augur tube, wherein each auger support of the one or more auger supports are configured to provide structural support to the auger housing.

18. The conveyance system of claim 1, wherein the outdoor power equipment is a mowing apparatus, the material comprises turf clippings, and the opening is an ejection opening in a mow deck of the mowing apparatus.

19. The conveyance system of claim 1, wherein the coupler is configured to receive the material via a rearward side discharge of the outdoor power equipment.

20. The conveyance system of claim 1, wherein the coupler is configured to receive the material from the opening in the outdoor power apparatus with a first trajectory of the material and to provide the material to the first end of the auger housing with a second trajectory of the material, and wherein the horizontal components of the first trajectory and the second trajectory are within 45 degrees of each other.

21. An apparatus secured to a mowing apparatus and adapted to convey material from a mow deck of the mowing apparatus to a receptacle, comprising:

an ejector housing configured to receive material via an input interface in a first plane and to expel the material via an output port in a second plane distinct from the first plane; and a rotatable implement configured to rotate within the ejector housing around an axis of rotation that is substantially perpendicular to the first plane, wherein the rotatable implement is enclosed within the ejector housing and configured to expel at least a first portion of the material.

22. The apparatus of claim 21, further comprising a motor and a transmission assembly configured to rotate the rotatable implement, wherein the transmission assembly comprises one of:

a gearbox having a mechanical input coupled to the motor and a mechanical output coupled to a rotating shaft of the rotatable implement, wherein the gearbox transfers mechanical power output from the motor to rotate the rotatable implement; or a first pulley coupled to an output shaft of the motor, a drive belt coupled to the first pulley and a second pulled coupled to the drive belt and to the rotating shaft of the rotatable implement, wherein mechanical power output from the motor is transferred from the first pulley to the second pulley by the drive belt and rotation of the second pulley drives rotation of the rotatable implement.

23. The apparatus of claim 21, wherein the material is received from the mowing apparatus.

24. The apparatus of claim 23, wherein the material is received from the mowing apparatus via at least one of an auger tube or an auger within the auger tube.

25. The apparatus of claim 23, wherein the material is received from the mowing apparatus via a blower.

26. The apparatus of claim 23, wherein the rotatable implement is configured to be rotated based on a rotating component of the mowing apparatus.

27. The apparatus of claim 21, wherein the ejector housing further comprises one or more redirection surfaces above the rotatable implement configured to redirect a second portion of the material to expel the second portion via the output port, wherein the second portion is distinct from the first portion.

28. The apparatus of claim 21, wherein the first plane is substantially perpendicular to the second plane.

29. The apparatus of claim 21, wherein the material comprises turf clippings.

* * * * *